United States Patent
Ninglekhu et al.

(10) Patent No.: US 12,369,110 B2
(45) Date of Patent: Jul. 22, 2025

(54) FREQUENCY RANGE DRIVEN NETWORK SLICING

(71) Applicant: INTERDIGITAL PATENT HOLDINGS, INC., Wilmington, DE (US)

(72) Inventors: Jiwan Ninglekhu, Royersford, PA (US); Michael Starsinic, Newtown, PA (US); Hongkun Li, Malvern, PA (US); Catalilna Mladin, Hatboro, PA (US); Quang Ly, North Wales, PA (US); Joseph Murray, Schwenskville, PA (US); Pascal Adjakple, Great Neck, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 366 days.

(21) Appl. No.: 17/790,538

(22) PCT Filed: Dec. 31, 2020

(86) PCT No.: PCT/US2020/067613
§ 371 (c)(1),
(2) Date: Jul. 1, 2022

(87) PCT Pub. No.: WO2021/138526
PCT Pub. Date: Jul. 8, 2021

(65) Prior Publication Data
US 2023/0052699 A1 Feb. 16, 2023

Related U.S. Application Data

(60) Provisional application No. 62/956,441, filed on Jan. 2, 2020, provisional application No. 62/972,212, filed
(Continued)

(51) Int. Cl.
*H04W 48/18* (2009.01)
*H04W 48/16* (2009.01)
(Continued)

(52) U.S. Cl.
CPC ........... *H04W 48/18* (2013.01); *H04W 48/16* (2013.01); *H04W 60/04* (2013.01); *H04L 41/00* (2013.01)

(58) Field of Classification Search
CPC ..... H04W 60/04; H04W 60/02; H04W 48/17; H04W 48/18; H04L 67/63; H04L 67/1014; H04L 41/00; H04B 1/401
See application file for complete search history.

(56) References Cited

U.S. PATENT DOCUMENTS

| 2018/0227871 A1 | 8/2018 | Singh et al. |
| 2019/0029065 A1 | 1/2019 | Park et al. |

(Continued)

FOREIGN PATENT DOCUMENTS

| CN | 111165021 A | 5/2020 |
| EP | 3592093 A1 | 1/2020 |

OTHER PUBLICATIONS

"5G Americas: Network Slicing for 5G Networks & Services", Nov. 2016, pp. 1-35 (Year: 2016).*
(Continued)

*Primary Examiner* — Salvador E Rivas
(74) *Attorney, Agent, or Firm* — Flaster Greenberg P.C.

(57) ABSTRACT

Network Slice Selection Assistance information (NSSAI) may be signaled between User Equipment (UE) and a network. NSSAI sent from the network to the UE may include, for example. Operating Frequency Band (OFB) for each Single NSSAI(S-NSSAI) in the NSSAI, as well as a Radio Access Technology (RAT) Frequency Selection Priority (RFSP) index, which the network configures as a part
(Continued)

of UE access and mobility; subscription, during a UE registration procedure. RAT restrictions may be enhanced to indicate to the UE that certain slices are not accessible via certain RATs. A UE may be provided by the network with an alternative NSSAI and corresponding OFBs for each S-NSSAI thereby indicating to the UE that these S-NSSAI would have been allowed had they been requested. A UE may be able to choose an alternative Allowed NSSAI and send a registration update request to the network.

16 Claims, 31 Drawing Sheets

Related U.S. Application Data on Feb. 10, 2020, provisional application No. 63/057,996, filed on Jul. 29, 2020.

(51) Int. Cl.
*H04W 60/04* (2009.01)
*H04L 41/00* (2022.01)

(56) References Cited

U.S. PATENT DOCUMENTS

| | | | |
|---|---|---|---|
| 2019/0124561 A1 | 4/2019 | Faccin et al. | |
| 2019/0342821 A1 | 11/2019 | Kim et al. | |
| 2020/0120589 A1* | 4/2020 | Velev | H04W 48/18 |
| 2020/0178158 A1 | 6/2020 | Won et al. | |
| 2020/0178321 A1* | 6/2020 | Liu | H04W 76/10 |
| 2022/0086790 A1* | 3/2022 | Wang | H04W 60/04 |
| 2022/0272620 A1* | 8/2022 | Ninglekhu | H04W 40/02 |

OTHER PUBLICATIONS

3GPP,"TS 24.501 V16.3.0", Dec. 2019, pp. 1-645 (Year: 2019).*
Wireless Broadband Alliance (WBA) Members, "Network Slicing: Understanding Wi-Fi Capabilities", Mar. 2018, pp. 1-15 (Year: 2018).*
3rd Generation Partnership Project; Technical Specification Group Services and System Aspects; Procedures for the 5G System; Stage 2 (Release 15), 3GPP Draft; 23502-F80 CRS Implemented, 3rd Generation Partnership Project (3GPP), Mobile Competence Centre; Dec. 22, 2019, XP051867064.
3rd Generation Partnership Project; Technical Specification Group Services and System Aspects; System architecture for the 5G System (5GS); Stage 2 (Release 16), 3GPP Standard; Technical Specification; 3GPP TS 23.501, 3rd Generation Partnership Project (3GPP), Mobile Competence Centre; vol. SA WG2, No. V16.3.0 Dec. 22, 2019, pp. 1-417.
Convida Wireless LLC et al: "KI #7, New Sol: Providing Operating Band Information in the Configured NSSAI", 3GPP Draft; S2-2004195, 3rd Generation Partnership Project (3GPP), Mobile Competence Centre ; vol. SA WG2, No. Electronic Meeting May 22, 2020, Jun. 1, 2020-Jun. 12, 2020.
3rd Generation Partnership Project, "Technical Specification Group Services and System Aspects; System Architecture for the 5G System", 3rd Generation Partnership Project (3GPP), Stage 2, Release 16, Document 3GPP TR 23.501 V16.1.0, Jun. 2019, 368 pages.
3rd Generation Partnership Project, "Technical Specification Group Core Network and Terminals; Numbering, addressing and identification (Release 15)", 3GPP TS 23.003 V15.7.0 (Jun. 2019), 131 pages.
3rd Generation Partnership Project, "Technical Specification Group Services and System Aspects, Procedures for the 5G System, Stage 2 (Release 16)", 3GPP TS 23.502 V16.1.1, Jun. 2019, pp. 1-495.
3rd Generation Partnership Project, "Technical Specification Group Services and System Aspects, Policy and Charging Control Framework for the 5G System, Stage 2 (Release 16)", 3GPP TS 23.503 V16.1.0, Jun. 2019, pp. 1-99.
3rd Generation Partnership Project, "Technical Specification Group Core Network and Terminals; Non-Access-Stratum (NAS) protocol for 5G System (5GS); Stage 3 (Release 16)," 3GPP TS 24.501 V16.1.0 (Jun. 2019), 542 pages.
3rd Generation Partnership Project, "Technical Specification Group Radio Access Network; NR; User Equipment (UE) radio transmission and reception; Part 1: Range 1 Standalone (Release 16)," 3GPP TS 38.101-1 V16.1.0 (Sep. 2019), 280 pages.
3rd Generation Partnership Project, "Technical Specification Group Radio Access Network; NR; User Equipment (UE) radio transmission and reception; Part 2: Range 2 Standalone (Release 16)," 3GPP TS 38.101-2 V16.1.0 (Sep. 2019), 154 pages.
3rd Generation Partnership Project, "Feasibility Study on Enhancement of Network Slicing Phase 2", Nokia, et al., S2-1908583 (revision of S2-1907289), 3GPP TSG WG-SA WG2 Meeting #134, Sapporo, Japan, Jun. 24-28, 2019, 3 pages.
GSM Association: "Generic Network Slice Template", Official Document NG.116, Version 1.0, May 23, 2019, 60 pages.
LG Electronics, "5G unified access control", 3GPP doc S1-172024, 3GPP TSG-SA WG1 Meeting #77, Porto, Portugal, Apr. 28, 2017, 4 pages.
LG Electronics, "TS 23.501: UE Preference on NSSAI", 3GPP draft, S2-175876 (revision of S2-172055), SA WG2 Meeting #122bis, Sophia Antipolis, France, Aug. 15, 2017,6 pages.
SA WG2, "LS to BBF on slicing", 3GPP draft, S2-183035 (revision of S2-182495), SA WG2 Meeting #126, Montreal, Canada, Mar. 9, 2018, 3 pages.
Qualcomm Incorporated et al., "TS 23.501: UE support for slicing", 3GPP draft, S2-175048, SA WG2 Meeting #S2-122, San Jose Del Cabo, Mexico, Jul. 3, 2017, 7 pages.

* cited by examiner

FREQUENCY RANGE DRIVEN NETWORK SLICING

CROSS-REFERENCE TO RELATED APPLICATIONS

This application is the National Stage Application of International Patent Application No. PCT/US2020/067613, filed Dec. 31, 2020, which claims the benefit of priority of U.S. Provisional Patent Application Ser. No. 62/956,441 filed Jan. 2, 2020, U.S. Provisional Patent Application Ser. No. 62/972,212 filed Feb. 10, 2020, and U.S. Provisional Patent Application Ser. No. 63/057,996 filed Jul. 29, 2020, all titled "Frequency range driven network slicing," the contents of which are hereby incorporated by reference in their entireties.

BACKGROUND

This disclosure pertains to systems, methods, and apparatuses or wireless networking such as, but not limited to, techniques described in: 3rd Generation Partnership Project (3GPP) TS 23.501, System Architecture for the 5G System, Stage 2, v16.1.0, Release 16, 2019-06; 3GPP TS 23.502, Procedures for the 5G System, Stage 2, v16.1.1, Release 15, 2019-06; GSMA NG.116 Generic Slice Template, Version 1.0, 23 May 2019; 3GPP TS 38.101-1 User Equipment (UE) radio transmission and reception, Part 1-Range 1 Standalone, V16.1.0 (2019-09); 3GPP TS 38.101-2 User Equipment (UE) radio transmission and reception, Part 2-Range 2 Standalone, V16.1.0 (2019-09); and 3GPP TS 23,503, Policy and Charging Control Framework for the 5G System (5GS), Stage 2 (Release 16).

SUMMARY

When a User Equipment (UE) needs to access network slices that are available on various frequency bands, the UE may need to select a frequency band and connect to a network, disconnect/disable a connection, or switch between different frequency bands. These goals may be achieved by a variety of mechanisms.

A UE may receive from the network an allowed Network Slice Selection Assistance Information (NSSAI) and Operating Frequency Band (OFT) for each Single Network Slice Selection Assistance Information (S-NSSAI) in the NSSAI and its Radio Access Technology (RAT) Frequency Selection Priority (RFSP) Index, which the network configures as a part of UE access and mobility subscription, during a UE registration procedure.

RAT restrictions may be enhanced to indicate to the UE that certain slices are not accessible via certain RATs.

A UE may be provided by the network with an alternative NSSAI and corresponding OFBs for each S-NSSAI, thereby indicating to the UE that these S-NSSAI would have been allowed had they been requested.

A UE may be able to choose an alternative Allowed NSSAI and send a Registration Update request to the network.

An enhanced UE Route Selection Policy (URSP) rule may include an indication of a Public Land Mobile Network (PLMN) identifier (ID) and/or OFB selection information, so that the UE may be able to steer itself to the intended slice by selecting an operating frequency band.

A network may send a Radio Resource Control (RRC) message to the UE to indicate specific S-NSSAIs in the Allowed NSSAI that are accessible and inaccessible with UE's current frequency band.

A UE may indicate in an RRC message its desire to access an S-NSSAI that may be inaccessible with UE's current frequency band, and the network may redirect the UE with a handover command so that UE may switch to the correct frequency band to access the desired S-NSSAI.

Other challenges to be addressed include, for example, that a UE might not be permitted to access certain slices simultaneously, and that certain slices might only be available to the UE only in certain locations, e.g., in geographic regions and/or tracking areas, A number of approaches may be taken to address such scenarios.

To control simultaneous access of network slices, a UE may indicate to the network its Simultaneous Slice Access Capability (SSAC), e.g., during a UE registration procedure, and the network may be able to convey to the UE whether a slice is simultaneously accessible with other network slices by including an SSAC indicator with each S-NSSAI of the configured NSSAI, Allowed NSSAI, and/or rejected S-NSSAIs.

A UE may be allowed to register with multiple S-NSSAIs, wherein the UE may be restricted from having simultaneous Packet Data. Unit (PDU) sessions with two or more slices based on the configured Simultaneous Slice Access Policies (SSAP). For example, an Access and Mobility Management Function (AMF) may reject a PDU Session Establishment Request with a cause code which details that Slice B is not accessible with slice A. The UE may receive this cause code and, depending upon its urgency or requirements, the UE may end the session with Slice A and re-attempt PDU Session Establishment Request with Slice B.

A UE may be configured to know which S-NSSAI(s) are or are not available in a geographical region. The location information may be provided to the UE in the S-NSSAI information. Furthermore, a NULL Slice/Service Type (SST) value, for example, may be used by a network to indicate to the UE that the network recognized an S-NSSAI but the S-NSSAI is not available in a particular geographical region and/or in the PLMN.

An enhanced registration procedure may be used wherein the UE is configured with information about what geographical regions a slice may be accessed from. The UE may then use this information when selecting a route for uplink data. For example, the UE may use this information to select a lower priority route when a slice is not available.

An enhanced PLMN selection or re-selection mechanism may be used wherein the UE that considers the availability of network slices in each PLMN in determining whether to register with the PLMN.

A UE may trigger PLMN reselection when the UE evaluates the URSP rule and identifies that the route cannot be established for a piece of traffic because the desired S-NSSAI's are not available in the UE's current location in the PLMN.

A further challenge is that a UE, at times, may only access network slices that are all available in the UE's current OFB. A number of solutions are available.

For example, a UE may inform the network (e.g., Radio Access Network (RAN) and/or the core network) about the Operating Frequency Bands (OFBs) that the UE can support. This information may be utilized by the network to identify and facilitate the UE's requested slices.

Based on the UE's supported OFBs, the requested network slices, and the OFBs at which the requested slices are available, the network may guide a UE to switch to a different OFB where, e.g., all or most of the requested slices are available.

A UE may consider a cause code conveyed by the network and use the received. OFB information to re-send a UE Registration Request to the network, while ensuring no Allowed NSSAI is updated until the handover is complete. In the new OFB, the UE may receive a set of allowed slices once the registration is accepted.

A UE may send, during a Registration Update request process, an indicator to the network to inform the network of the UE's desire to update the Allowed NSSAI only if the network can allow all of the slices in the request in the UE's current operating band. If the network cannot allow all of the requested slices, then the UE may continue working with its current Allowed NSSAI.

A UE may receive a list of Tracking Areas/Registration Areas (TA/RA) where all the slices in the UE's Allowed NSSAI are available during a successful UE registration procedure. Since a UE may be a mobile device, it may be appropriate for a UE to have the knowledge of such TA/RA where UE can be gracefully handed over.

A UE may send a Non-Access Stratum (NAS) message to the network requesting a list of TA/RA where all the slices in the UE's Allowed NSSAI are available. This request may be triggered by some UE context such as time, TA change, and/or direction.

Both a UE-OFB policy and a Simultaneous Slice Access Policies (SSAP) may be applied as constraints for simultaneous access of two or more slices during a UE registration procedure. Based on the policies, the UE may change OFB for simultaneous access of slices.

During PDU Session Establishment, a UE-OFB policy and a SSAP may be applied concurrently. Based on a decision given by the network, the UE may request a Registration Update by switching its OFB and carry on with the PDU sessions. Alternatively, the UE may decide to continue an existing PDU session without Registration Update and OFB handover.

A UE may initiate a PDU Session Establishment Request that indicates only those slices that are available in UE's current OFB.

During a PDU session with a slice in a network, the UE may include the S-NSSAI information for the desired slice in an RRC message directed towards the RAN. The RAN may identify the requested slice and the OFB associated with the requested slice and, based on the requested slice and UE s current OFB, the RAN may allow to further the PDU Session Establishment process, otherwise may direct UE to change OFB before continuing the PDU Session Establishment procedure.

For a mobile UE which has multiple ongoing PDU sessions, the RAN node may assist to switch the OFB for the UE, where the UE may continue existing PDU sessions. Based on the OFBs that the UE and the slices support, the RAN may facilitate a new cell/OFB for the UE with the continuation of all PDU sessions, some PDU sessions, or none of the on-going PDU sessions.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Terminology

Figure 1:
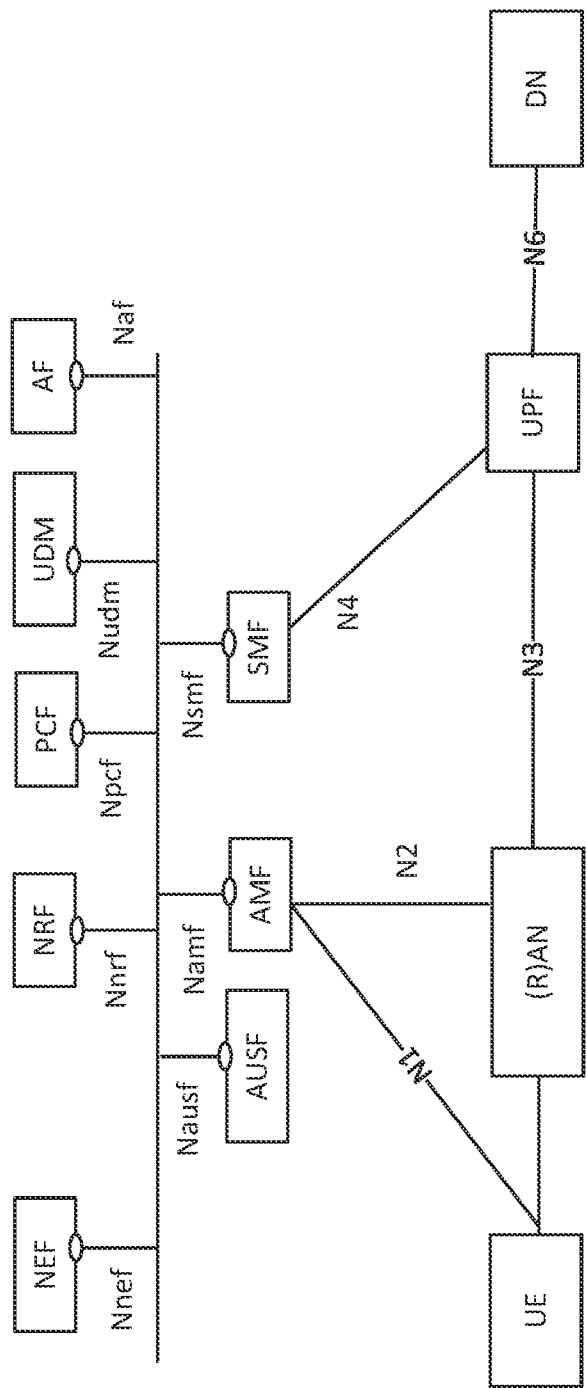
FIG. 1 is a block diagram of an example 5G System service-based architecture.

Table 14 of the Appendix includes many of the abbreviations used herein. The following are terms and coinages used by the inventors herein.

Tracking Area (T4)—A TA is a set of cells. TAs may be grouped into lists of tracking areas (TA lists), which can be configured on a User Equipment (UE). TAs are used for UE's access control, location registration, paging, and mobility management.

Registration Area (RA)—A registration area is an area in which UE may roam without a need to perform location registration, which is a NAS procedure.

Service Area Restriction—A service area restriction may contain one or more TAs, or be set as unlimited, e.g., containing all TAs of a Public Land Mobile Network (PLMN). The subscription data of a UE in the Unified Data Management (UDM) may include a service area restriction which, for example, designates which TAs are allowed areas and/or which TAs are non-allowed areas using explicit TA identifiers. Additionally, or alternatively, service area restrictions identify allowed and/or non-allowed TAs using geographical information, such as longitude latitude, zip code, etc.

Alternative Network Slice Selection Assistance Information (NSSAI)—NSSAI may be provided in "alternative NSSAIs" that includes a set of one or more Single Network Slice Selection Assistance Information (S-NSSAIs) that a UE is allowed to access, if the UE chooses to do so.

Network Function (NF)—An NF is a processing function in a network which has defined functional behavior and defined interfaces. A NF may be implemented as a network element on dedicated hardware, as a software instance running on dedicated hardware, or as a virtualized function instantiated on an appropriate platform such as on a cloud infrastructure.

AT instance—An NF instance is an identifiable instance of an NF.

Network Function Service—An NF service is a type of capability exposed by a first NF (an NF service producer) to another, authorized NF (an NF service consumer) through a service-based interface. An NF may expose one or more NF services. For example, an AMF may provide a Namf_EventExposure service, which enables the AMF to send notifications to NFs that subscribe to certain mobility management related events.

NF Service instance—An NF service instance is an identifiable instance of an NF service.

Network Slice—A network slice is a logical network that provides specific network capabilities and network characteristics.

Network: Mice Instance—A network slice instance is a set of NF instances and the required resources (e.g., computational, storage, and networking resources) which form a deployed network slice.

Network Capability—A network capability is a transport network feature that a core network implements and provides to its users (e.g., to UEs and application servers.) Examples of network capabilities include background data transfer and event monitoring. A network capability may be enabled through one or more NE services of one or more NF's.

Operating Frequency Band (OFB)—An OFB, or operating band, is a frequency range for data transmission or reception between a UE and a RAN node. Herein, "OFB" and "operating band" are used interchangeably.

PC5 (Interface)—PC5 refers to a reference point where the User Equipment, communicates with another User Equipment over the direct channel.

Radio Access Technology Frequency Selection Priority (RFSP) index—In Long Term Evolution (LTE), to support radio resource management in E-UTRAN the Mobility Management Entity (MME) provides the parameter 'Index to RAT/Frequency Selection Priority' (RFSP Index) to an eNodeB across S1. The MP Index is mapped by the eNodeB to a locally defined configuration in order to apply specific Radio Resource Management (RRM) strategies. The RFSP Index is UE specific and applies to all the Radio Bearers. This parameter may be used by the E-UTRAN to derive UE specific cell reselection priorities to control idle mode camping, or to decide on redirecting active mode UEs to different frequency layers or RATs. Similarly, in 5GS AMF receives subscribed the RFSP Index from UDM/Unified Data Repository (UDR) and is mapped to gNodeB to locally defined configuration in order to apply specific RRM strategies.

Simultaneous Slice Access Policies (SSAP)—The term SSAP is used herein to refer to a set of policies that control simultaneous access of a UE, to two or more network slices at a time. For example, a UE may be able to access an Ultra-Reliable Low-Latency Communication (URLLC) slice but may be denied access to an Enhanced Mobile Broadband (eMBB) slice while UE is allowed access and/or accessing the URLLC slice.

Simultaneous Slice Access Capability (SSAC)—The term SSAC is used herein to refer to a system capability in 3GPP Rel-17 or later whereby a network may have to impose a limitation on a UE's access to two or more slices simultaneously. This capability limitation may be placed by the Mobile Network Operator (MNO) in the core network and based on SSAP. The core network provides the UEs with SSAC indicators that define nature of simultaneous access, A UE may need to support such policies. A UE that supports SSAP are known to have simultaneous slice access capability. A UE conveys its support for SSAC indicators via a SSAC Support Indicator (SSD.

UE-OFB Policy—The term UE-OFB Policy herein refers to policy which allows UE to access only those slices that are available in the UE's current Operating Frequency Band (OFB). If at least one slice in the set of requested slices is not available in the UE's current OFB, then the request to access all the slices is rejected with a suggestion for OFB handover, where all the requested slices are available.

Uu (Interface)—The radio interface between 5G RAN and the User Equipment.

Example 5G Network Architectures

FIG. 1 shows an example non-roaming reference architecture with service-based interfaces within the Control Plane (CP). See 3GPP TS 23.501, System Architecture for the 50 System; Stage 2, v16.1.0, Release 16, 2019-06.

Figure 2:
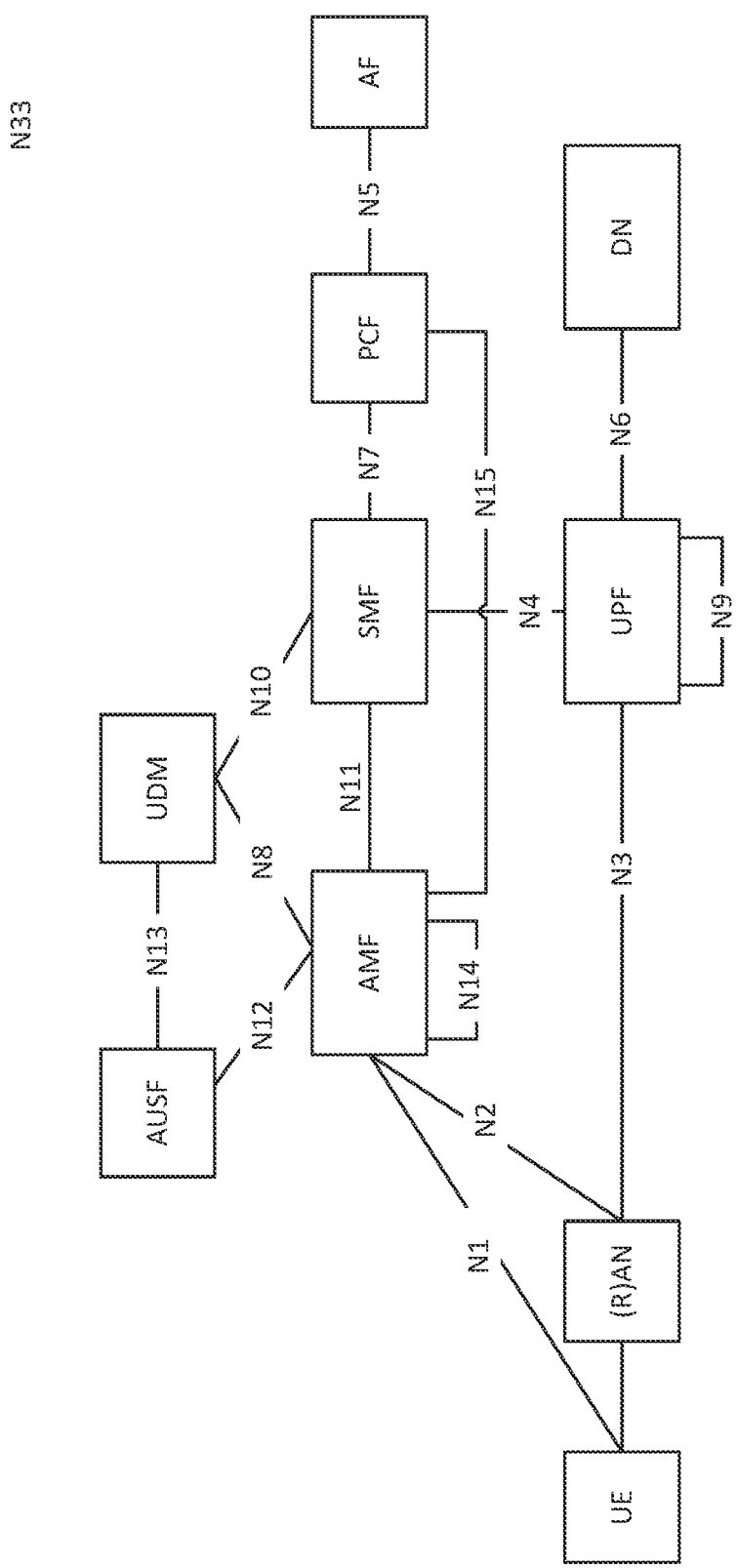
FIG. 2 is a block diagram of an example non-roaming 50 system architecture in reference point representation.

FIG. 2 depicts an example 5G system architecture for a non-roaming case, using the reference point representation showing how various network functions interact with each other. See TS 23.501.

The mobility management and Session Management Functions (SMFs) are separated. A single N1 NAS connection is used for both Registration Management and Connection Management and for Session Management (SM) related messages and procedures for a UE. The single N1 termination point is located in AMF. The AMF forwards SM related NAS information to the SMF. AMF handles the Registration Management and Connection Management part of NAS signaling exchanged with the UE. SMF handles the SM part of NAS signaling exchanged with the UE.

Network Function 5G architecture supports data connectivity and services enabling deployments to use techniques such as e.g., Network Function Virtualization and Software Defined Networking. The 5G System architecture allows leveraging service-based interactions between Control Plane (CP) Network Functions (NFs) where identified.

An NE is a processing function in a network, which has defined functional behavior and defined interfaces. An NT can be implemented either as a network element on dedicated hardware, as a software instance running on a dedicated hardware, or as a virtualized function instantiated on an appropriate platform, e.g., on a cloud infrastructure.

Network Slicing in 5GC

A network slice is a logical network that provides specific network capabilities and network characteristics. A network slice within a MIN includes the Core Network (CN) Control Plane (CP) and user plane network functions. A network slice instance is a set of NF instances and the required resources (e.g., computational, storage, and networking resources) which form a deployed network slice.

Network slices may differ for supported features and network function optimizations, in which case such Network Slices may be of different SSTs. The operator can deploy multiple Network Slice instances delivering the same features but for different groups of UEs, e.g., as they deliver a different committed service and/or because they are dedicated to a customer, in which case such Network Slices may be of the same SSTs but are distinguished through different Slice Differentiators.

The network may serve a single UE with one or more Network Slice instances simultaneously via a 5G-AN and associated with at most eight different S-NSSAIs in total, regardless of the access type(s) over which the UE is registered (e.g., 3GPP Access and/or N3GPP Access). The AMF instance serving the LT logically belongs to each of the Network Slice instances serving the UE, e.g., this AMF instance is common to the Network Slice instances serving a UE.

Identification and Selection of a Network Slice: S-NSSAI and NSSAI

A network slice is identified by an S-NSSAI, which may comprise a Slice/Service Type (SST) and a Slice Differentiator (SD). The SST refers to the expected Network Slice behavior in terms of features and services. The Slice Differentiator (SD), which is optional information that complements the SST(s) to differentiate amongst multiple Network Slices of the same SST.

An S-NSSAI can have standard values (e.g., such S-NSSAI is only comprised of an SST with a standardized SST value, and no SD) or non-standard values (e.g., such S-NSSAI is comprised of either both an SST and an SL) or only an SST without a standardized SST value and no SD). An S-NSSAI with a non-standard value identifies a single Network Slice within the PLMN with which it is associated. An S-NSSAI with a non-standard value shall not be used by the UE in Access Stratum (AS) procedures in any PLMN other than the one to which the S-NSSAI is associated. Table 1 of the Appendix shows the standardized SST value.

The NSSAI is a collection of S-NSSAIs. An NSSAI may be a Configured NSSAI, a Requested NSSAI, or an Allowed NSSAI. There can be at most eight S-NSSAIs in allowed and requested NSSAIs sent in signaling messages between the UE and the Network. The Requested NSSAI signaled by the UE to the network allows the network to select, the Serving AMF, Network Slice(s), and Network Slice instance(s) for this UE.

Based on the operator's operational or deployment needs, a Network Slice instance can be associated with one or more S-NSSAIs, and an S-NSSAI can be associated with one or more Network Slice instances. Multiple Network Slice instances associated with the same S-NSSAI may be deployed in the same or in different Tracking Areas (TAs). When multiple Network Slice instances associated with the same S-NSSAI are deployed in the same TAs, the AMF instance serving the UE may logically belong to (e.g., be common to) more than one Network Slice instance associated with this S-NSSAI.

Based on the Requested NSSAI (if any) and the Subscription Information, the 5G Core (5GC) is responsible for selection of a Network Slice instance(s) to serve a UE including the 5GC Control Plane (CP) and User Plane Network Functions (NFs) corresponding to this Network Slice instance(s).

The RAN may use Requested NSSAI in Access Stratum (AS) signaling to handle the UE CP connection before the 5GC informs the RAN of the Allowed NSSAI. The Requested NSSAI is used by the RAN for AMF selection, as described in clause 63.5. The UE shall not include the Requested NSSAI in the RRC Resume when the UE asks to resume the RRC connection and is CM-CONNECTED with RRC Inactive state.

When a UE is successfully registered over an Access Type, the CN informs the RAN by providing the Allowed NSSAI for the corresponding Access Type.

Standardized SST values provide a way for establishing global interoperability for slicing so that PLMNs can support the roaming use case more efficiently for the most commonly used SST.

The SSTs which are standardized are in the following Table 1 of the Appendix herein. See TS 23.501.

Configured NSSAI

Configured NSSAI is the NSSAI provisioned in the UE applicable to one or more PLMNs. A Configured NSSAI may be configured by a Serving PLMN and apply to the Serving PLMN. There is at most one Configured NSSAI per PLMN.

Default Configured NSSAI

A Default Configured NSSAI is configured by the Home Public Land Mobile Network (HPLMN) and that applies to any PLMNs for which no specific Configured NSSAI has been provided to the UE. The value(s) used in the Default Configured NSSAI are expected to be commonly decided by all roaming partners. The Default Configured NSSAI, if it is configured in the UE, is used by the UE in a Serving PLMN only if the UE has no Configured NSSAI for the Serving PLMN. The UE may be pre-configured with the Default Configured NSSAI.

Requested NSSAI

Requested NSSAI is the NSSAI provided by the UE to the Serving PLMN during registration. The S-NSSAIs in the Requested NSSAI selected from the Configured NSSAI are applicable for this PLMN, when it is available. If no Configured NSSAI for the PLMN is available, the S-NS-SAIs in the Requested NSSAI are selected from the Default Configured NSSAI, if configured in the UE.

The Requested NSSAI signaled by the UE to the network allows the network to select the Serving AMF, Network Slice(s) and Network Slice instance(s) for this UE. Based on the Requested NSSAI (if any) and the Subscription Information, the 5GC is responsible for selection of a Network Slice instance(s) to serve a UE including the 5GC Control Plane and User Plane Network Functions corresponding to this Network Slice instance(s).

Allowed NSSAI

An Allowed NSSAI is an NSSAI provided by the serving PLMN during a registration procedure, indicating the S-NS-SAIs values the UE is not registered to in the serving PLMN for the current registration Area. Upon successful completion of a UE registration procedure over an access type, the UE obtains from the AMF an allowed NSSAI for this access type, which includes one or more S-NSSAIs and, if needed, their mapping to the HPLMN S-NSSAIs. These S-NSSAIs are valid for the current Registration Area and Access Type and can be used simultaneously by the UE.

Mapping of an Allowed NSSAI

The Mapping of Allowed NSSAI is the mapping of each S-NSSAI of the Allowed NSSAI for the serving PLMN to the HPLMN S-NSSAIs.

Mapping of Configured NSSAI

The Mapping of Configured NSSAI is the mapping of each S-NSSAI of the configured NSSAI for the Serving PLMN to the HPLMN S-NSSAIs.

S-NSSAI Encoding

Figure 9:
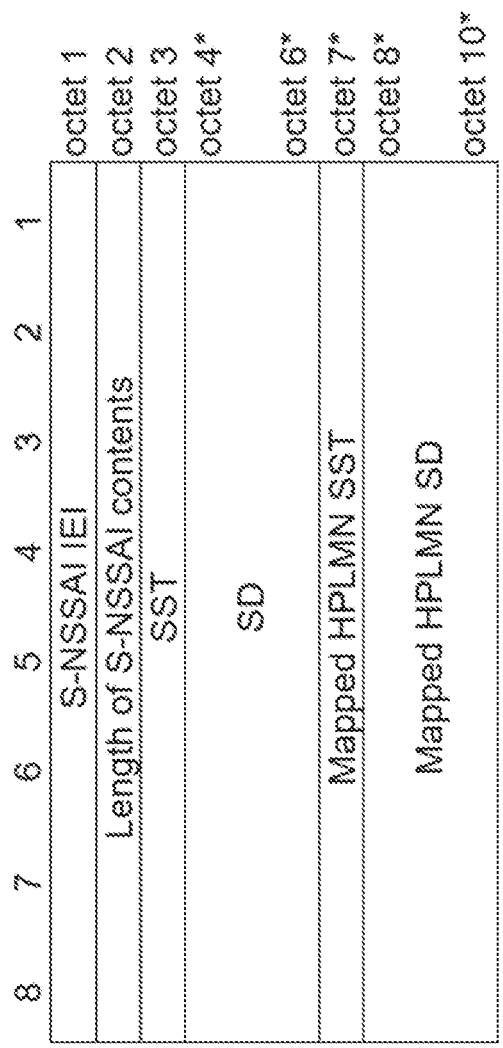
FIG. 9 illustrates an example S-NSSAI information element.

The purpose of the S-NSSAI information element is to identify a network slice. The S-NSSAI information element is coded as shown in FIG. 9 and Table 8 of the Appendix herein, as described in 9.11.2.8 of 3GPP TS 24501 Non-Access-Stratum (NAS) protocol for a 5G system.

The S-NSSAI is a type 4 information element with a minimum length of 3 octets and a maximum length of 10 octets.

URSP Rules

The Route Selection Policy (URSP) of a UE includes a prioritized list of URSP rules, See 3GPP TS 23,503, Policy and Charging Control Framework for the 5G system; Stage 2 (Release 16). See also Table 2 of the Appendix herein which shows URSP. The structure of the URSP rules is are described in Table 3 and Table 4 of the Appendix herein.

Enhancements in Network Slicing

The 3GPP SA2 study, Feasibility Study on Enhancement of Network Slicing Phase 2 (S2-1908583) involves new enhancements in network slicing. This study was conducted as a result of a request received from GSMA 5GJA to further investigate and incorporate recommended features based on the concept of Generic Slice Template (GST) published in GSMA NG.116 Generic Slice Template, Version 1.0, 23 May 2019. The main Objective of this study is to identify in 5G system procedures in SA2 owned TSs to support of GST parameters and to study potential solutions that may address these gaps.

Among many relevant attributes featured in the NG.116, one of them dealt with radio spectrum supported by the network slices. Each network slice may support or operate in the different radio frequency range based on the type of service it offers. The frequency ranges in which New Radio (NR) can operate are identified as described in Table 5.1-1 in TS 38.101. See Table 5 of the Appendix herein.

This means that a specific frequency band can be used to access a specific network slice(s). For instance, eMBB slice can be supported in 2.6 GHz and 4.9 GHz while URLLC slice can be supported only in 4.9 GHz. In some other deployment scenarios, the lower frequency band can be used for IoT while using the higher frequency bands for eMBB services. That is, the combination of the spectrum bands and the network slices can be a good tool for service providers requiring the service isolation as well as the efficient use of the 5G-spectrum bands.

Radio Spectrum

NG.116, defines an attribute called Radio Spectrum to address specific frequency ranges. In NG.116, this attribute defines the Radio Spectrum supported by the network slice. This is important information, as some terminals might be restricted in terms of frequencies to be used. Table 6 of the Appendix herein depicts a description for Radio Spectrum attribute.

This attribute defines which frequencies can be used to access the network slice. NR is designed to operate in the FR1 and FR2 operating bands. The symbols n1, n77, n38 in Table 6 represent examples for NR operating bands within FR1 frequency range designation. Table 5.2.-1 of TS 23.101 defines the relationship between frequency range designation FR1 and FR2 (Table 5) and NR operating bands. For example, n1 NR operating band represents Uplink (UL) operating band that a UE uses to transmit and base station uses to receive between 1920 MHz-1980 MHz and Downlink (DL) operating band the TIE uses to receive and the base station uses to transmit between 2110 MHz-2170 MHz and, operates in FDD (Frequency Division Duplex) duplex mode.

It may also be noticed that the Radio Spectrum attribute has a Scalability attribute tag. Tags are used as labels attached to the attributes to give additional information about the nature of each attribute. GSM NG.116 defines that there are two types of attributes, namely Character Attribute and Scalability Attribute. An attribute cannot fall into both the categories.

A character attribute characterizes a slice, for example what throughput, latency and/or Application Programming Interface (API) it offers. It is independent of Network Slice Consumer (NSC) and Network Slice Provider (NSP). A scalability attribute provides attribute's information about the scalability of the slice; for example, a number of terminals allowed in a slice. This type of attribute is specific to the Network Slice Consumer (NSC) and Network Slice Provider (NSP).

Area of Service

NG.116 also define an Area of Service attribute. This attribute specifies the area where the terminals can access a particular network slice. Therefore, the attribute specifies the list of the countries where the service will be provided.

The list is specific to Network Slice Providers (NSP) and their roaming agreements. In case the list comprises more than one entry, roaming agreements between the HPLMN and the Visited Public Land Mobile Networks (VPLMNs) are required. Table 9 of the Appendix herein describes the attribute details.

Region Specification

For every country listed in the area of service attribute, it needs to be indicated if the service will be provided in the whole country or just in part of the country, if the Network Slice Customer (NSC) requires a specific location, this attribute can be used to specify the regions of the country where the service will be provided. It needs to be completed for every country listed in the area of service attribute.

The list of regions is specific for each country and the way to define these regions is the decision of the Network Slice Consumer (NSC) and Network Slice Provider (NSP). Table 10 of the Appendix herein describes the attribute details.

The area of service may also depend on base station location and its coverage, cells etc. In addition, the GSMA NST 116 document describes geographical partitioning. This approach requires partitioning a geographical region into a set of zones/grids, which for better resource usage consists of defining a regular set of zones of predetermined dimensions.

Radio Resource Management Functions

To support radio resource management in RAN, the AMF provides the parameter 'Index to Radio Access Frequency (RAT)/Frequency Selection Priority' (RFSP Index) to Radio Access Network (RAN) across N2. See TS 23.501. The RFSP Index is mapped by the RAN to locally defined configuration in order to apply specific Radio Resource Management (RRM) strategies, taking into account any available information in RAN. The RFSP Index is UE specific and applies to all the Radio Bearers. This parameter may be used by the RAN to derive UE specific cell reselection priorities to control idle mode camping and may also be used to decide on redirecting active mode UEs to different frequency layers or RATs.

The HPLMN may set the RFSP Index taking into account the Subscribed S-NSSAIs. The AMF receives the subscribed RFSP Index from the UDM (e.g., during the Registration procedure). For non-roaming subscribers, the AMF chooses the RFSP Index in use according to one of the following procedures, depending on operator's configuration. The RFSP Index in use may be identical to the subscribed. RFSP Index, or the AMF may choose the RFSP Index in use based on the subscribed RFSP index, the locally configured operator's policies, the Allowed NSSAI and the UE related context information available at the AMF, including UE's usage setting, if received during Registration procedures (see 3GPP TS 23,502, Procedures for the 5G System; Stage 2, v16.1.1, Release 15, 2019-06).

For roaming subscribers, the AMF may choose the RFSP Index in use based on the visited network policy, but can take input from the 1-HPLMN into account (e.g., an RFSP Index value pre-configured per HPLMN, or a single RFSP Index value to be used for all roamers independent of the HPLMN).

The RFSP Index in use is also forwarded from source to target RAN node when Xn or N2 is used for intra-NG-RAN handover.

The AMF stores the subscribed RFSP Index value received and the RFSP Index value in use. During the Registration procedure, the AMF may update the RFSP index value in use (e.g., the AMF may need to update the RFSP Index value in use if the UE related context information in the AMF has changed). When the RFSP Index value in use is changed, the AMF immediately provides the updated RFSP Index value in use to NG-RAN node by modifying an existing UE context or by establishing a new UE context in RAN or by configuring it to include the updated RFSP Index value in use in the Next Generation Application Protocol (NGAP) downlink NAS transport message if the user plane establishment is not needed.

Access and Mobility Related Policy Control

The Access and Mobility Policy Control Function encompasses the management of service area restrictions, the management of the RFSP functionalities and UE Aggregate Maximum Bit Rate (UE-AMBR), and the management of the SMF selection. This clause defines the management of service area restrictions and RFSP Index for a UE registered over 3GPP access.

A UE's subscription may contain service area restrictions, which may be further modified by Policy Control Function (PCF) based on operator defined policies at any time, either by expanding a list of allowed Tracking Area Identities (TAIs) or by reducing a non-allowed TAIs or by increasing the maximum number of allowed. TAIs. Operator defined policies in the PCF may depend on input data such as UE location, time of day, and information provided by other NFs, etc.

The AMF may report the subscribed service area restrictions received from UDM during Registration procedure or when the AMF changed. The conditions for reporting require that local policies in the AMF indicate that Access and Mobility Control is enabled. The AMF also reports the subscribed service area restrictions to the PCF when the policy control request trigger for service area restrictions change, as described in clause 6.1.2.5 of 3GPP TS 23.503 Policy and Charging Control Framework for the 5G System (5GS); Stage 2 (Release 16) is met. The AMF receives the modified service area restrictions from the PCF. The AMF stores them then use it to determine mobility restriction for a UE. The PCF may indicate to the AMF that there is an unlimited service area.

The service area restrictions consist of a list of allowed TAI(s) or a list of non-allowed TAI(s) and optionally the maximum number of allowed TAIs.

The management of the RFSP Index enables the PCF to modify the RFSP Index used by the AMF to perform radio resource management functionality, as described in TS 23.501 clause 5.3.4. PCF modifies the RFSP Index based on operator policies that take into consideration e.g., accumulated usage, load level information per network slice instance, etc. The subscribed RSFP Index may be further adjusted by the PCF based on operator policies at any time.

For radio resource management, the AMF may report the subscribed RFSP Index received from UDM during the Registration procedure or when the AMF changed. The conditions for reporting require that local policies in the AMF indicate that Access and Mobility Control is enabled. The AMF reports the subscribed RFSP Index to the PCF when the subscription to RFSP Index change to the PCF is met. The AMF receives the modified RFSP Index from the PCF.

The management of UE-AMBR enables the PCF to provide the UE-AMBR information to AMF based on serving network policy. The AMF may report the subscribed UE-AMBR received from UDM. The conditions for reporting require that the PCF provided Policy Control Request Triggers to the AMF to report subscriber UE-AMBR change. The AMF receives the modified UE-AMBR from the PCF. The AMF provides a UE-AMBR value of the serving network to RAN, as specified in clause 5.7.2.6 of TS 23.501.

Example Challenges

An MNO may offer multiple network slices. Each network slice may be designed and configured to offer specific slice characteristics, such as desired QoS, security features and network functionalities to the UE. Four standard Slice/Service types are defined in TS 23.501, Rel 16. See Table 1 of the Appendix herein. A network operator may desire to plan his network such that certain slices are only available via certain frequency bands.

Figure 3:
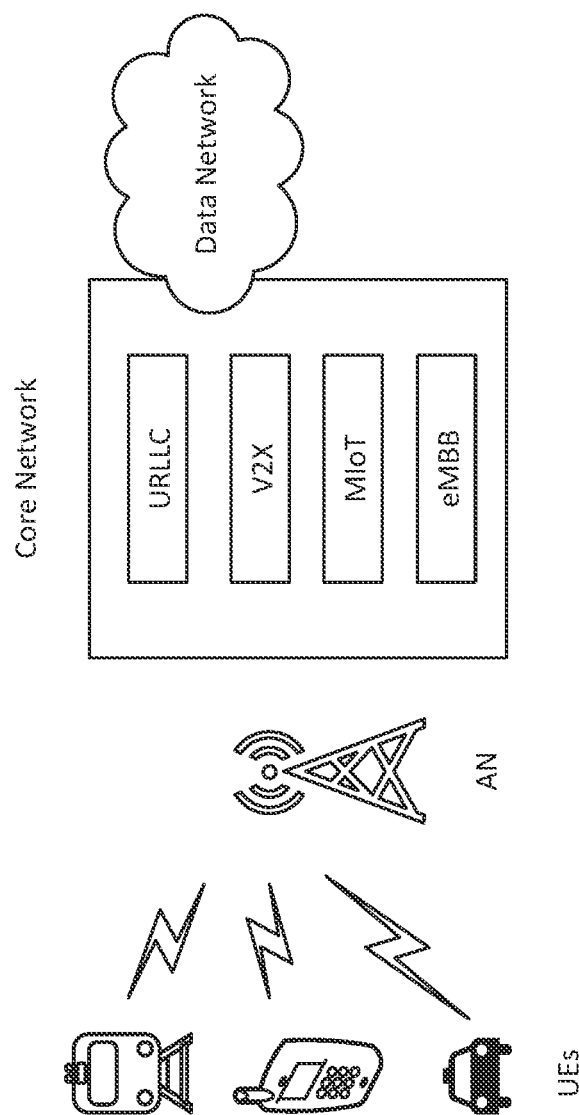
FIG. 3 illustrates an example core network offering multiple network slices.

FIG. 3 shows a core network that can offer four different types of network slices. Namely, URLLC, V2X, eMBB, and Massive Internet-of-Things (MIoT). These network slices may be operated in different frequency bands and these frequency bands may be assigned to slice types based on factors such as QoS, NFs and/or geographic regions.

When a UE is accessing a particular slice, the network may need to restrict the UE from accessing any other slice, restrict the UE from accessing other slices with the same SST value, or restrict the UE from accessing other slices with the same SD value. For example, this may be desirable in a scenario where an enterprise has deployed a slice and it wants to prevent UEs from accessing the slice when the UE is simultaneously accessing other slices or slices that belong to another enterprise.

Another network slicing scenario that should be considered relates to roaming. When a UE is roaming, roaming agreements between the UE's HPLMN and the VPLMN dictate what slices the UE is allowed to access via the HPLMN. Furthermore, roaming agreements may be arranged such that the VPLMN allows the UE to access certain slices in some countries or regions, and does not allow access in other countries or regions. For example, this may be done in scenarios where an enterprise does not want its slice to be accessed from a certain country or region, or does not want its slice to be accessed in scenarios where local regulations dictate that certain slice types should not be accessed.

In the scenario described in reference to FIG. 3, when a UE needs to access slices that are only available on separate frequency bands, the UE may need to select a frequency band, disconnect/disable connection to another frequency band or switch between different frequency bands.

Based on the type of application used in the UE and the target network slice, the UE must be able to steer itself to a pre-defined and pre-allocated frequency band that corresponds to the frequency band of the slice. Current 5GS doesn't provide mechanisms for the UE to steer to a specific frequency band that is allotted for specific network slice without registering and deregistering.

A UE must be configured with set of policies, in order to navigate itself between frequency bands allotted for network slices. 5GS must define such policies. MNOs allocate frequency bands for network slices, but a UE may need frequency band information in order for it to successfully steer to the correct network slice. Hence, the relation information on frequency band and network slice must be provided to the UE. Current 5GS doesn't describe a mechanism to configure or deliver such frequency band and corresponding network slice information to the UE.

The UE must have policies to use the information received from the core network to correctly steer itself to targeted network slice via the correct operating frequency band. Such policies may be pre-configured in the UE or may be delivered by the core network. Current 5GS doesn't define such policies for the UE. Furthermore, policies need to be defined in the UE so that it can successfully steer to the right frequency.

In order to allow the network to restrict the UE from accessing any other slice, restrict the UE from accessing other slices with the same SST value, or restrict the UE from accessing other slices with the same SD value, the following questions need to be addressed.

First, how does the 5GS make the UE aware of these restrictions? in other words, how does the network make the UE aware that these restrictions are in place?

Second, how does the UE handle a case where the UE is accessing a slice where new application layer activity would normally trigger the UE to attempt to send traffic on a slice that is currently restricted?

Third, what does the network do when the UE attempts to violate a restriction? In other words, what does the network do when the UE attempts to simultaneously access two slices that are not allowed to be simultaneously accessed? Answers to this question should consider that network needs to enforce these restrictions on legacy (Rel-15 and Rel-16) UEs as well.

In order to handle the case where a UE is only allowed to access certain slices in certain PLMNs when the UE is roaming, the following questions need to be addressed.

First, how does the network convey to the UE that certain slices cannot be accessed in certain PLMNs when the UE is roaming? In other words, how is the UE told that a slice cannot be accessed via a given VPLMN when the UE is in a certain country, or region?

Second, how does the current location and the slices that the UE may want to access impact PLMN selection?

Third, if the UE attempts to access a slice via a PLMN that does not allow access to the slice and is rejected, should the UE attempt to switch to a different PLMN?

Fourth, answers to questions discussed herein should consider that the network needs to enforce these restrictions on legacy (Rel-15 and Rel-16) UEs as well.

Furthermore, once a UE is restricted to access network slices based on the OFB where the slices are available, multiple scenarios of slice access may arise. For instance, a UE may only be allowed access to the slices that are available in UE's current OFB. In such a setting, following questions may need to be addressed:

How does UE convey to the network about the OFBs it supports so that the network can assist the UE with selecting the slices that UE can access?

What happens when UE wants to access a slice that is not available in UE's current OFB? How does the network facilitate the UE's access to the slice?

When OFBs becomes a constraint for accessing slices, how does it affect UE's constraints on simultaneous access of two or more slices?

How does the 5GS manage the UE's request to establish a PDU session to a slice, if the slice is not in UE's current OFB? How does 5GS handle the scenario of PDU session continuity when UE moves to a new OFB/cell? Answers to this question should also consider that network needs to enforce these restrictions on legacy (Rel-15 and Rel-16) UEs.

Solutions Based on Frequency Band Configuration at the UE

Figure 4:
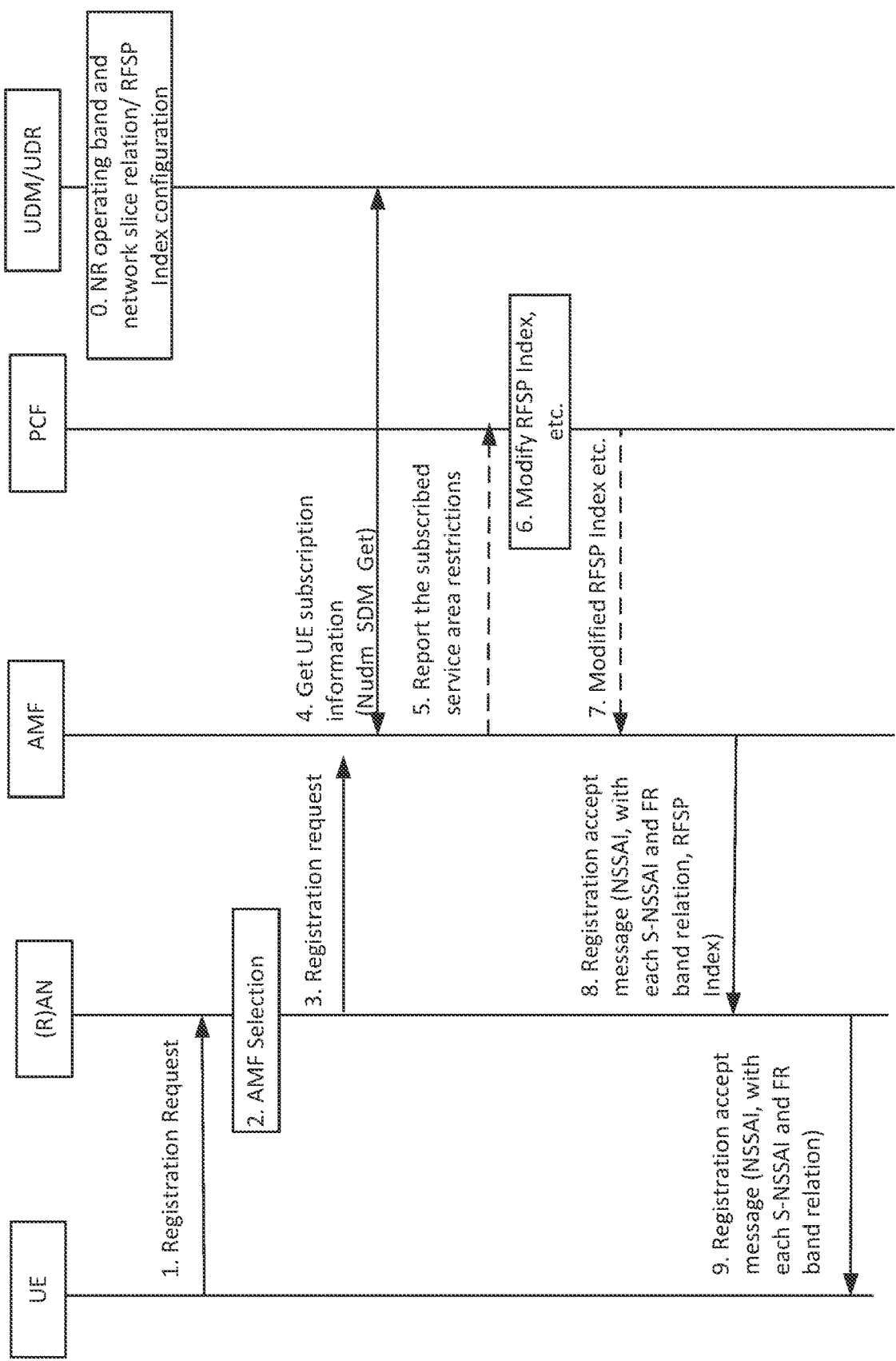
FIG. 4 is a call flow of an example of NSSAI and operating band information delivery during registration.

Operating bands that translate to specific UL and DL frequency ranges 3GPP TS 38.101 (including Parts 1 and 2, TS 38.101-1 and TS 38.101-2) User Equipment (UE) radio transmission and reception V16.1.0 (2019-09) may be pre-defined and allotted for network slices. Allocation and configuration of these operating bands with the corresponding network slices may depend on MNO's local policies. FIG. 4 shows an example method by which operating bands for each slice is delivered to a UE.

In step 0 of FIG. 4, MNO may allocate operating bands (e.g., n1, n7, n12 etc.) as defined in 3GPP IS 38.101-1 User Equipment (UE) radio transmission and reception; Parts 1&2, V16.1.0 (2019-09), and assign them to S-NSSAI(s) as part of UE Access and Mobility Subscription at the UDM/UDR. This may include RFSP Index configuration.

In step 1, the UE sends a Registration Request to the AMF via the access network. The request includes a Requested NSSAI. In the case of Initial Registration or Mobility Registration Update, the UE includes the Mapping of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. The UE includes the Default Configured NSSAI indication if the UE is using a Default Configured NSSAI.

In step 2, the RAN selects the AMF as described in TS 23.501 clause 6.3.5.

In step 3, the RAN sends to the AMF an N2 message (N2 parameters, Registration Request and UE Policy Container). The N2 parameters may include: the Selected PLMN ID or the PLMN ID and a network identifier (NID); Location information and Cell Identity related to the cell in which the UE is camping on; and UE Context Request which indicates that a UE context including security information needs to be setup at the NG-RAN.

In step 4, the AMF may retrieve the Access and Mobility Subscription data using Nudm_SDM_Get. This requires that the UDM may retrieve this information from UDR by Nudr_DM_Query. This includes the operating bands and corresponding S-NSSAIs relation and RFSP Index information.

The AMF creates a UE context for the UTE after getting the Access and Mobility Subscription data from the UDM.

Mobility Restrictions consists of RAT restriction, Forbidden Area, Service Area. Restrictions, Core Network type restriction and Closed Access Group information as described in TS 23.501 clause 5.3.4.1, wherein, RAT restriction defines a 3GPP RAT, a UE is not allowed to access in a PLMN. In a restricted RAT, a UE based on subscription is not permitted access to the network for this PLMN. RAT Restrictions may be enhanced so that it is indicated per S-NSSAI; in other words, certain slices might not be accessible via certain RATs.

In step 5, the AMF may report RAT restrictions, subscribed service area restrictions, subscribed RFSP Index and subscribed UE-AMBR received from the UDM for further evaluation to the PCF.

In step 6, the PCF may modify RFSP Index, RAT restrictions, service area restrictions and subscribed UE-AMBR based on operator policies.

In step 7, the AMF may receive modified RFSP Index, modified RAT restrictions, modified service area restrictions and modified UE-AMBR from the PCF.

The modified RFSP Index, modified RAT restrictions, modified service area restrictions and modified UE-AMBR may replace subscribed RFSP Index, RAT restrictions, service area restrictions and UE-AMBR.

In step 8, the AMF sends a Registration Accept message to the UE via RAN node. AMF may send RFSP Index, RAT restrictions, service area restrictions and UE-AMBR in the Registration Accept message to the RAN node in N2 message.

In step 9, the RAN node may forward Registration Accept to the UE. The Registration Accept may include the Allowed NSSAI with each S-NSSAI and its corresponding operating band information, Mapping of Allowed NSSAI with each S-NSSAI and its corresponding operating hand, Configured NSSAI for the Serving MIN with each S-NSSAI and its corresponding operating band, and mapping of Configured NSSAI with each S-NSSAI and its corresponding operating band. The Registration Accept also includes the Mobility Restrictions which include the RAT Restrictions. The RAT Restrictions have been enhanced to include so that restrictions are indicated per S-NSSAI; in other words, certain slices might not be accessible via certain RATS.

The UE may display the RAT Restrictions and the allowed frequency ranges that are associated with each S-NSSAI on a GUI. The user may view the GUI from within a "Settings" GUI.

Enhanced S-NSSAI Information Element with OFB

Figure 10:
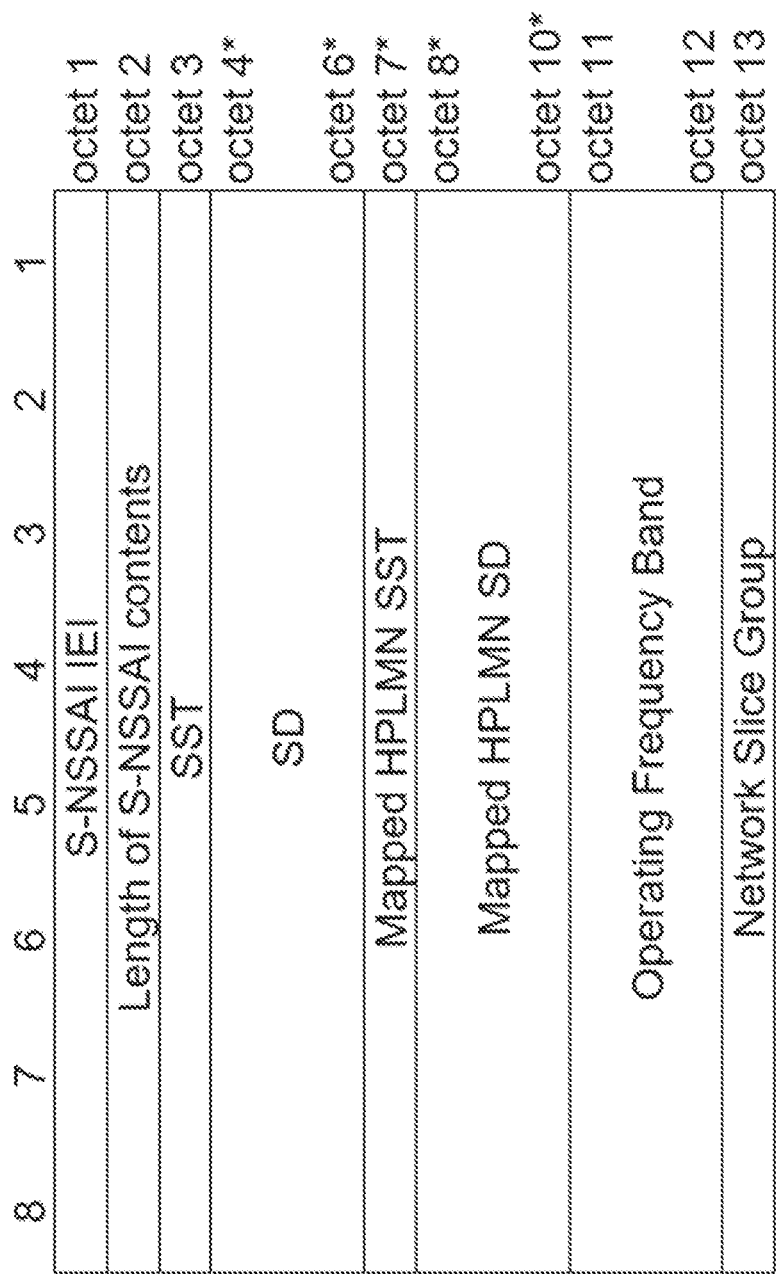
FIG. 10 illustrates an example enhanced S-NSSAI information element with OFB.

In the solution described in reference to FIG. 4 upon successful registration, the AMF sends to the UE, an Allowed NSSAI with operating frequency band information attached for each S-NSSAI. An S-NSSAI Information Element is described in section 9.11.2.8 of TS 24.501. FIG. 10 shows the S-NSSAI Information Element enhanced with two octets for Operating Frequency Band (OFB) information. It defines operating frequency band that the S-NSSAI shall be available on to the UE. FIG. 10 depicts that OFB that may be included from octet 11 to octet 12. Two octets are added to encode uplink and downlink operating bands in the S-NSSAI Information Element (IE). However, alternatively, the operating band information may be encoded by sharing the existing limit of octets (e.g., current S-NSSAI IE size). Additionally, multiple Operating Frequency Band information elements can be provided to the UE and each OFB information element can be associated with location information where the OFB information should be considered valid (in the PLMN that is associated with the S-NSSAI). Examples of Location Information are Registration Areas, Tracking Areas, and Cell Identifiers.

The UE may use the OFB information elements to determine, based on what services it wants to access, what operating frequency bands to use. For example, if the UE is not using Dual Connectivity, it may use this information to determine what cell to connect to. If the UE is using dual connectivity, it may use this information to determine what primary cell and what secondary cell to connect to.

Table 11 of the Appendix herein depicts details about S-NSSAI Information Element updated with Operating Frequency band information.

Operating Frequency Band Handover for Available Slices

For a UE that is camped in a cell, the Allowed NSSAI received by the UE in a Registration Accept message shall only contain a set of S-NSSAIs that are all available in the current operating frequency band. The scheme by which a UE can only access the network slices if the slices are available in UE's current OFB can be referred to as UE-OFB policy. However, there could be a scenario where the UE might request slices that may not be all available in the UE's current OFB. In such a case, the Registration Request may be rejected by the network (e.g., by the AMF) with a cause code. The cause code in the Registration Reject message may provide the reason for rejection and further information to the UE or to the RAN node about the OFBs where all the requested slices are available triggering the UE to move to a different operating frequency band, where all the S-NSSAIs from the Requested NSSAI are available. OFB handover during a registration procedure is described in FIG. 17.

In Step 0, the MNO may allocate operating bands (e.g. n1, n7, n12 etc.) as defined in TS 38.101-1 and 38.101-2 and assign them to S-NSSAI(s) as part of UE Access and Mobility Subscription at the UDM/UDR. This may include RFSP Index configuration.

In Step 1, the UE sends a Registration Request to the AMF via the access network. The request includes a Requested NSSAI. In the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. The UE includes the Default Configured NSSAI Indication if the UE is using a Default Configured NSSAI.

In addition, the UE may also indicate to the AMF the OFB's it supports. This includes the OFB that UE is currently using. The UE may also include in the request the slice priority with Registration Request message. Additionally, such indication may include an indication of its OFB preferences e.g., its preferred OFBs among the OFBs communicated to the AMF. The UE may also indicate to the AMF, one or more of the following:

First, V2X OFBs, V2X preferred OFBs, V2X operating bands for concurrent Uu & PC5 based operation.

Second, OFBs for Intra-band carrier aggregation operation; UE's preferred OFBs for Intra-band carrier aggregation operation.

Third, OFBs for inter-band carrier aggregation operation; UE's preferred OFBs for inter-band carrier aggregation operation.

Fourth, OFBs for dual connectivity operation; UE's preferred OFBs for dual connectivity operation.

Fifth, OFBs for UL Multiple-Input Multiple-Output (MIMO); UE's preferred OFBs for UL MIMO.

Sixth, S-NSSAI preferences in priority order; the UE may indicate which S-NSSAIs are mandatory for the current OFB to assist the AMF in accepting or rejecting the Registration Request.

Alternatively, when the RAN node forwards the Registration Request to the AMF in an N2 message, the RAN node may indicate to the AMF what operating band the UE is using. This indication would be included as part of the N2 message. Additionally, the indication may include any of the OFBs indication options described herein (e.g., if the OFB indication was sent to the RAN node in an RRC message).

In Step 2, the AMF may retrieve the Access and Mobility Subscription data using Nudm_SDM_Get. This requires that the UDM may retrieve this information from UDR by Nudr_DM_Query. This includes the operating bands and corresponding S-NSSAIs relation and RFSP Index information.

The AMF creates a UE context for the UE after getting the Access and Mobility Subscription data from the UDM.

Mobility Restrictions consists of RAT restriction, Forbidden Area, Service Area Restrictions, Core Network type restriction and Closed Access Group information as described in TS 23.501 clause 5.3.4.1 [1], wherein, RAT restrictions define the 3GPP radio access technologies that a UE is not allowed to access in a PLMN. In a restricted RAT, a UE is not permitted access to the network for this PLMN depending on the UE subscription, e.g., the UE's subscription is used by the network to determine whether the UE is allowed access or not allowed access. RAT Restrictions may be enhanced so that it is indicated per S-NSSAI, in other words, certain slices might not be accessible via certain RATS. In this solution, it is assumed a mapping is maintained in the core network between S-NSSAI and OFBs or OFBs options as described herein. The core network for e.g. AMF uses the OFB information received from the UE as an input for the selection of the S-NSSAI and determination for RAT restriction. Furthermore, in an alternative embodiment, the RAT restrictions may be enhanced so that it is indicated per combination of S-NSSAI and OFBs, wherein the OFBs indications may include OFBs indication options described herein including V2X related OFB indication options, for example CA carrier aggregation (CA) OFB options or dual connectivity OFB options.

In Step 3, the AMF enforces UE-OFB policy. Based on the UE subscription information, OFBs or OFB's options supported by UE (received in Step 1), and the number of S-NSSAIs from within the Requested NSSAI that may be accessible via the UE's current OFB, the AMF may identify that not all S-NSSAIs in the Requested NSSAI are available in the UE's current operating frequency band.

In addition, the AMF may be able to identify the OFBs or OFBs including OFB options as described herein where all of the S-NSSAIs from Requested NSSAI are accessible by the TIE. In such a case, the AMF may reject the Registration Request from the UE with a cause code and indicate the OFBs to the UE where all of the S-NSSAIs from Requested NSSAI are accessible by the UE.

In Step 4, the AMF may send the Registration Reject message back to the UE with a cause code. The cause code may indicate to the UE that the Registration Request was rejected because the requested slices are not all available in the UE's current OFB. In addition, it may also contain the UE supported OFB(s) or OFB(s) including OFB options as described herein, from where all the requested slices may be accessible suggesting UE to re-send a registration request from another OFB.

If the IT supports multiple OFBs but the requested slices are not all available in any OFBs that UE supports, then the AMF rejects the UE Registration Request or Registration Update request with a cause code. The cause code indicates that the requested slices are not available in any of the OFBs. The cause code may demand the 5GS to adapt the following cases.

In case 1, the cause code may list the OFBs where most of the S-NSSAIs from Requested NSSAI are accessible by the UE. In addition, the cause code may also indicate the number of allowed S-NSSAIs that the AMF can send in an Allowed NSSAI.

In case 2, the cause code may include suggestions, wherein most S-NSSAIs from the Requested NSSAI may be accessible. For instance, a UE may support three OFBs (e.g. OFB1, OFB2 and OFB3). The AMF may find that only 4 out of 8 S-NSSAIs are accessible in the UE's current OFB (e.g., OFB1) and may also have found that OFB2 and OFB3 support 6 and 7 S-NSSAIs, respectively, suggesting UE to choose if it wants to reseed registration in another OFB.

In case 3, the cause code may include OFBs suggestion where all slices are available based on the priority of slices for that UE. The ranks of slices may be defined based on the frequency range (FR), OFBs, UE types, services offered by the slice, slice type etc. For instance, there may be different types of UEs (e.g. a mobile phone, autonomous vehicle, connected-only car, a fixed IoT device etc.). These UEs may have different services they usually demand, which for example require certain uplink or downlink data rate and QoS and, may have an SLA with the MNOs. If some of these UEs have access to multiple slices, for each UE, the priority of a slice may be different than other UEs. For instance, an autonomous vehicular UE may have URLLC slice on top, eMBB slice second, and IoT slice third in the list. The priority may not be same for a mobile phone, which may have eMBB on top of its list and URLLC slice as second. In addition, an FR and corresponding OFBs may be more suitable for one form of traffic (e.g. lowest latency traffic). When the AMF sends a Registration Reject message the cause code may include OFBs ranked based on the priority of the slices for a UE, although all the slices are available in that OFB. This allows the UE to choose more suitable OFB to re-send a Registration Request. This case may also be suitable when the AMF can suggest the UE with OFBs, where most of the slices are available. For example, in a case when an eMBB slice is not available in an OFB, but URLLC is and vice versa in another OFB, the UE may choose to send its Registration Request to an OFB based on its own service/slice priority.

If the UE indicated only a limited number of OFBs when it submitted the OFBs it supported (in Step 1) or if the network supported only a limited number of the OFBs out of all the OFBs the UE had submitted (in Step 1) and, if the S-NSSAIs in Requested NSSAI are not all available in the UE's current frequency band, the network may send a Registration Reject message back to the UE with a cause code indicating that not all slices are available in the UE's OFB.

In another alternative, if none of the OFBs supported all the UE requested slices, but UE's current OFB supports some requested slices, then the AMF may respond with a Registration Accept message with Allowed. NSSAI that may only contain the slices that are supported in UE's current OFB and, include rest of the S-NSSAIs in the Rejected NSSAI with a cause code. The cause code indicates that the slices were rejected because they are not supported in the current OFB. The cause code may also indicate the OFBs where each slice is available.

In Step 5, based on the information in the cause code received from the network, UE may choose the suggested OFB. The UE may initiate a new Registration Request using a new suggested OFB. This may involve sending the request via a different RAN node than UE's initial Registration Request in Step 1. The AMY may assist the RAN node and the UE to make Registration Request in a different RAN node. The AMF is aware of the OFB's where requested slices are available. Based on the supported. UE OFBs submitted in Step 1, and the AMF's knowledge about the OFBs supported by the RAN nodes, the ANTE may send the cause code indicating the change of OFB and hence, the RAN node. Alternatively, first RAN node (RAN node-1) may trigger inter-frequency cell change to second RAN node (RAN node-2), which supports Requested NSSAIs and is in UE's location/TA.

In Step 6, based on the UE subscription information, UE's indication received in Step 1) about the OFBs it supports, UE's current OFB, and the number and priority of S-NS-SAIs from within the Requested NSSAI, the AMF may identify that S-NSSAIs in the Requested NSSAI are all available in UE's current operating band.

Note that UE may not be allowed to update its Allowed NSSAI until it has successfully switched to a new operating band.

In Step 7, the AMF sends the Registration Accept/Reject message to the UE via RAN. The Registration Accept may include the Allowed NSSAI with each S-NSSAI and its corresponding operating band information, Mapping of Allowed NSSAI with each S-NSSAI and its corresponding operating band. The S-NSSAIs in the Allowed NSSAI and S-NSSAIs in the Mapping of Allowed NSSAI are all available in the UE's current operating frequency band.

Note that during a Registration Update procedure, UE may only want to update its Allowed NSSAI if all the slices in the request will be allowed in the UE's current operating band. The UE may indicate, in the Registration Request, that it only wants to update its Allowed NSSAI if all of the S-NSSAIs in the Requested NSSAI are allowed.

Registration Update with Allowed NSSAI

Figure 18:
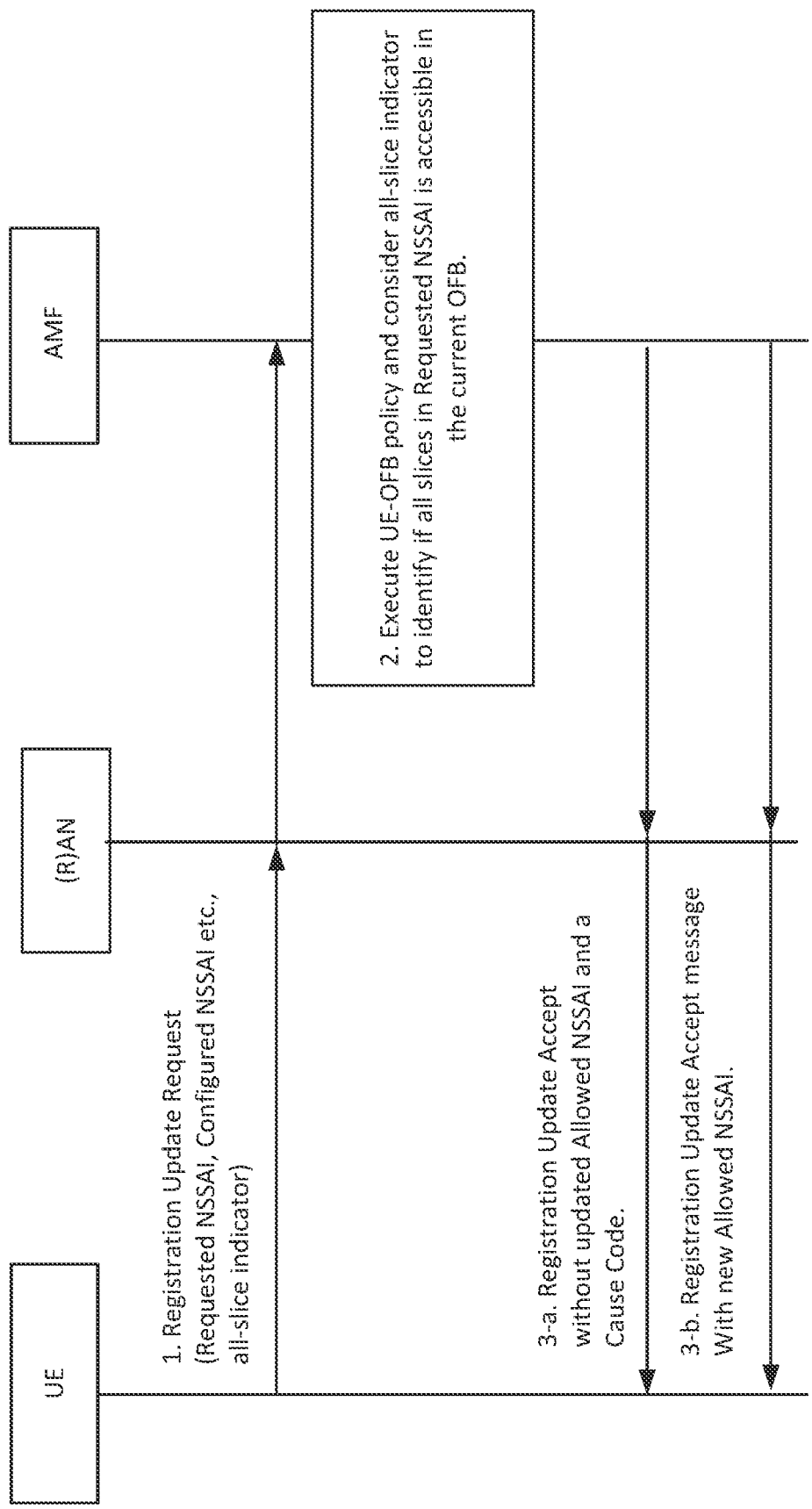
FIG. 18 is a call flow of an example of Registration Update with allowed slices in a UE's current OFB.

The General Registration or Registration Update request may be enhanced wherein, the UE may send an indicator to the network to inform that it wants to update its Allowed NSSAI only if all of the slices in the request will be allowed in the Ur s current operating band. If not, UE may like to keep its current Allowed NSSAI. This scenario is described in the FIG. 18 as follows.

In Step 1, The UE sends a Registration or Registration Update Request wherein it may include a Requested NSSAI. In the request message, the UE may also include an indicator called an all-slice indicator, which informs the network about UE's desire to update its Allowed NSSAI only if all the S-NSSAIs in the request will be allowed in current operating band and if not, the UE doesn't want to update the Allowed NSSAI.

Alternatively, the all-slice indicator may signify the UE's desire to stay in the current OFB only if other OFBs do not support all the requested slices.

In Step 2, the AMF enforces UE-OFB policy wherein it checks if all the requested slices are available in the UE's current OFB. In addition, the AMF also considers the all-slice indicator from the UE. The AMF may have two alternative decisions based on the outcome of the UE-OFB policy and all-slice indicator.

In Step 3-*a*, if the AMF encounters that one or more of the requested slices in the Registration Update Request is not available in the UE's current OFB and in addition, detects an all-slice indicator from the UE, then the AMF will send back a Registration Update Accept message without updating Allowed. NSSAI and the Registration Update Accept message will include a cause code or some other indication to indicate to the UE that the UE should not update its Allowed NSSAI. The cause code or indication may indicate that the all-slice indicator was not satisfied. This Registration Update may update everything but Allowed NSSAI or may reject the Registration Update request.

In Step 3-*b*, if the AMF encounters that the slices in the Requested NSSAI are all available in the UE's current OFB and detects all-slice indicator from the UE, then the AMF will send back a Registration Update Accept message with new set of Allowed NSSAI.

Instead of an including an all-slice indicator in the Registration Request, the UE may include its current Allowed NSSAI in the Registration Request. The presence of the Allowed NSSAI in the Registration Request may serve an all-slice indicator.

Tracking Area/Registration Area with Available Slices in All the Cells

Figure 19:
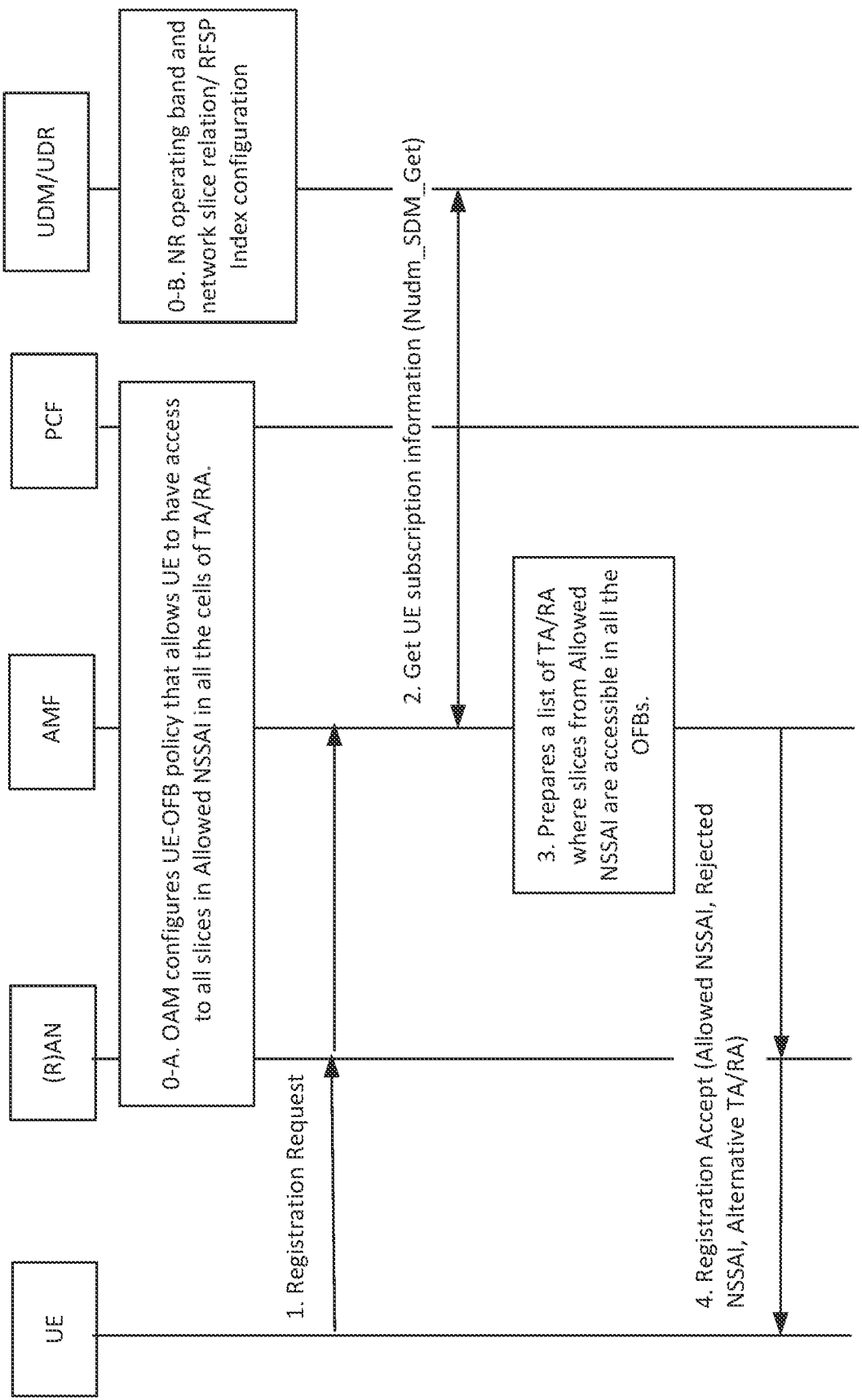
FIG. 19 is a call flow of an example of UE receiving TA/RA information from the network where all slices are available in all the OFBs.

In the cases where UE can access all the slices in any of its OFBs, it may be convenient for UE to have a prior knowledge of TA/RA where all the slices in UE's Allowed NSSAI may be available. This information may facilitate UE to move smoothly when it passes through various TA/RA(s). The information regarding where such TA/RA are available may be configured at the network and the network may deliver that information to the UE during Registration, Registration Update process or UE configuration update process as depicted in FIG. 19.

In Step 0-A, an Operations, Administration and Maintenance (OAM) entity may configure the PCF with UE-OFB policy that allows all the slices to be accessed via all the cells of a tracking area/registration area. This UE-OFB policy may be sent to the AMF where it is later enforced. In addition, the OFB to slice relation may be sent to the RAN node along with RAN resource allocation information such as RFSP index.

In Step 0-B, the UDM/UDR may be configured with list of TA/RA information for UEs. The list of TA/RA information specifies that the Tracking Area Identifier (TAID) for each TA, where UE can have access to Allowed Slices in all the OFBs.

In Step 1, UE sends a Registration or a Registration Update Request to the network via RAN. In addition, the UE may also indicate to the AMF about the OFBs the UE supports. This includes the OFB that UE is currently using.

In Step 2, the AMF may retrieve the Access and Mobility Subscription data using Nudm_SDM_Get. This requires that the UDM may retrieve this information from UDR by Nudr_DM_Query. This includes the operating bands and corresponding S-NSSAIs relation and RFSP Index information.

The AMF creates a UE context for the UE after getting the Access and Mobility Subscription data from the UDM.

In Step 3, the AMF inspects the Requested NSSAI, the OFBs the UE supports, the slices that are all available in all the cells of TA/RA including the current TA/RA, identifies UE's Allowed NSSAI, identifies the TA/RA where UR-supported OFBs are available and, determines the Allowed NSSAI along with a list of TA/RA where all the slices of the Allowed NSSAI are available.

In Step 4, the AMF sends a Registration Accept message with Allowed NSSAI and the Rejected NSSAI, if any. In addition, the AMF also delivers a list of TAIDs for all the TAs in RAs where all the slices in the Allowed NSSAI are available.

Alternatively, the UE may send a NAS message to the network requesting a list of TA/RA where all the slices in the Allowed NSSAI are available in all the cells of that TA/RA. This NAS message request may be triggered by a change in the UE's state (e.g., the UE's location) such as some point of time when it starts moving or at a point where UE changes its TA.

In another alternative, a request for a list of TA/RA where all the slices in the Allowed NSSAI are available in all its cells may be included in a NAS message such as new service request.

In yet another alternative, a list of TA/RA, where all the slices in the Allowed NSSAI are available in all the cells, may be delivered to the UE based on the UE mobility information that the network acquires from the UE. For example, if the UE is moving in a certain direction with a certain speed, the network may be able to detect UE's movement, and using NWDAF, the network may be able to predict the UE's probability to change UE's TA/RA in the geographical region where UE may be heading. This may trigger the network to send a Registration Update, UE Configuration Update or simply a NAS message, which may contain a list of TA/RA where Allowed NSSAI is available in all the cells.

Solution Based on Alternative NSSAIs Provisioning at the UE

Figure 5A:
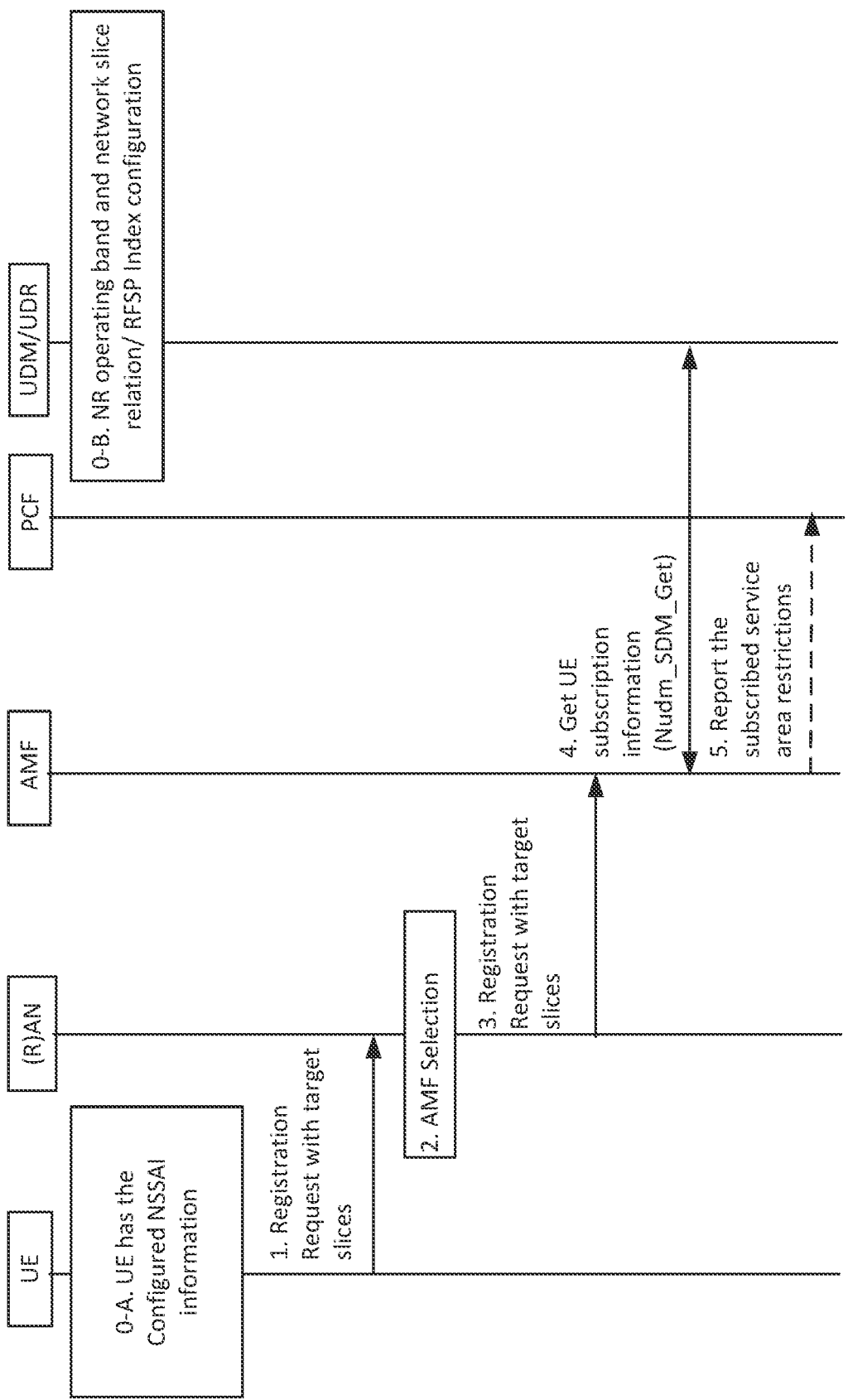
FIGS. 5A and 5B show a call flow of an example of providing a UE with alternative slices and corresponding frequency bands.
Figure 5B:
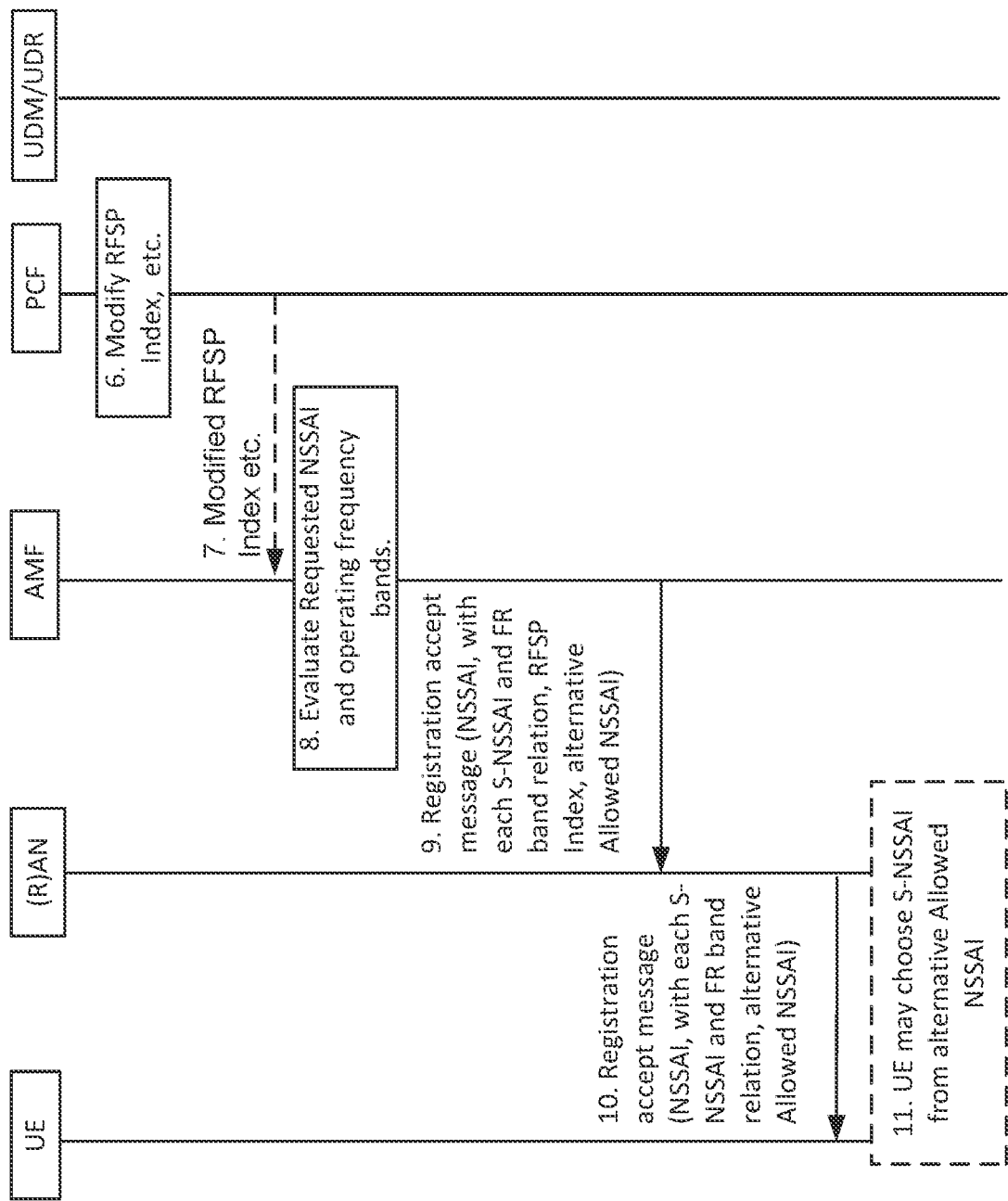

The example solution shown in FIGS. 5A and 5B relies on the network to detect that the UE has requested to register to slices that are not available in the same frequency bands. The network (AMF), then determines which slices take precedence and should be included in the Allowed NSSAI, as UE may have immediate access to the slice(s) that are received as Allowed NSSAI with current OFB. And although UE may be authorized access to network slices, the ones with lower priority may not be included in the Allowed NSSAI because UE may only access certain OFB at a time. Furthermore, the AMF provide the UE with one or more alternative NSSAI's as a way of indicating to the UE what other NSSAIs would have been allowed had they been requested. The UE can then determine to request a different NSSAI if it decides that the S-NSSAIs that the network provided in the NSSAI are not the highest priority.

FIGS. 5A and 5B illustrate providing a UE with alternative slices and corresponding frequency bands. In step 0-A of FIG. 5A, the UE may have a Configured NSSAI for the PLMN and Allowed NSSAI for the PLMN. Hence, HE is able to request registration targeting specific slices in the NSSAI.

In step 0-B, the MNO may allocate operating bands (e.g., n1, n7, n12 etc.) as defined in TS 38.101-1, and assign them to S-NSSAI(s) as part of UE Access and Mobility Subscription at the UDM/UDR. This may include RFSP Index configuration.

In step 1, the UE sends a Registration Request to the network (AMF) via RAN. UE Registration Request may provide to the network in the AS and the NAS layer a Requested NSSAI containing the S-NSSAI(s) corresponding to the slice(s) to which the UE wishes to register.

The Requested NSSAI may be the Allowed-NSSAI for the Access Type over which the Requested NSSAI is sent, or a subset thereof, plus one or more S-NSSAIs from the Configured-NSSAI not yet in the Allowed NSSAI for the Access Type.

The Registration Request may further indicate UE Capabilities to the AMF, including an indication of what frequency bands the UE is capable of operating in and an indication of whether the UE is capable of simultaneously operating in more than one frequency band.

In step 2, the RAN selects the AMF as described in TS 23.501, clause 6.3.5.

In step 3, the RAN sends to the AMF an N2 message (N2 parameters, Registration Request and UE Policy Container). The N2 parameters include the Selected ID (or PLMN ID and NID), Location Information and Cell Identity related to the cell in which the UE is camping, and a UE Context Request which indicates that a UE context including security information needs to be setup at the NG-RAN.

The call flow of FIG. 5A continues in FIG. 5B. Steps 4-7 of FIGS. 5A and 5B are similar to Steps 4-7 in FIG. 4.

In step 8 of FIG. 5B, the AMF may evaluate the Registration Request. The AMF may find that the UE is trying to register to network slices that have different OFBs. Hence, AMF may not be able to redirect the UE to a frequency that works for all the S-NSSAIs in the NSSAI.

Although, the network may be able to serve connections in wide variety of frequency bands that direct UE to different network slices, it may only allow some of the S-NSSAIs in the Allowed NSSAI.

Therefore, the AMF may be able to select a higher priority network slice's S-NSSAI and corresponding operating frequency band from the Requested NSSAI and send it back to the UE as Allowed NSSAI. In addition, the AMF may send Alternative Allowed NSSAI(s), which contains other combinations of S-NSSAIs that would be allowed if they were requested by the UE. The presence of an Alternative Allowed NSSAI is an indication to the UE that the network did not include all of the S-NSSAI's from the Requested NSSAI in the Allowed NSSAI because it cannot allow the UE to simultaneously connect to all of the S-NSSAIs in the Requested NSSAI and an indication that the network determine which S-NSSAI(s) in the Requested NSSAI should take precedence. The AMF may also provide an indication of why S-NSSAIs from the Request NSSAI were not present in the Allowed NSSAI (e.g., because some S-NSSAIs only available on mutually exclusive frequencies, because some S-NSSAIs are not allowed to be simultaneously accessed, etc.). The Allowed S-NSSAI and Alternative Allowed NSSAI may further indicate the operating frequency band(s) for (each) S-NSSAI.

In step 9 of FIG. 5B, the AMF sends a Registration Accept message to the UE via RAN node. The AMF may send Allowed NSSAI with corresponding operating frequency band for (each) S-NSSAI and alternative Allowed NSSAI with corresponding operating frequency band for each S-NSSAI. The message may include corresponding RFSP Index, RAT restrictions, service area restrictions and UE-AMBR in the Registration Accept message for the RAN node in N2 message.

In step 10, the RAN node may forward Registration Accept message to the UE which contains Allowed NSSAI and corresponding operating frequency band(s). It also contains Alternative Allowed NSSAI and operating frequency band information for each S-NSSAI in the NSSAI.

In step 11, the UE may choose to use the Allowed NSSAI or send a Registration Update request with a new Requested NSSAI that is formed based on the information that was provided in the Registration Accept message of step 10 (e.g., an alternative NSSAI).

URSP Rules Enhancement

As discussed, a UE may receive Allowed NSSAI and OFBs for each S-NSSAIs. Alternatively, or additionally, URSP rules may be enhanced to steer the UE towards a proper S-NSSAI Frequency Band combination. With the Registration Accept message, the RAN node is also provided with several important pieces of information such as RFSP index, RAT restrictions, Forbidden Area, Service Area Restrictions, Core Network type restriction and Closed Access Group information. RFSP index and corresponding frequency spectrum information allows RAN to manage resources suitable for the UE. The RAN node provisions the UE with operating frequency band information according to RFSP index received.

When a UE attempts to connect to a slice in a network, different network slices might only be accessible via specific OFBs. Hence, a UE must make sure to use correct frequency band(s) to connect to the network slice. In addition, a UE may need to be camped on a proper PLMN for which, frequency bands and corresponding slices accessible through those bands are configured so that UEs could have access. Therefore, UE route selection policy may be enhanced to indicate a relation among the PLMN where UE is camped, the slice(s) that UE is able to access and the operating frequency band that UE needs to use to reach the network slice.

This information may be configured in the URSP rules. Thus, the Route Selection Descriptor (RSD) part of the URSP rules presented in Table 4 of the Appendix may be enhanced by including operating frequency band and PLMN information as shown in Table 7 of the Appendix. In particular Table 4 is updated with two new RSD information elements, PLMN ID and OFB. Alternatively, the information may be included as part of the Route Selection Validation Criteria so that the UE will not attempt to establish the route unless the UE is camped in the indicated PLMN and on the indicated frequencies.

Having PLMN ID and OFB information along with a network slice information forms a relation between these three components of RSD. Having PLMN ID and Operating frequency band in the Route Selection Components can ensure that the UE moves to a desires PLMN/Frequency band combination, Having PLMN ID and OFB in the Route Selection Validation Criteria can be used to configure the UE to only attempt to establish the route if the UE is already camping in the PLMN and using the Frequency Band.

Frequency Band Redirection Using RRC Reconfiguration

When a UE attempts to register with a set of slices, the network (AMF) may detect that the UL is trying to register with slices that cannot be used in the same frequency. Therefore, the AMF is not able to redirect the UE to a single frequency that will work for all of the S-NSSAI's in the NSSAI. In other words, there is not a single RFSP index that can be used to access all S-NSSAIs. In this solution, the AMF considers the UE registered to all of the requested S-NSSAIs and gives the RAN multiple RFSP Indices and tells the RAN which S-NSSAI's can be used with each RFSP Index. The UE and RAN node then use RRC Messaging to coordinate movement between frequency bands depending on what S-NSSAI needs to be accessed.

Figure 6A:
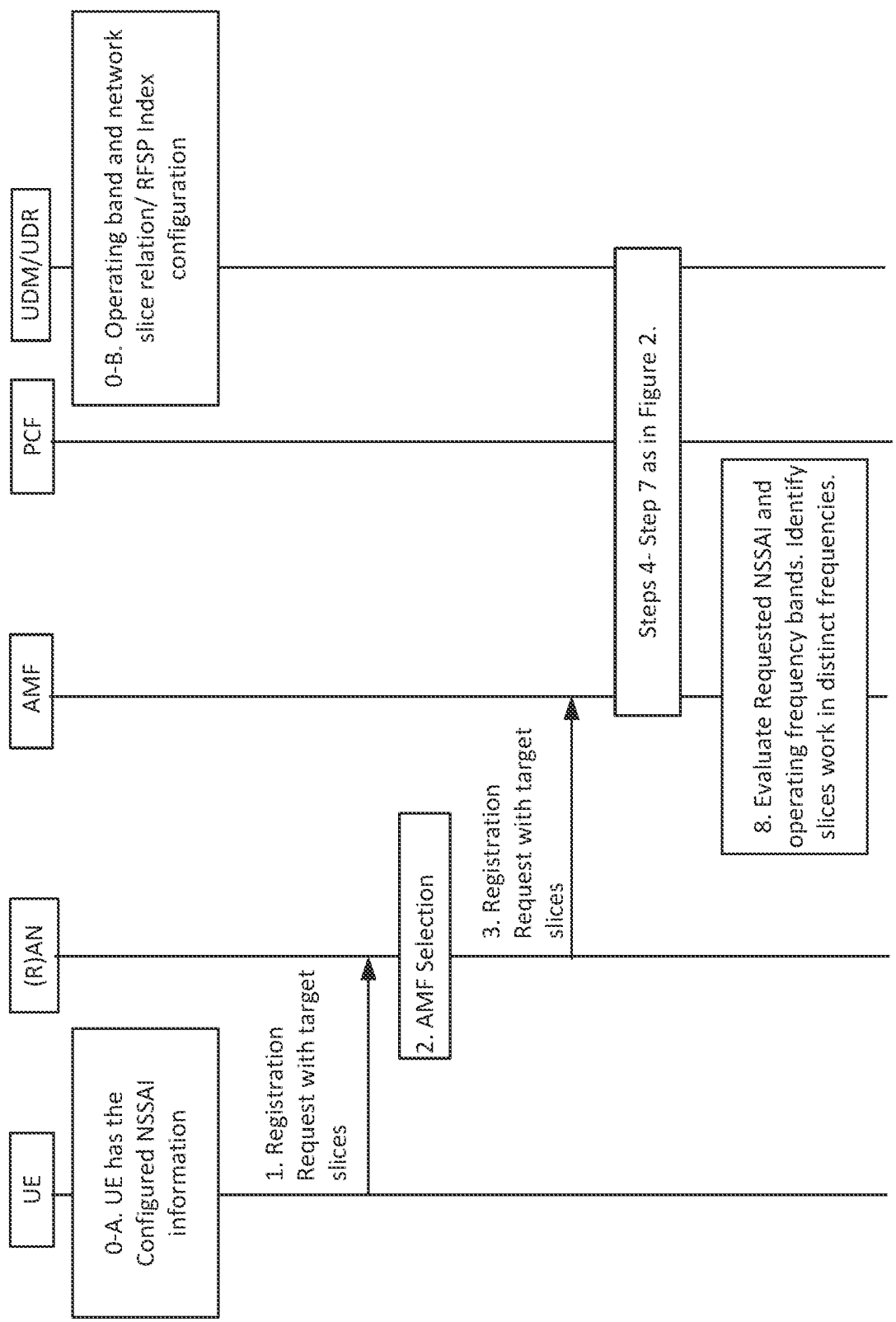
FIGS. 6A and 6B show a call flow of an example of frequency band redirection using RRC messaging.
Figure 6B:
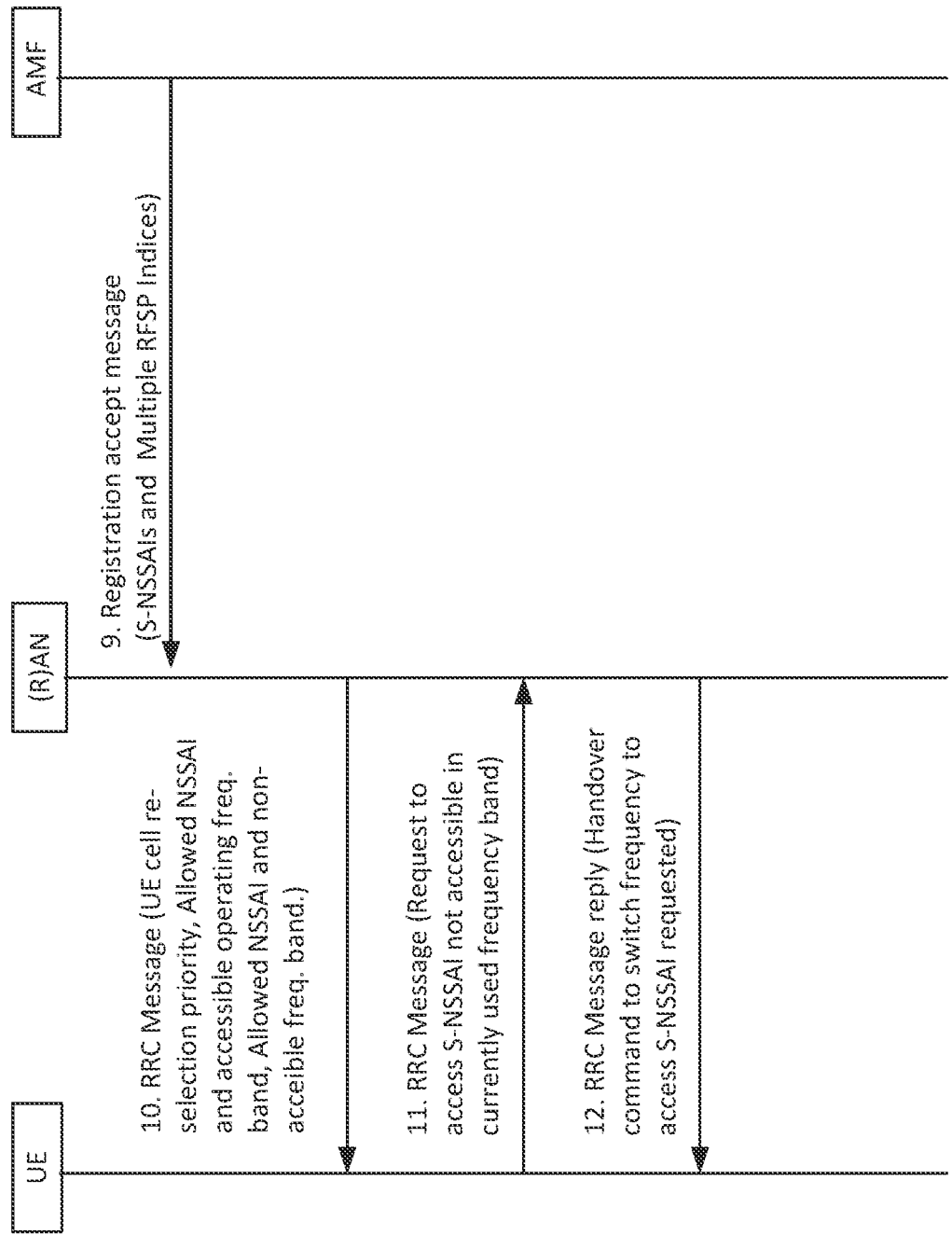

FIGS. 6A and 6B illustrate frequency hand redirection using RRC messaging. In step 0-A of FIG. 6A, the UE may have a Configured NSSAI for the PLMN and Allowed NSSAI for the PLMN, Hence, UE is able to request registration targeting specific slices in the NSSAI.

In step 0-B, the MNO may allocate operating bands (e.g., n1, n7, n12 etc.) as defined in TS 38.101-1, and assign them to S-NSSAI(s) as part of UE Access and Mobility Subscription at the UDM/UDR. This may include RFSP Index configuration.

In step 1, the UE sends a Registration Request to the network (AMF) via RAN. The UE Registration Request may provide to the network in the Access Stratum (AS) layer and NAS layer a Requested NSSAI containing the S-NSSAI(s) corresponding to the slice(s) to which the UE wishes to register.

The Requested NSSAI may be the Allowed-NSSAI for the Access Type over which the Requested NSSAI is sent, or a subset thereof, plus one or more S-NSSAIs from the Configured-NSSAI not yet in the Allowed NSSAI for the Access Type.

In step 2, the RAN selects the AMF as described in TS 23.501 clause 6.3.5.

In step 3, the RAN sends to the AMF an N2 message (N2 parameters, Registration Request and UE Policy Container). The N2 parameters include the Selected PLMN ID (or PLMN ID and MD), Location Information, and Cell Identity related to the cell in which the UE is camping on, and a UE Context Request which indicates that a UE context including security information needs to be setup at the NG-RAN.

Steps 4-7 of FIG. 6A are similar to Steps 4-7 in FIG. 4.

In step 8, the AMF may evaluate the Registration Request. The AMF may find that the UE is trying to register with network slices that have different OFBs. Hence, AMF may not be able to redirect the UE to frequency that works (e.g., pick an RFSP index) for all the S-NSSAIs in the NSSAI.

The AMF response to the RAN node may be enhanced to include multiple RFSP indices and S-NSSAI in the NSSAIs that will work with each index.

The call flow of FIG. 6A continues in FIG. 6B. In step 9 of FIG. 6B, the AMF provides multiple RFSP indices and the S-NSSAIs that can be accessed with each RFSP Index to the RAN.

In addition. The AMF may provide to the UE via RAN in the Registration Accept message, an Access Stratum Connection Establishment NSSAI inclusion Mode parameter, indicating whether and when the UE shall include NSSAI information in an RRC connection Establishment.

In step 10, the RAN node forwards the Registration Accept message. In the RRC Message to the UE it may, include multiple sets of UE specific cell reselection priorities to control idle mode camping. Each set of priorities is associated with one or more S-NSSAIs.

The message may indicate which S-NSSAI's in the Allowed NSSAI are accessible in the frequency band that the UE is currently using.

The message may indicate which S-NSSAI's in the Allowed NSSAI are not accessible in the frequency band that the UE is currently using.

In step 11, the UE sends an RRC message to the RAN node to indicate that it wants to access an S-NSSAI that is not accessible in the frequency band that the UE is currently using.

In step 12, the RAN node replies with an RRC Message that directs the UE with an OFB change command so that the UE will switch to a frequency that can be used to access the S-NSSAI.

Handling DL Raffle in a Second Network Slice with an Ongoing Session in a First Network Slice In some of the solutions described herein, the UE is allowed to register with slices that are only accessible via different frequency bands and the UE is further configured with information to know what frequency band(s) each slice is accessible from. A UE may also be connected to the network via frequency band #1 and downlink (DL) data comes to the network for the UE at a slice (S-NSSAI) that is only accessible via frequency band #2. The network may handle this scenario by sending the UE a NAS Notification to the UE that includes the OFBs that the UE should switch to in order to receive the DL data. Alternatively, the NAS Notification may indicate the S-NSSAI or PDU Session ID for which DL data is available and the UE may derive the associated OFB based on previously configured information. How the UE is configured with this information is described in reference to FIG. 4.

When the UE receives a NAS Notification that indicates that the UE needs to switch to a different frequency band to receive downlink data, the UE may connect to the network via the different frequency band and send a UE Triggered Service Request to the network with the list of allowed PDU Sessions that, according to UE policies and whether the S-NSSAIs of these PDU Sessions are within the Allowed NSSAI for 3GPP access, can be re-activated in the frequency band.

As described herein, before UE connects to the different frequency band, the UE may send an RRC message to the RAN node to indicate that it wants to access an S-NSSAI that is not accessible in the frequency band that the UE is currently using. The RAN node may reply with an RRC Message that directs the UE with an OFB change command so that the UE will switch to a frequency that can be used to access the S-NSSAI.

Restricting Simultaneous Network Slice Access During Registration

A UE is configured with one or more Configured NSSAI's; one of the Configured NSSAI's may be a default NSSAI. For each S-NSSAI in a Configured NSSAI, the configuration may include a Simultaneous Slice Access Capability (SSAC) indicator. The SSAC indicator may indicate how the S-NSSAI is used. For example, the SSAC indicator may indicate that S-NSSAI may be used: with any Network Slice; with any other Network Slice; only with Network Slices that have the same SST value; not with Network Slices that have the same SST value; only with Network Slices that have the same SD value; not with Network Slices that have the same SD value; and/or only with Network Slices in the same Network Slice Group (NSG).

An SSAC Indicator that is associated with each S-NSSAI may be configured by network functions such as the AMF, UDM/UDR, and PCF via the OAM system.

When a UE registers with the network, it may indicate to the network whether it supports (e.g., understands) the SSAC Indicator using a SSAC Support Indicator (SSD. The network may use SSI to determine whether or not SSAC information should be included in the Configured NSSAI.

Figure 11:
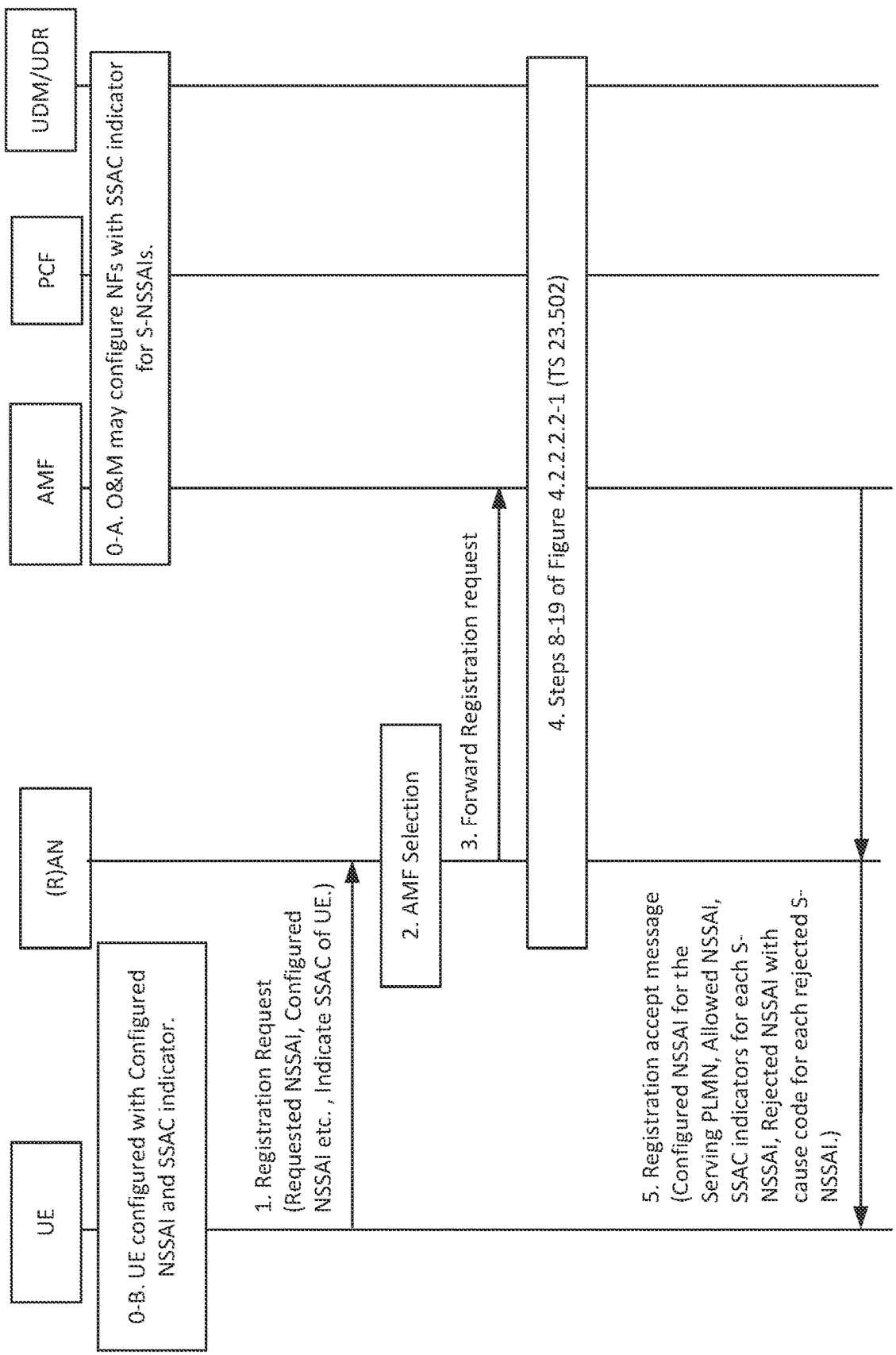
FIG. 11 is a call flow of an example of delivering simultaneous slice access policies indicator to the UE.

FIG. 11 shows how the UE may indicate its support for SSAC and how the network may deliver SSAC indicators to the UE. FIG. 11 highlights the enhancements to the UE Registration Procedures that are described in TS 23.502.

In Step 0-A, as described in reference to FIG. 11, the OAM system may be used to configure Network Function (NFs) such as the AMF, UDM/UDR, and PCF with an SSAC indicator for each S-NSSAI. The OAM may configure the SSAC indicator for each S-NSSAI within the UE Subscription where Subscribed NSSAI are included, PCF may be configured or updated with the policies for the UE that may include the Allowed NSSAI with the SSAC indicator for each S-NSSAI, or AMF may be configured or may receive SSAC indicator for S-NSSAIs from UDM or PCF. Furthermore, the SSAC indicator may be provisioned per S-NSSAI per UE. For example, a per UE configuration may be desirable in scenarios where it is desirable to only restrict some UE's when they access a slice and not restrict other UEs.

In Step 0-B, as described in reference to FIG. 11, the UE may be configured with one or more Configured NSSAI's and each S-NSSAI in each Configured NSSAI may include an SSAC indicator.

In Step 1, the UE sends a registration request to the network. The Registration Request may include Requested NSSAI, Mapping of Requested NSSAI, and Default Configured NSSAI Indication. The UE includes the Default Configured NSSAI Indication if the UE is using a Default Configured NSSAI, as defined in TS 23.501. UE may indicate using a SSAI in the registration message that it supports the SSAC Indicator. SSI maybe a single bit indication, or the UE may indicate its support by including its Configured SSAC indicator for each S-NSSAI in the Requested NSSAI.

In Step 2, RAN selects the AMF as described in TS 23.501, clause 6.3.5.

In Step 3, RAN sends to the AMF an N2 message (N2 parameters, Registration Request and UE Policy Container). The N2 parameters include the Selected PLMN ID (or PLMN ID and NID), Location Information, and Cell Identity related to the cell in which the UE is camping on, UE Context Request which indicates that a UE context including security information needs to be setup at the NG-RAN.

Step 4 is similar to Steps 8-19 of FIG. 4.2.2.2.2-1 of TS 23.502.

In Step 5, AMF may send a Registration Accept message to the UE via RAN. In the Registration Accept message AMF may include the Allowed NSSAI, Mapping of Allowed NSSAI, Configured NSSAI for the Serving PLMN, Mapping of Configured NSSAI, and rejected S-NSSAIs. For each S-NSSAI in Configured NSSAI for the Serving PLMN the AMF may include an SSAC Indicator. Optionally, the SSAC Indicator may also be included for each S-NSSAI in the Allowed NSSAI, Mapping of Allowed NSSAI, Mapping of Configured NSSAI, The absence of an SSAC Indicator may serve as a sign that there are no restrictions associated with the S-NSSAI in terms of simultaneous use with other network slices. Each rejected S-NSSAI may be associated with a cause value. The AMF may set the cause value such that it indicates to the UE that the S-NSSAI was rejected because the SSAC configuration that is associated with the S-NSSAI is not compatible with one of the S-NSSAI's in the allowed S-NSSAI. If the UE did not indicate its support for SSAC in the Registration Request message, then the AMF may not provide any SSAC indicators to the UE. If the network rejected any S-NSSAI's because of simultaneous use restrictions and the UE did not indicate support for SSAC, then the cause code that is associated with each rejected S-NSSAI may be a genetic cause code such as Cause #62—No network slices available.

Figure 12:
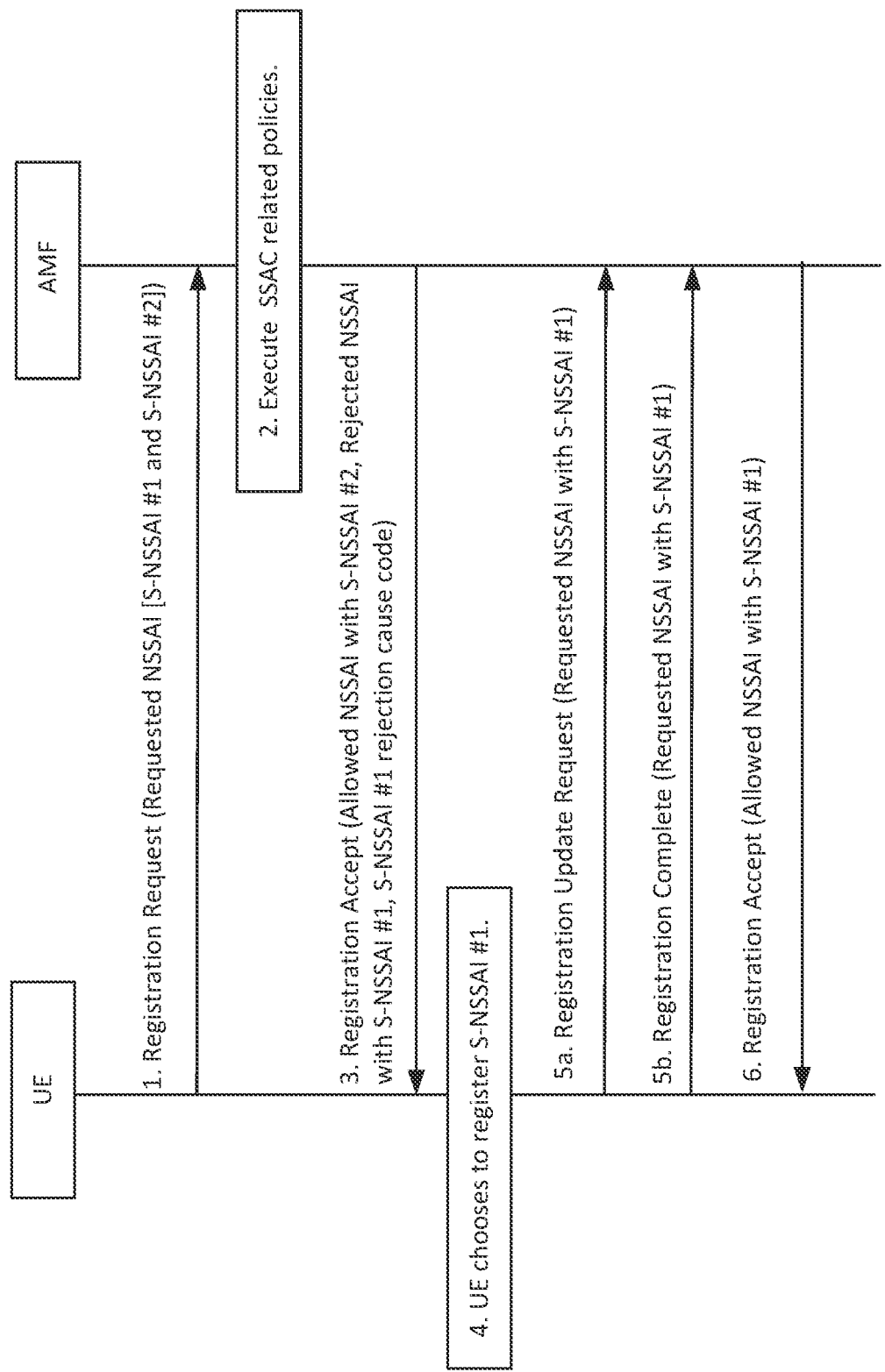
FIG. 12 is a call flow of an example of re-registering to desired slice after rejection due to simultaneous slice access policies.

As described in FIG. 11, the AMF may inform the UE, in the Registration Accept message, that an S-NSSAI (S-NSSAI #1) was rejected because S-NSSAI #1's SSAC is incompatible with the SSAC of a second S-NSSAI (S-NSSAI #2) which is in the Allowed NSSAI. When this occurs, the UE may subsequently determine that it would rather be registered to S-NSSAI #1 than to S-NSSAI #2. In such a scenario, the UE may subsequently send a second Registration Request message that includes the S-NSSAI #1 in the Requested NSSAI and does not include the S-NSSAI #2 in the Requested NSSAI. The subsequent Registration Accept message may include the S-NSSAI #2 in the Allowed NSSAI and not include S-NSSAI #1 in the Allowed NSSAI. This procedure is depicted in the FIG. 12.

In Step 1, UE sends a Registration Request to the network with Requested NSSAI. The Requested NSSAI may include at least two S-NSSAIs, S-NSSAI #1 and S-NSSAI #2.

In Step 2, AMF may enforce the SSAC related policies to address the UE's slice access request. AMF identifies that S-NSSAI #1 and S-NSSAI #2 may not be accessed together by the UE. Hence, the AMF selects S-NSSAI #2 for Allowed NSSAI and rejects S-NSSAI #1.

In Step 3, AMF sends Registration Accept message to the UE with Allowed NSSAI with S-NSSAI #2 and Rejected NSSAI with S-NSSAI #1 and the rejection cause code indicating S-NSSAI #1's simultaneous access incompatibility with S-NSSAI #2.

In Step 4, UE identifies the rejection cause code for S-NSSAI #1. However, UE chooses to access S-NSSAI #1.

In Step 5a, UE sends a Registration Update Request with S-NSSAI #1 in its Requested NSSAI in a subsequent request.

In Step 5b, alternatively, the UE may indicate preference by including S-NSSAI #1 within Requested NSSAI in the Registration Complete message returned to the AMF after receiving the Registration Accept message.

In Step 6, AMF accepts the Registration Request for S-NSSAI #1. At this point S-NSSAI #2 is de-registered for the UE.

Implementing SSAP and UE-OFB Policy Together During Registration Procedure

An AMF may implement SSAP to check if two or more slices are simultaneously accessible by the UE. However, the UE-OFB policy may also act as a constraint for UE's simultaneous access of two or more slices. The UE-OFB policy ensures that all the requested slices are available in a common operating band. In addition, the common frequency band must be the UE's current operating frequency band. An AMF may implement SSAP together with the UE-OFB policy, as illustrated in the example of FIG. 20.

Figure 17:
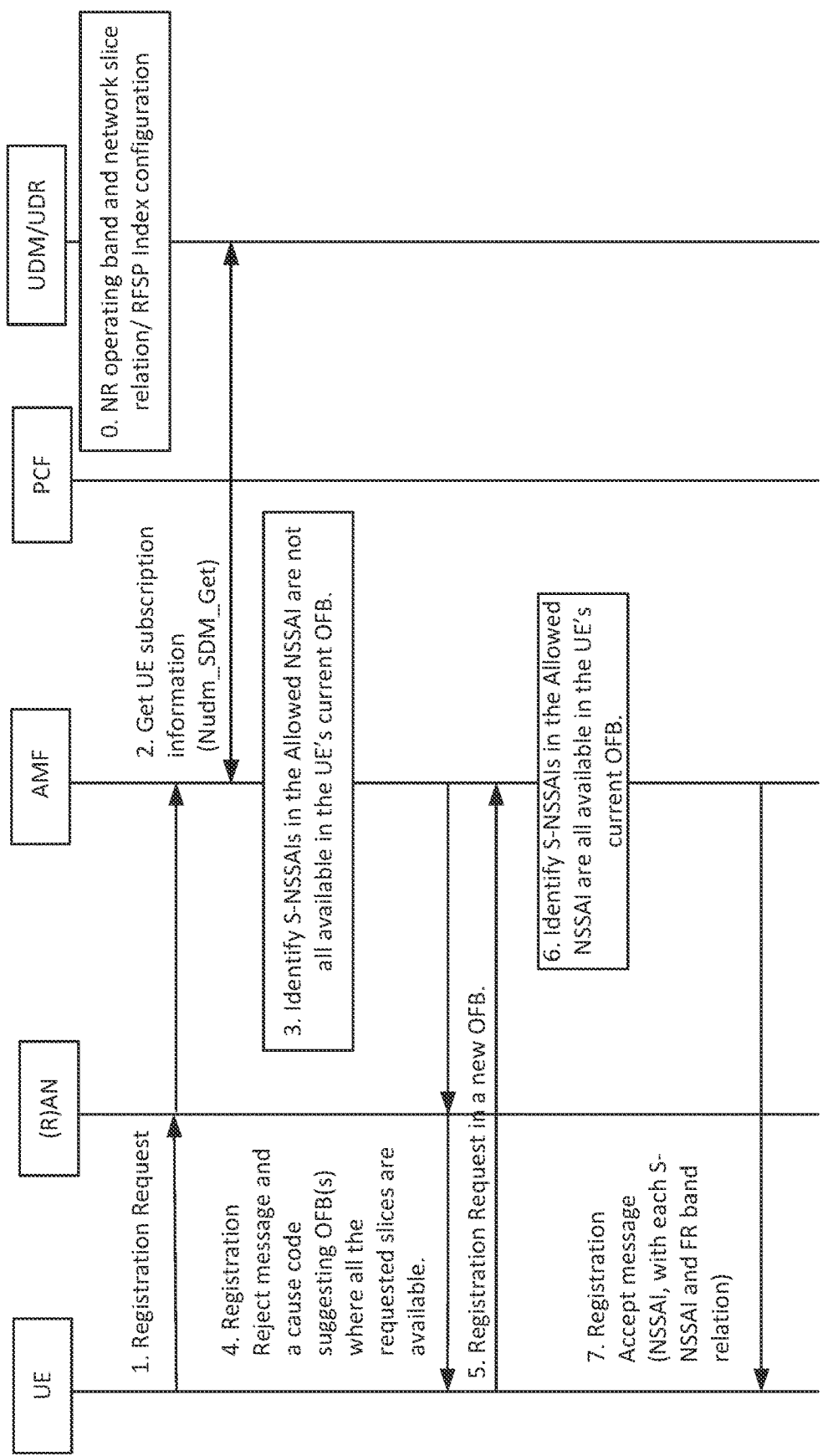
FIG. 17 is a call flow of an example of operating frequency band handover during registration procedure.
Figure 20:
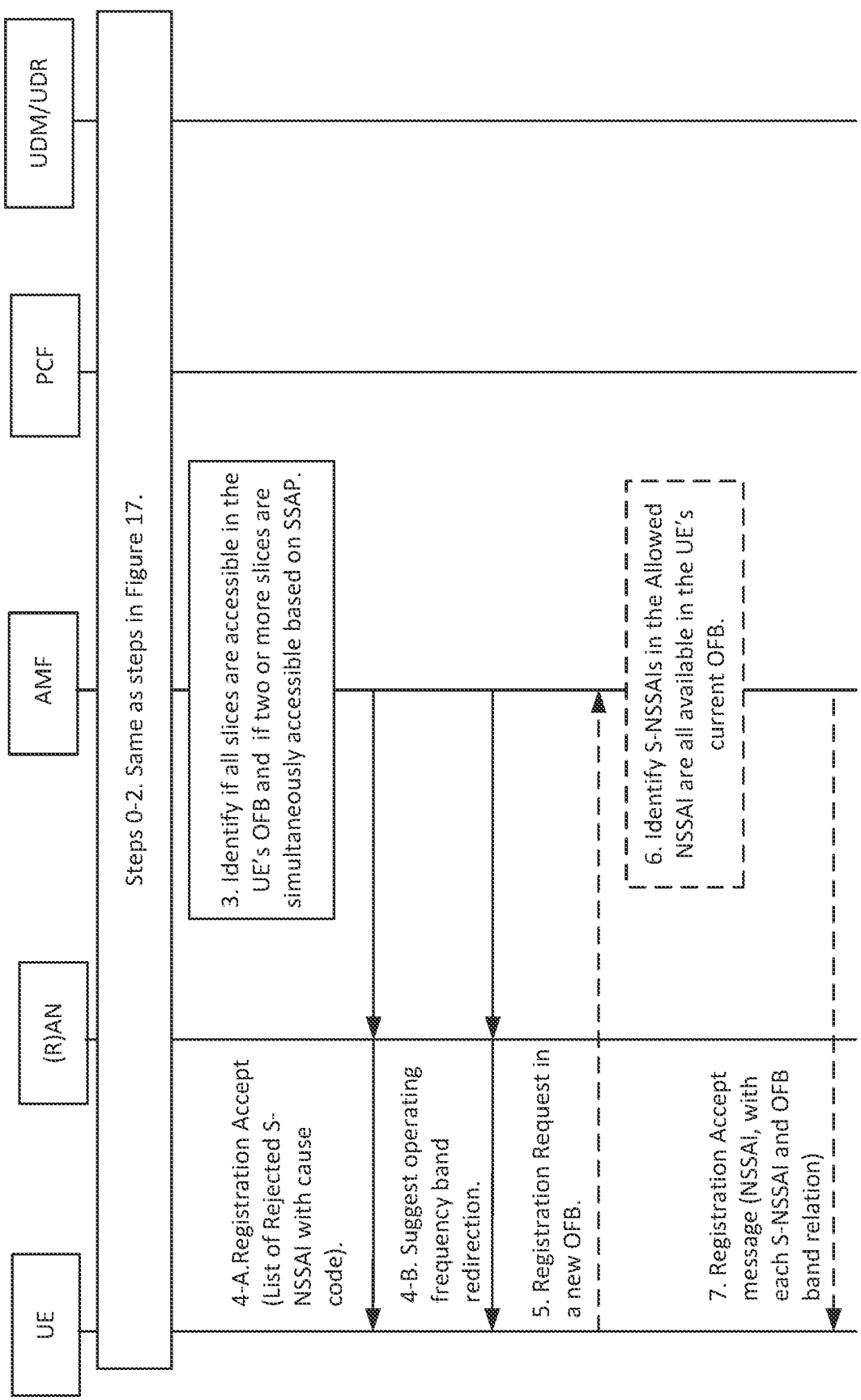
FIG. 20 is a call flow of an example of a UE registration procedure with SSAP and UE-OFB policies.

Steps 0-2 of FIG. 20 involve same steps as Step 0-2 in FIG. 17.

In Step 3, AMF may examine the two different policies. First, the AMF examines the UE-OFB policy where it checks if all the slices in the Requested NSSAI are available in the UE's current OFB. Second, the AMF executes SSAP, which checks if two or more slices are simultaneously accessible based on the SSAP.

In Step 4a, if all the slices are accessible via UE's current OFB then the AMF checks if two or more slices are simultaneously accessible on the basis of SSAP. If two or more slices are not simultaneously accessible based on SSAP, the AMF selects one S-NSSAI for Allowed NSSAI and puts other incompatible S-NSSAIs into the set of Rejected S-NSSAIs and, includes a cause code indicating the reason for rejecting the Rejected NSSAI in the Registration Accept message. The Registration Accept message is then sent to the UE.

In Step 4b, if one or more Requested slices are not available in the UE's current OFB based on UE-OFB policy, then the procedure described in FIG. 17 may be applicable, where AMF directs UE to move to an operating band where all the slices are accessible.

If all the Requested S-NSSAIs are not available in the LT's current OFB, AMF will not check the SSAP for the Requested NSSAI. In other words, if one of the S-NSSAIs in the Requested NSSAI is not available in the LT's current OFB, UE may not access all the slices simultaneously in that operating band.

However, if the UE is successfully handed over to a different OFB where all the slices are available, the AMF may then enforce the SSAP before deciding on Registration Accept message.

Provided that UE is handed over to a new OFB where all the slices are available, the AMF enforces the SSAP. If the SSAP determines that two slices are not simultaneously accessible, then one of them is placed into Rejected NSSAI and the other into Allowed NSSAI. For example, if there are 8 slices in the Requested NSSAI, if all of them are available in UE's current OFB and, if SSAP identified that two of them weren't simultaneously accessible, then the Allowed NSSAI will have 7 S-NSSAIs, which may be delivered to the UE via Registration Accept message and one S-NSSAI is delivered as Rejected NSSAI.

Alternatively, the AMF may be configured with UE-OFB policy to not allow the slices that are not available in the UE's current OFB without directing EYE to change OFB. In other words, the AMF may send in the Allowed NSSAI for those slices that are available in UE's current OFB and put other slices, which are not available in the UE's current OFB in the list of rejected slices. After UTE implements the UE-OFB policy for the slices that are allowed in UE's current OFB, the AMF checks if these slices are simultaneously accessible based on SSAP. If any SSAP incompatible slice is found, it is put into the list of rejected slices and the rest of the slices may be sent back to the UE as Allowed NSSAI in the Registration Accept message. Within this alternative, UE-OFB policy may be configured to direct UE to change OFB where most of the slices are available. Once UE changes the OFB and finds the accessible slices, SSAP may be implemented for those slices.

On the other hand, the AMF may enforce SSAP and UE-OFB policies in reverse order. That is SSAP is enforced before the UE-OFB policy. Ire this case, the UE first checks the SSAP policy for simultaneous access. If the SSAP allows UE to access all the slices simultaneously, then the AMF enforces the UE-OFB policy next. If the UE-OFB policy identifies that one of the slices is not available in the UE's current OFB, then AMF directs UE to handover its Registration Request to the OFB where all the slices are accessible.

But if the SSAP policy found that one or more of the slices cannot be allowed in the first place, then the inaccessible slices are considered rejected slices and the rest of the slices go through the UE-OFB policy. If the UE-OFB policy identifies that one of the slices may not be accessible via UE's current OFB, then the procedure described in FIG. 17 may be applicable, where AMF directs UE to handover its Registration Request to the OFB where all the slices are accessible. Otherwise, the S-NSSAIs of these slices are placed in Allowed NSSAI and sent back to the UE as Registration Accept message. Note that the slice rejected due to SSAP is not included while checking UE-OFB policy. Again, if the AMF directs UE to a different OFB, SSAP enforcement may be repeated. In other words, the AMF may check the SSAP policies again before deciding on Registration Accept message and sending it to the UE.

Step 5-7 are same as steps 5-7 in FIG. 17 and applies only if step 4*b* becomes true. In this case the UE-OFB policy is applied and hence, the AMF directs the UE handover to another OFB, where all the slices are available.

Restricting Simultaneous Network Slice Access During PDU Session Establishment

Restrictions on the simultaneous use of network slices could be enforced during PDU session establishment. In other words, the UE may be permitted to register with network slices but only restricted from simultaneously having PDU sessions in the restricted slices.

Restrictions on simultaneous access of slices may be enforced during PDU Session Establishment process by implementing Simultaneous Slice Validation Criteria field in the Route Selection Validation Criteria of URSP rules. An enhanced URSP Rules with Simultaneous Slice Validation Criteria field is depicted in Table 7 of the Appendix herein.

Figure 13:
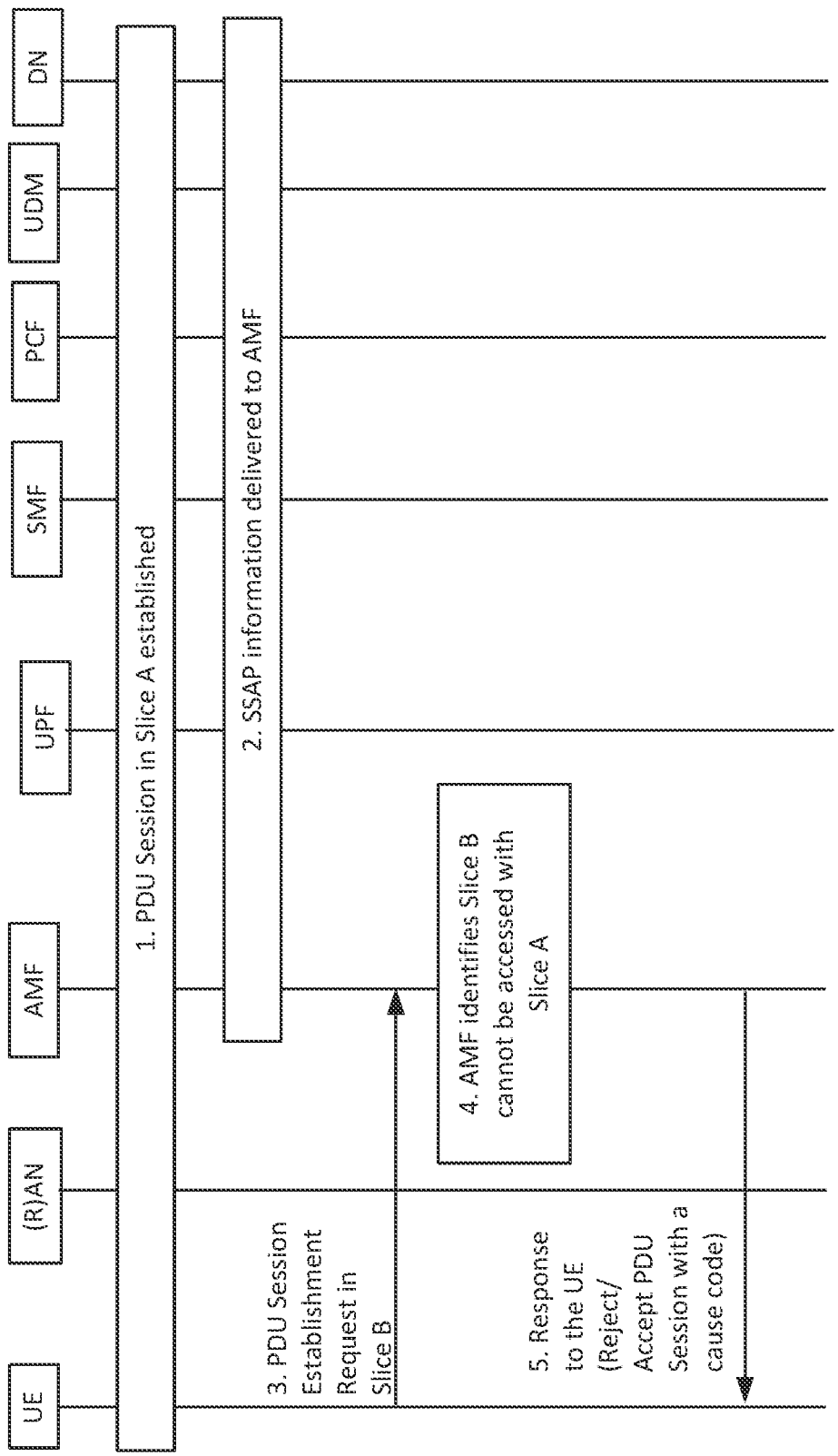
FIG. 13 is a call flow of an example of handling PDU session request with simultaneous slice access restrictions.

FIG. 13 depicts an alternative that describes the case where, a UE attempts to establish a PDU session in a slice from the allowed list of S-NSSAIs but finds that the PDU session cannot be established because the core network restricts simultaneous access of certain slices.

In Step 1, a PDU session has been stablished previously in a slice (Slice A).

In Step 2, Simultaneous Slice Access Policies (SSAPS) have been delivered to the AMF where they are enforced.

In Step 3, UE may attempt to establish a second PDU Session Establishment Request for another slice (Slice B) in the network. This request may include an SSI that may indicate to the network whether the UE supports (e.g., understands) the SSAC Indicator. The network may use SSI to determine whether or not the UE will understand SSAC rejection cause codes and configuration information.

In Step 4, AMF identifies that Slice B is not accessible simultaneously with Slice A for the UE.

In Step 5, the AMF will reject the PINT Session Establishment if the PDU Session Establishment Request is for an S-NSSAI that cannot be used simultaneously with an S-NSSAI that the UE already has an established PDU session. If the UE indicated the capability to understand SSAC information, the AMF may reject the request with a cause code which details that Slice B is not accessible with slice A. UE may receive this cause code and depending upon its urgency or requirements, it may end the session with Slice A and re-attempt PDU Session Establishment Request with Slice B.

Alternatively, and provided that the session is ongoing for Slice A, the AMF may indicate to the UE in the rejection cause code that the UE may be able to attempt PDU Session Establishment Request as soon as the session with Slice A has ended.

Alternatively, and if the ongoing PDU session with Slice A is stale, the AMF may end the session and accept the PDU Session Establishment Request for Slice B.

Another alternative may be, if the UE, bears some information about slice priority for the UE (e.g. Urgent situation) and if Slice B is of higher priority than Slice A, the UE may end the PDU session with Slice A and send the PDU Session Establishment Request for Slice B.

Handling Simultaneous Slice Access Restriction Due to UE-OFB Policy and SSAP During PDU Session Establishment Procedure Restriction on simultaneous access of two or more slices may also be based on the OFB's the slices are available in. This restriction may be enforced during a PDU Session Establishment procedure. In this case, it is assumed that the slices that are available in different frequency bands may be allowed and delivered in the allowed NSSAI during general UE Registration procedure or Registration Update procedure. However, the UE-OFB policy may be applied during PDU session establishment. In addition, UE-OFB policy may be implemented when UE changes a cell or TA/RA and UE needs to continue with existing PDU session. In other words, when two PDU sessions are established towards two different network slices in the network, both must be available under same OFB and the OFB must be UE's current OFB. This procedure also assumes that UE has already submitted its supported OFBs to the network during the General Registration procedure. In some cases, a UE-OFB policy may be enforced alongside with the SSAP, as illustrated in the example of FIG. 21.

Figure 21:
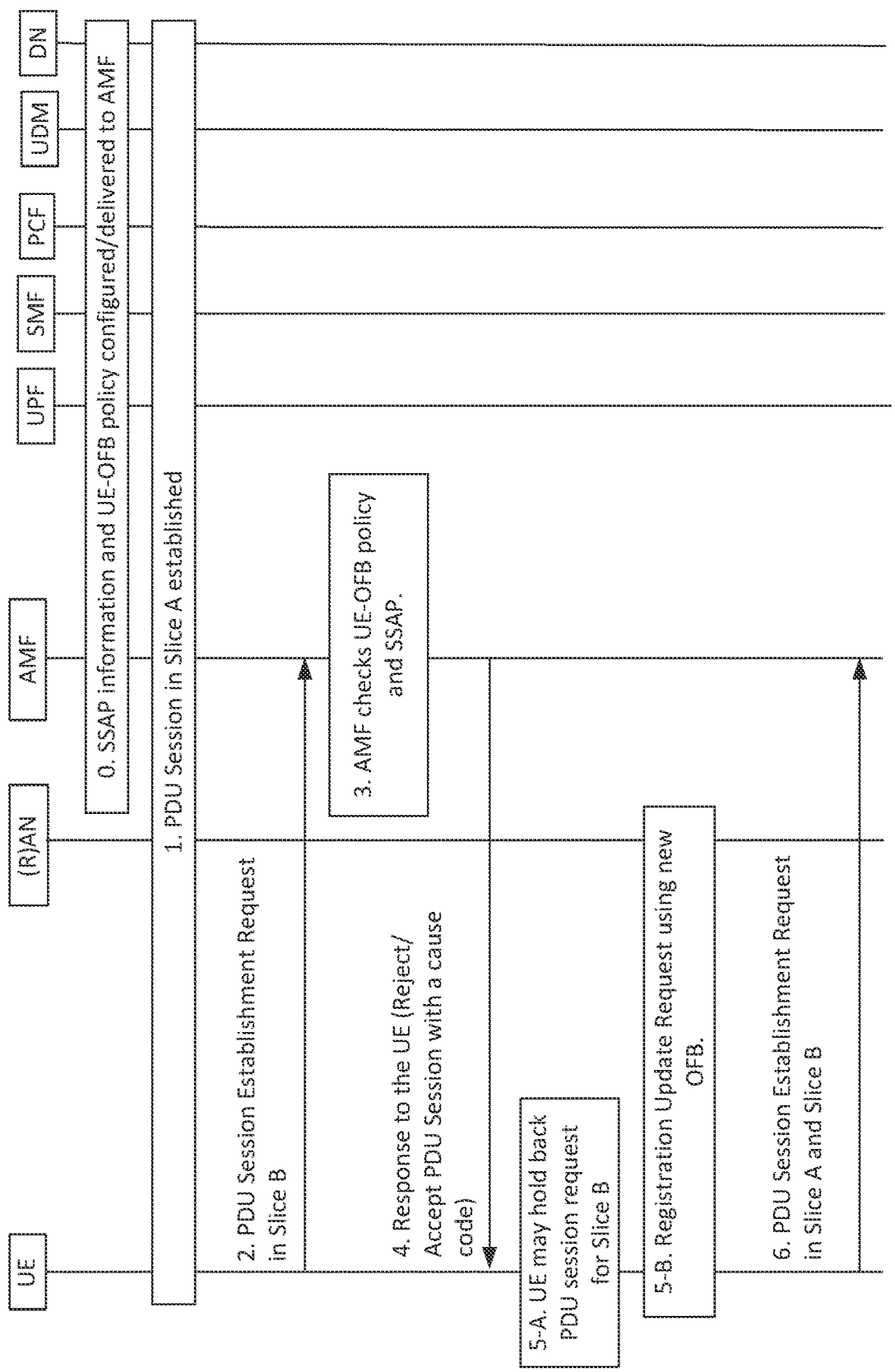
FIG. 21 is a call flow of an example of handling simultaneous restriction due to UE-OFB policy and SSAP.

In Step 1 of FIG. 21, SSAP and UE-OFB policies have been delivered or configured at the AMF.

In Step 2, the UE establishes a PDU Session in a slice (Slice A).

In Step 3, UE may initiate a new PDU session for a second network slice (Slice B), that is available in a different OFB. Here, the AMF may enforce the UE-OFB policy and the SSAP together.

The AMF may enforce the UE-OFB policy first and SSAP policy second or vice versa. If the second PDU session is requested towards a slice that is not available in UE's current OFB, the AMF may identify this scenario through the UE-OFB policy. Hence, the PDU session request may be rejected. Additionally, the AMF may also identify the OFBs where all the slices may be available for the PDU session (e.g., for both Slice A and Slice B). The AMF may send the PDU Session Reject response to the UE with a cause code. The cause code may indicate that the PDU session was rejected because the slice was not available in the UE's current OFB. In addition, the cause code may send the information about the OFBs where both slices are available and PDU sessions can be established in both the slices simultaneously. Alternatively, the cause code may send the information about what OFBs can be used to establish the requested PDU Session. If the AMF did not find any OFB where two slices are available, then the cause code will only indicate the reason of rejection mentioning the violation of UE-OFB policy. For this case, the SSAP policy enforcement may take following two options:

In option 1, the AMF may enforce SSAP policy to ensure the two slices' compatibility. If they are not compatible, the incompatibility information due to SSAP may be sent to the UE via cause code in the PDU session request rejection message. Note that this rejection information may also help the UE later to decide on whether to stay with the current Allowed NSSAI or to move to a different OFB entirely.

If both UE-OFB policy and SSAP checks fail, then it is guaranteed that UE cannot access both the slices in any of the OFBs. Thus, the AMF may send a rejection message and cause code indicating the same.

In option 2, the AMF may not enforce SSAP policy and just send the rejection message based on the UE-OFB policy.

But if the second PDU Session Establishment Request towards a slice (e.g. Slice B) is available in the same OFB as the established PDU Session in the Slice A and the OFB is the UE's current OFB, then the AMF implements the SSAP. If the two slices are compatible with each other, then the PDU Session Establishment for the second slice will be successful. If the Slice B is not compatible with the Slice A, then the PDU Session request is rejected with a cause code.

In Step 4, The AMF may send the UE PDU session Accept or Reject messages. If both UE-OFB policy check and SSAP check passes, then the UE shall establish a PDU session in Slice B. If the PDU session is rejected due to UE-OFB policy failure, the AMF sends the PDU session a rejection message with a cause code. The cause code indicates the failure of slice to be in the UE's current OFB and may recommend OFBs where both the slices (Slice A and Slice B) may be accessible or an OFB where Slice B is accessible. If the rejection, is due to violation of SSAP, the cause code indicates that the slices (Slice A and Slice B) were incompatible for simultaneous access.

In Step 5-A, If the UE gets a PDU session rejection message with a cause code based on UE-OFB policy, the UE may choose to keep the on-going PDU session in the Slice A and hold back the PDU Session Establishment request for Slice B. In other words, the UE may disregard AMF's recommendation to use other OFBs where both the slices may be available. If the rejection is due to violation of both UE-OFB policy and SSAP then the UE may not change OFB and hold-back PDU session establishment request and just continue with the on-going PDU session in Slice A.

In Step 5-B, provided that the PDU session is rejected with a cause code indicating change of OFB, the UE may choose to request a new Allowed NSSAI in a new OFB, where both the slices are available. If UE chooses this option, UE may first need to save the state of the on-going PDU session and request a PDU session teardown for the on-going PDU session in Slice A. Once the PDU session teardown is complete the UE will need to send a Registration Update request towards the OFB that was recommended by the AMF in the previous step. Once the registration is successful via a new OFB, the UE may re-establish the PDU session that was torn down previously and continue with PDU session. UE may also request a new PDU Session Establishment request in the Slice B using the new OFB. Alternatively, as the UE changes the OFB, the existing sessions may be simply handed over to the new OFB.

In an alternative, since UE has the information about which slices are available in which OFB, based on the OFB (cell) that UE is currently in, UE may simply initiate PDU sessions establishment process only on the slices that are available in UE's current OFB. That way there is no hurdle in establishing a PDU session and waiting for the AMF to decide whether the PDU session can be established based in UE-OFB policy. As the PDU session is established, the AMF may only enforce the SSAP to implement compatibility of two or more slices for that UE.

RAN Assisted UE Handover Based on Slice Availability

Figure 22:
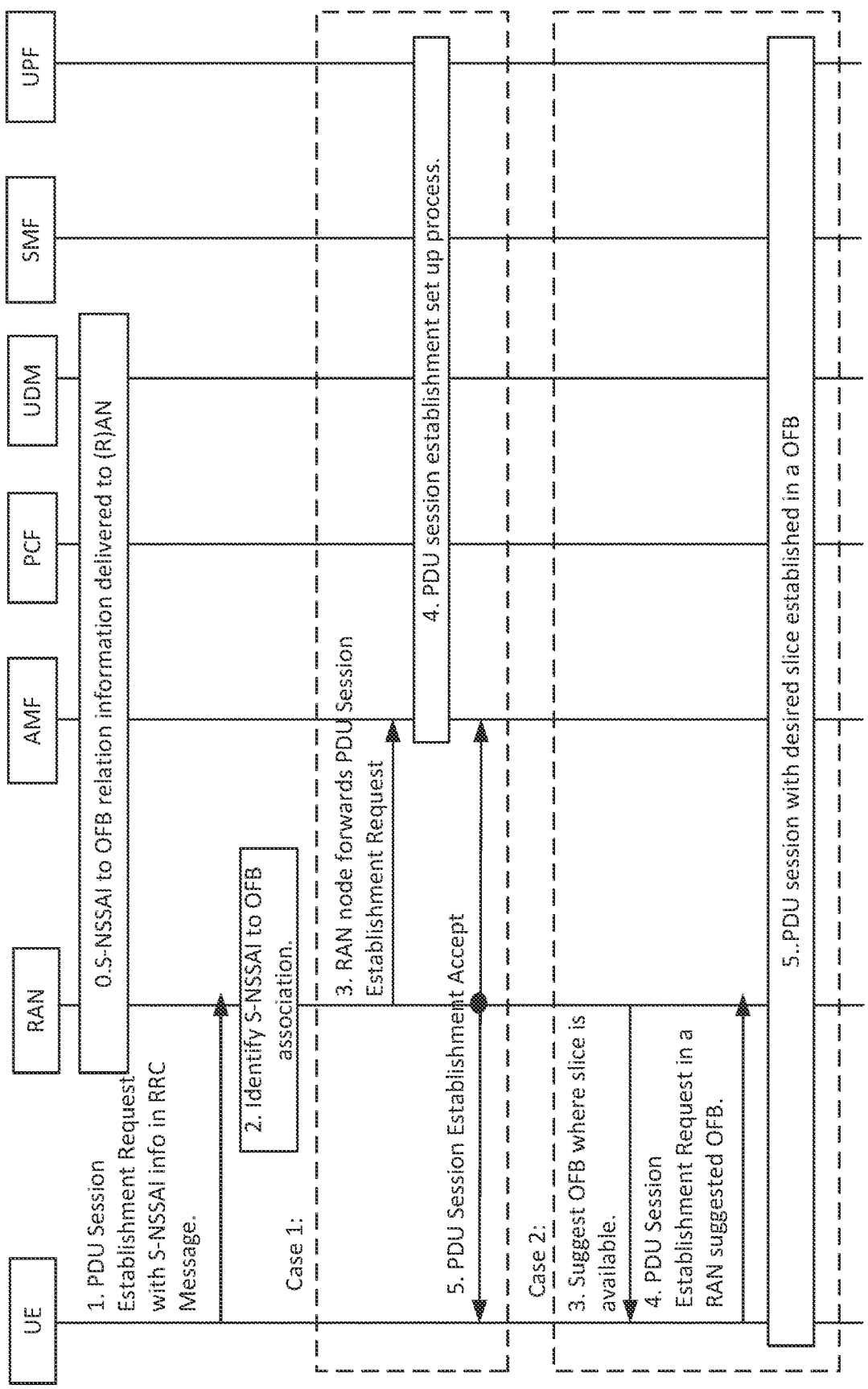
FIG. 22 is a call flow of an example of UE sending S-NSSAI in the RRC message during a PDU Session Establishment Request.

Each S-NSSAI may be associated with its available OFB(s). This information (e.g., S-NSSAIs and corresponding OFBs) is conveyed to the RAN node during successful registration procedure. When the UE requests to establish a PDU session with a slice in a network, the UE may include the desired slice information in the RRC message directed towards the RAN. The RAN may identify the requested slice and the OFB associated with the requested slice. If the requested slice is in the UE's current OFB, the RAN may allow to further the PDU Session Establishment process, otherwise RAN may direct UE to change OFB before continuing the PDU Session Establishment procedure. This process is described in FIG. 22.

In Step 0, the AMF may retrieve the Access and Mobility Subscription data where S-NSSAI to OFB association information exists. This information may be conveyed to the RAN during UE Registration procedure.

In Step 1, the UE sends a PDU Session Establishment Request to the network via RAN. In this request, the UE may also include the S-NSSAI of the requested slice in the RRC message, where UE wants to establish a PDU session. Note that this S-NSSAI information is in addition to the slice information sent to the AMF.

Additionally, the UE may also include the slice priority. Moreover, UE may include an indication of its OFB preferences. The UE may also indicate to the RAN, one or more of the following:

First, V2X OFBs, V2X preferred OFBs, V2X operating bands for concurrent Uu and PC5 based operation.

Second, OFBs for intra-band carrier aggregation operation; UE's preferred. OFBs for intra-band carrier aggregation operation.

Third, OFBs for inter-band carrier aggregation operation; UE's preferred. OFBs for inter-band carrier aggregation operation.

Fourth, OFBs for dual connectivity operation; UE's preferred OFBs for dual connectivity operation.

Fifth, OFBs for UL MIMO; UE's preferred OFBs for UL MIMO.

Sixth, S-NSSAI preferences in priority order; the UE may indicate which S-NSSAIs are mandatory for the current OFB to assist the AMF in accepting or rejecting the Registration Request.

In Step 2, since RAN already has the S-NSSAI to OFB relation information received from the core network, RAN identifies the OFB associated with the requested S-NSSAI and confirms if LT can access it in UE's current OFB.

Based on the identification, the RAN does one of following.

Case 1:

In Step 3, RAN identifies that the requested slice is accessible in UE's current OFB and hence, forwards the PDU Session Establishment Request towards the AMF.

In Step 4, the related network functions may participate in the PDU Session Establishment set up procedure as described in clause 4.3.2.2.1 of TS 23.501 [2].

In Step 5, the AMF sends a NAS message to the RAN, where it indicates N2 PDU session request. AN-specific resources are setup between UE and the RAN which indicates acceptance of the PDU Session Establishment Request, then the RAN sends N2 PDU session response back to the AMF.

Case 2:

In Step 3, the RAN identifies that the requested slice is not accessible in UE's current OFB. In addition, the RAN identifies the OFB where the requested slice is available and sends a NAS message back to the UE suggesting the OFB(s) via which the slice may be accessible.

In Step 4, UE may steer itself to the RAN suggested OFB and may send a PDU Session Establishment Requests to the network. Since, the slice is available in the OFB, RAN node forwards the request towards the network.

In Step 5, the PDU Session Establishment Request is accepted by the network and UE may start sending PDUs towards the desired slice in the network.

Handling PDU Sessions When UE Moves to a New Cell

Figure 23:
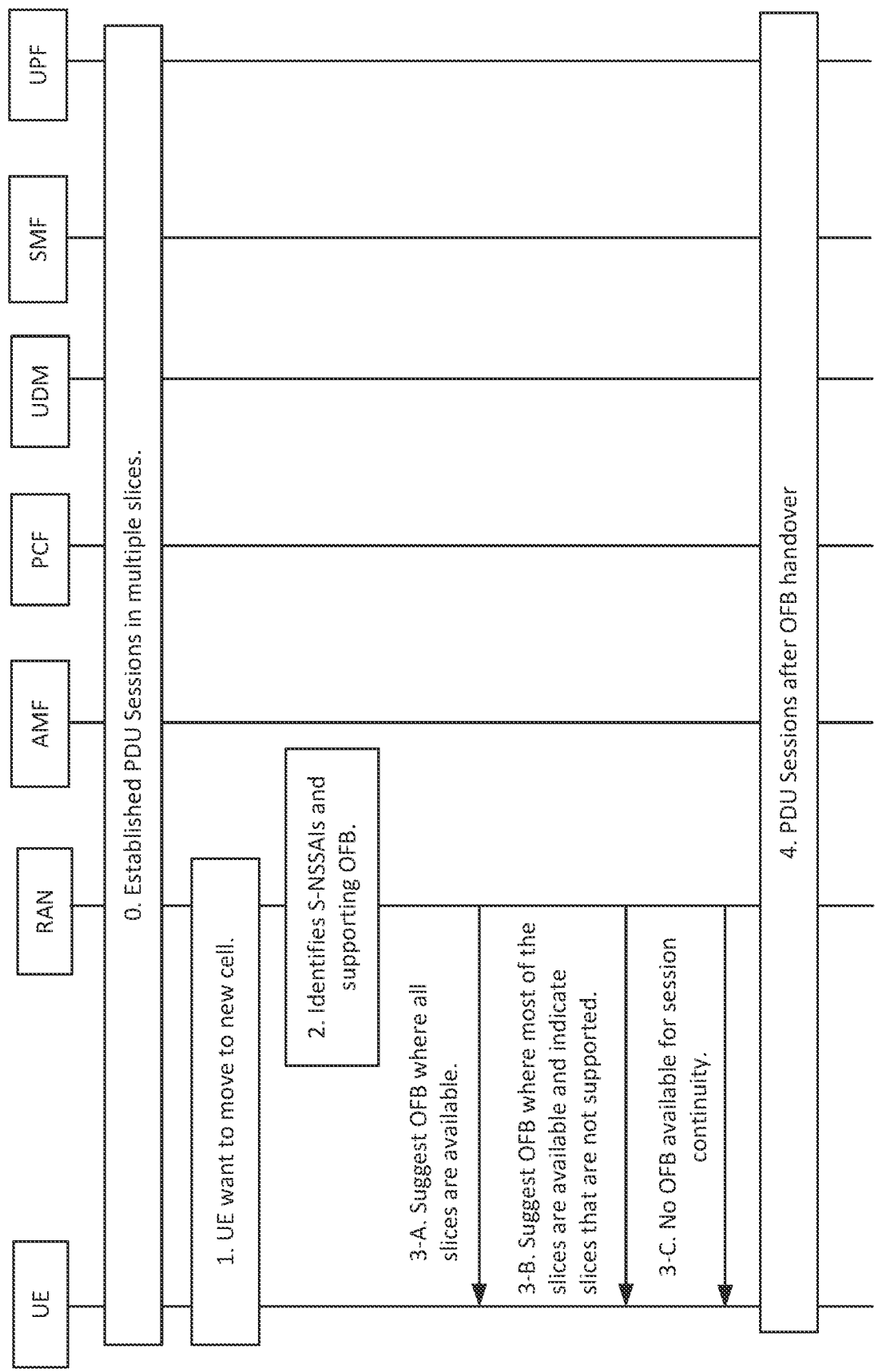
FIG. 23 is a call flow of an example of RAN suggesting OFB's for PINT session continuity.

A UE may have multiple on-going PDU Sessions in multiple network slices in an OFB (a cell). A UE may be mobile and may want to move to a new OFB. Based on the available OFBs that the UE supports, the RAN may assist UE with OFB switching, where UE can continue with existing PDU sessions. If the network cannot support all the slices in an OFB that UE supports, the RAN may inform the UE in a cause code. FIG. 23 describes the procedure.

In Step 0, the UE may have on-going PDU sessions in multiple slices in the network.

In Step 1, the UE may send a message to the RAN indicating that it wants to move to a new cell and continue with on-going PDU sessions and leave the cell where it has PDU sessions with the network.

In Step 2, the RAN identifies the slices and the OFBs where the slices with PDU sessions may be available, towards which UE can continue with existing PDU session in the slices. UE's current RAN node may coordinate with other RAN nodes about the UE's desired OFBs and the slices these OFBs support via core network or directly among the RAN nodes.

In Step 3-A, if the RAN node identifies that the new cell also supports all the slices that the UE has on-going PDU sessions with, it sends back the acknowledgement indicating its support for all the slices in the new OFB. Then the RAN node may facilitate a graceful OFB handover of the UE and continue with PDU sessions.

In Step 3-B, the RAN node may identify that the new cell doesn't support all the UE's slices, and identifies other cells within UE's reach, where more slices could be supported. In this case, the RAN may suggest UE to continue the PDU session in an OFB where larger number of slices are supported. In addition, it may indicate to the UE, S-NSSAI(s) that will not be supported in the suggested OFB. Then the RAN may facilitate a graceful OFB handover of the UE for the slices supported and continue with PDU sessions.

In Step 3-C, the RAN node may identify that the new cell doesn't support any of the UE's slices, and may further identify that no other cell within UE's reach can support those slices. In this case, the RAN sends a response with a cause code back to the UE stating that no OFBs can support the requested slices. In this case, the RAN cannot continue with the PDU sessions and hence, all the PDU sessions may be ended.

Alternatively, the network may support a default slice in the new cell and hence, the RAN node may indicate that information in the response. The UE may establish PDU sessions in the default slice and if allowed UE may continue one or more PDU sessions in the default slice.

In Step 4, UE switches to a new OFB. As the UE switches to the new OFB, the core network is informed about this. If there exits any update in policies, PCF sends the policy to the AMF and RAN node, before the AMF completely accepts transition to the new OFB. After a successful handover, the UE continues with PDU sessions.

Configuring Slice Location Restriction Information in NSSAIs

It may be the case that certain network slice(s) are not available to the UE when the UE is in certain PLMNs of certain countries. Note that PLMN IDs include a mobile country code (MCC), thus, any information that is configured in a UE on a PLMN ID basis is already configured per country.

During Registration, or Configuration Update, the network may send a "Mapping of Configured NSSAI" to the UE for the serving PLMN. When this information is sent to the UE, each S-NSSAI is encoded as described in reference to FIG. 9.

Notice that, when the encoding depicted in FIG. 9 and Table 8 of the Appendix herein is used, at least a mapped SST is provided to the UE.

The encoding of the SST and SD fields are as described in section 28.4.2 of 3GPP TS 23.003, Numbering, Addressing and Identification. As is explained in TS 23.003 "The S-NSSAI may include both the SST and SD fields (in which case the S-NSSAI length is 32 bits in total), or the S-NSSAI may just include the SST field (in which case the S-NSSAI length is 8 bits only).

The SST field may have standardized and non-standardized values. Values 0 to 127 belong to the standardized SST range and they are defined in 3GPP TS 23,501 Values 128 to 255 belong to the operator-specific range.

The SD field has a reserved value "no SD value associated with the SST" defined as hexadecimal FFFFFF. In certain protocols, the SD field is not included to indicate that no SD value is associated with the SST."

TS 23.501, section 5.15.2.2 explains that 4 SST values are standardized to indicate the characteristic of a network slice (eMBB, URLLC, MIoT, and V2X).

In order to cover the case where the network needs to convey to the UE that a slice is not available in a certain country in a certain PLMN (e.g., not available with a certain PLMN ID), a new SST value may be standardized to represent the NULL, or unsupported case. When this value is provided in the SST field, it is an indication to the UE that no S-NSSAI that is associated with the S-NSSAI of the HPLMN maps and that the UE is restricted from accessing the services of the S-NSSAI of the HPLMN when connected to the PLMN. Table 12 of the Appendix herein shows the standardized SST values from TS 23.501. This table has been updated to show how the SST values can be modified to indicate to the UE that no SST value, or no slice, maps to the S-NSSAI in the PLMN.

Alternatively, a new SD value could be defined to indicate to the UE that there is no mapped S-NSSAI for the Network Slice in the PLMN. Alternatively, this indication can be conveyed in a new information that is carried in the S-NSSAI information element (IE) or inside of a different information element.

Another alternative approach to convey to the UE that there is no mapped S-NSSAI in the PLMN is via the S-NSSAI information element. The S-NSSAI IE may only include an SST or, SST and SD within a Mapped Configured NSSAI. The UE may interpret it as to mean that the indicated SST or SST and SD is an HPLMN Configured NSSAI with no mapping in the HPLMN.

Another alternative approach to indicating to the UE that there is no mapped S-NSSAI in the PLMN is to define new encoding for the "Length of S-NSSAI contents" field, indicating the condition to the UE. For example, an encoding of 00001001 could indicate that the information element only carries a mapped HPLM SST value, an encoding of 00001010 could indicate that the information element only carries a mapped HPLMN SD value, and an encoding of 00001011 could indicate that the information element only carries a mapped HPLM SST and mapped HPLMN SD values. The absence of an SST and SD value for the VPLMN would be an indication to the UE that the HPLMN S-NSSAI has no mapping in the PLMN.

It may be the case that a slice in the Configured NSSAI is only available in a particular region within the HPLMN. When this is the case, the network needs to convey, to the UE, the regions where the slice is accessible. During Registration, or Configuration Update, the network may send a "Configured NSSAI" to the UE. When this information is sent to the UE, each S-NSSAI is encoded as described in section 9.11.2.8 of TS 24.501 and shown in FIG. 8 and Table 11 of the Appendix. The network may indicate the geographic area where the UE S-NSSAI is available in the S-NSSAI information element. For example, the "Length of S-NSSAI contents" encoding can be modified so that the network can indicate to the UE that the information element indicates that location information is present in the information element. For example, a value of 10000001 can indicate to the UE that SST and Geographic Information (e.g., Area of Service) is included in the S-NSSAI contents. Furthermore, the Geographic Information can be encoded such that the encoding indicates the format of the Geographic Information to the UE. Example formats include registration area (e.g., Service Area List) area, tracking area identity list, cell identifiers, countries, cities, and GPS coordinates. If no geographical area is included in the information element, then the UE may assume that the S-NSSAI is available in the whole PLMN. Alternatively, the geographic area may indicate to the UE where accessing the S-NSSAI is restricted.

It may also be the case that, when the UE is roaming, certain slices (e.g., S-NSSAI's) are not available in the VPLMN or in certain regions within the VPLMN. When this is the case, the regions where the S-NSSAI is available (or not available) can be indicated to the UE as part of the "Mapping of Configured NSSAI" information element and encoded as described herein.

Table 13 of the Appendix herein shows how the S-NSSAI Information Element encoding may be updated to convey the information that is described above. When the UE registers with the network, it may indicate to the network that it supports receiving geographic S-NSSAI restrictions so that the network knows that the UE will understand the new Information Element encodings and rejection cause codes.

Figure 14:
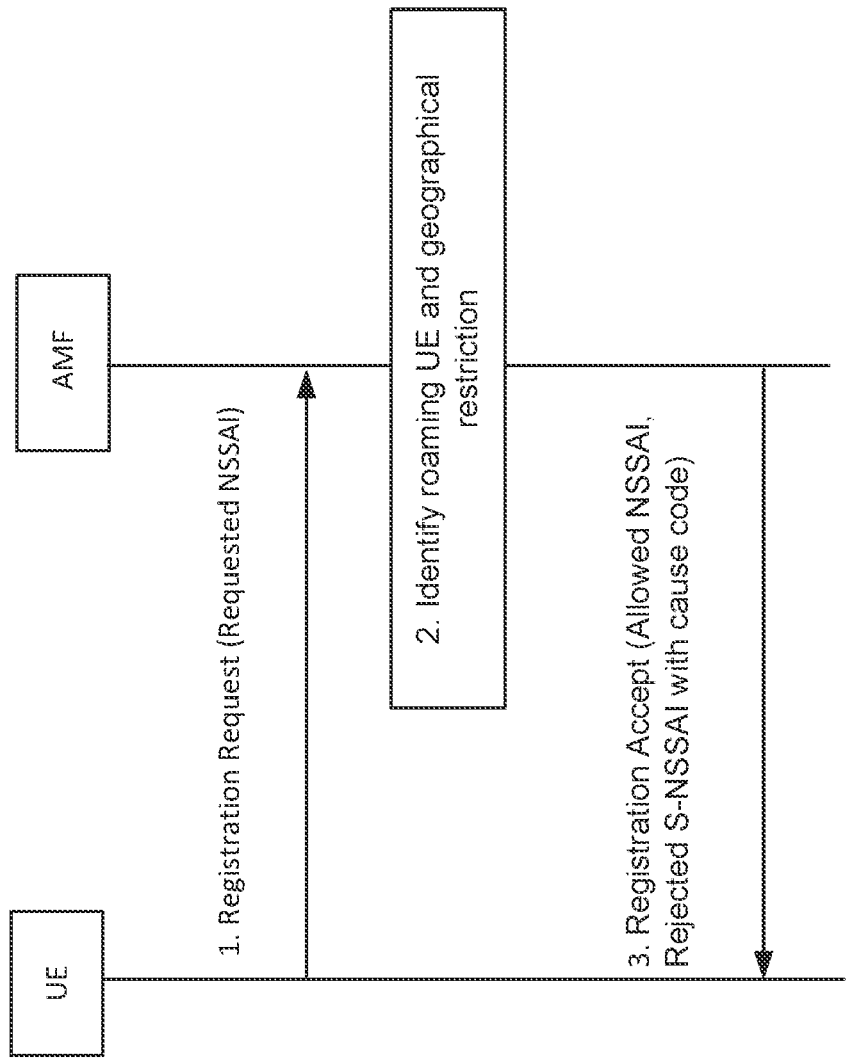
FIG. 14 is a call flow of an example of UE being restricted access to network slices based on geographical region.

When a UE attempts to access an S-NSSAI from a region where access to the S-NSSAI is restricted in the PLMN, the network may reject the S-NSSAI and provide a cause code with the rejected S-NSSAI and indicate that the S-NSSAI is rejected because access is not allowed in the UE's current location. The cause code may further indicate to the UE where access is allowed or indicate where access is not allowed. Furthermore, if the UE moves to a location where access to one of its S-NSSAI's is restricted, the network may send a UE Configuration Update message to the UE with a new Allowed NSSAI. The Allowed NSSAI will be different from the Allowed NSSAI that was previously sent to the UE because the new Allowed NSSAI will be missing the S-NSSAI that is now restricted due to the UE's current location. FIG. 14 describes the process by which a UE is denied access based on geographical region.

In Step 1, UE initiates a UE Registration procedure with an AMF in a VPLMN in a different geographical region (e.g. a country). The Registration Request may include requested NSSAI, mapping of requested NSSAI, and default configured NSSAI indication among other information. One of the S-NSSAIs in the Requested NSSAI may be restricted in the geographical region and UE may be unaware of this restriction. In addition, UE may or may not include an indicator that indicates it supports for geographic S-NSSAI restrictions.

In Step 2, the AMF may identify the UE's restricted slices in the visited geographical region. See Table 12 of the Appendix. The Mapping of the S-NSSAI(s) in the Configured NSSAI and the Mapping of the S-NSSAI(s) in Allowed NSSAI may be set to NULL, for example, to indicate that there is no corresponding mapping of home network slices to any network slice in the visited network. Hence, the Visited Access and Mobility Management Function (V-AMF) may deny certain Requested S-NSSAI(s).

In Step 3, AMF may send a Registration Accept message to the UE with an Allowed NSSAI and the Rejected S-NSSAIs with rejection cause codes. The rejection cause because codes may indicate that an S-NSSAI mapping was unavailable (NULL) at the VPLMN in the UE's current region.

Configuring Slice Location Restriction Information via Access and Mobility Subscription Service Area Restrictions consist of either Allowed Areas or Non-Allowed Areas. In particular, it may contain limited tracking areas and, alternatively, may contain all the tracking areas (TAs) in the PLMN. A UE may be restricted to access one or more network slices based on the Area of Service. To address a scenario where certain slices may be available in an allowed area or not available in non-allowed areas, a new field that indicates a network slice's availability in a service area may be used, e.g., called Slice Availability Area Restriction. This field specifies availability or unavailability of each S-NSSAI of the Configured NSSAI in that area. This information may be stored as part of Access and Mobility Subscription data type, defined in Table 5.2.3.3.1-1 of TS 23.502 (UE Subscription data types), in the UDM. During the UE registration process, Slice Availability Area Restriction information may be sent to the AMF with UE Subscription data, where it may be enforced.

Alternatively, Slice Availability Area Restriction information may be delivered to the UE with Registration Accept message and evaluated in the UE.

Yet another alternative would be to pre-configure the UE with Slice Area Availability Restriction information for each S-NSSAI when configuring the Configured NSSAI in the UE.

Figure 15:
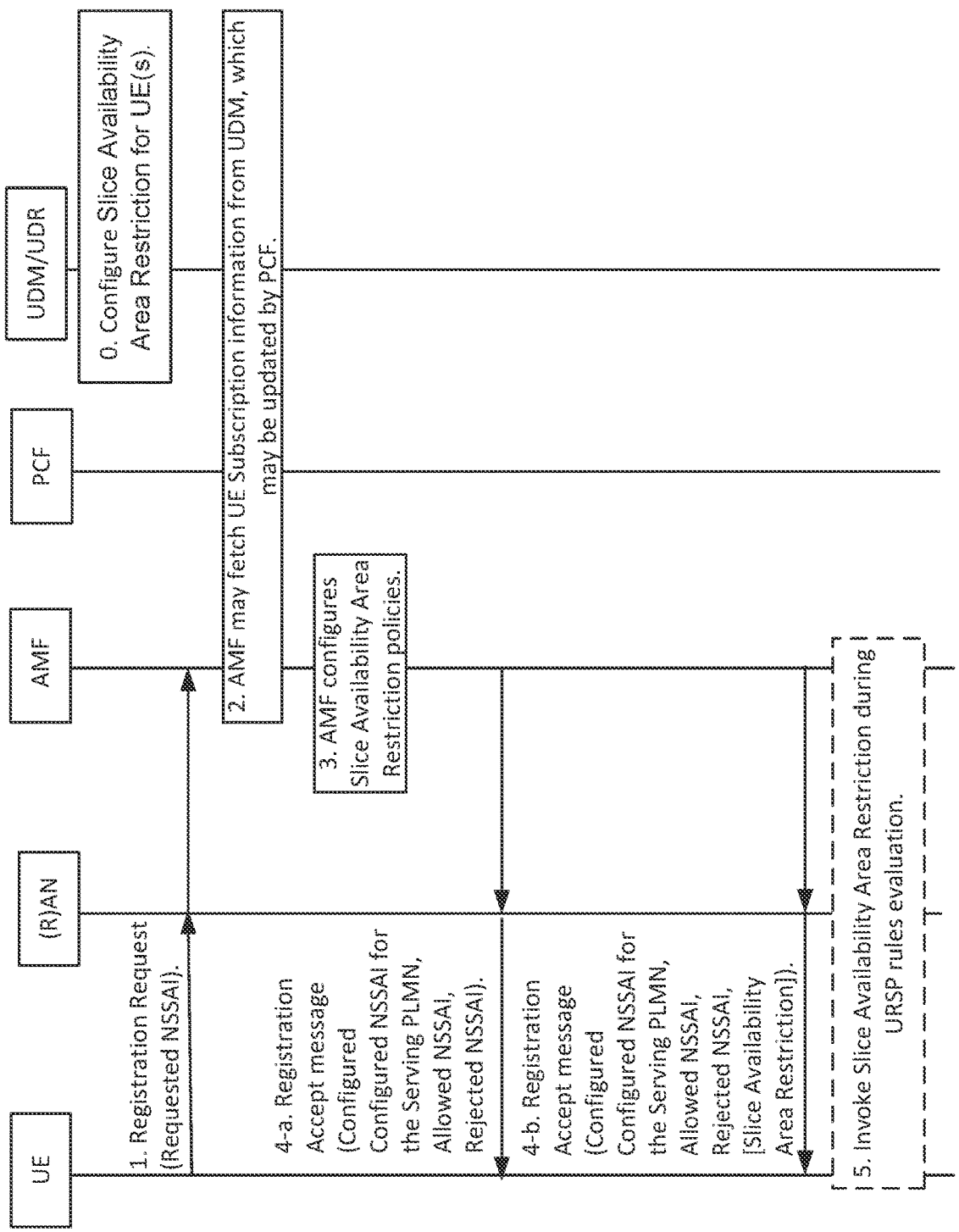
FIG. 15 is a call flow of an example of configuring slice location restriction information via Access and Mobility Subscription.

FIG. 15 describes the process by which Slice Availability Area Restriction information is conveyed to the AMF in the network and alternatively, to the UE.

In Step 0, Slice Availability Area Restriction field in Access and Mobility Subscription data is configured for UE(s).

In Step 1, UE initiates general UE Registration procedure towards the AMF via RAN node. The request may include Requested NSSAI.

In Step 2, For the UE, the ANI F may retrieve the UE Subscription information which may include Access and Mobility Subscription data, SMF Selection Subscription data, UE context in SMF data etc., using Nudm_SDM_Get. This requires that UDM may retrieve this information from UDR by Nudr_DM_Query. Fields in the UE subscription.

In Step 3, AMF identifies the Slice Availability Area Restriction field in the Access and Mobility Subscription data and configures restricted slices for the service area.

In Step 4-*a*, the AMF sends a Registration Accept message to the UE. In the Registration Accept message the AMF includes Allowed NSSAI, Mapping of Allowed NSSAI, Configured NSSAI and Mapping of Configured NSSAI, and Rejected NSSAI. The Rejected NSSAI includes the S-NS-SAI(s) that are rejected in that location and the Slice Availability Area Restrictions that are associated with each S-NSSAI, so that the UE is aware that the slice was rejected for the current location and the UE can use this information to consider when to attempt to register to the slice again.

In Step 4-*b*, the AMF sends Registration Accept message to the UE. In the Registration Accept message the AMF includes Allowed NSSAI, Mapping of Allowed NSSAI, Configured NSSAI and Mapping of Configured NSSAI, and the Slice Availability Area Restrictions that are associated with each S-NSSAI in the Allowed NSSAI, Configured NSSAI, and Mapping of Allowed NSSAI's are delivered to the UE. In this option, the UE is allowed to register to slices even if the slice is restricted in the current area. The UE is responsible to apply this restriction by not allowing slice activity in the restricted area (e.g. to not initiate/allow a PDU Session Establishment) and the network will enforce this by not allowing any slice activity (e.g. to not allow a PDU Session Establishment) in the restricted area.

In Step 5, if a UE received a Slice Availability Area Restriction information from the network, with the Registration Accept message (Step 4-*b*), when the application traffic is generated in the UE, Slice Availability Area Restriction information may be considered when URSP rules are evaluated. In other words, this information might be used to bypass the restricted slice and select lower priority routes in the network when RSD's are evaluated.

Using Slice Location Restriction Information During PLMN Selection

The procedure described in reference to FIG. 15 illustrates how the network may configure the UE with information about what PLMN slice (e.g., S-NSSAI) is available in and the regions within a PLMN where a slice is available. This information can also be configured in a UE for example in the UE's SIM card, or via the eSIM protocol. Once the UE is aware of the availability of a slice within a PLMN, the UE, may consider this information during PLMN selection and PLMN reselection. PLMN Selection and PLMN Reselection is specified in TS 23.122.

PLMN Selection at switch-on or recovery from lack of coverage in Automatic Network Selection Mode is specified in section 4.4.3.1.1 of IS 23.122, This procedure may be enhanced so that the availability of network slices (S-NSSAI's) in each PLMN will be considered when determining whether to attempt to register with the PLMN. For example, if an S-NSSAI is not available in the PLMN at the UE's current location, then the PLMN may be considered lower priority in the sense that the UE will first attempt to register with PLMNs where all, or more, S-NSSAI's are available. In addition to PLMN IDs and power levels for the strongest cell on each frequency, the AS could be enhanced to also provide Tracking Area (TA) Codes and/or Cell IDs to inform NAS of the UEs' location within the PLMN to enable slice-aware PLMN selection. The UE might only consider the availability of S-NSSAI's that are part of its Configured NSSAI or the Mapped Configured NSSAI that is associated with the PLMN.

In addition to PLMN IDs and power levels for the strongest cell on each frequency, the AS could be enhanced to also provide TA Codes, Cell IDs, and/or RAN Area IDs to inform via NAS to the UES location within the PLMN to enable slice-aware PLMN selection.

In addition, two different network slices may be available in two different PLMNs and Mapping of S-NSSAIs for both the S-NSSAIs may be available. In such a case, UE may use a pre-defined slice priority to select the slice and hence, select the PLMN where it is available.

PLMN Selection at switch-on or recovery from lack of coverage in Manual Network Selection Mode is specified in section 4.4.3.1.2 of IS 23.122, This procedure may be enhanced so that the availability of network slices (S-NSSAI's) in each PLMN be considered when the UE determine which PLMNs to present. For example, when some S-NSSAI's are not available in the PLMN in the UE's current location, this information may be displayed to the user. For example, the display may indicate that service is limited, the display may indicate what services are available, the display may indicate what services are not available, etc. In addition, the display may indicate why and where a service is not available in the PLMN.

PLMN Reselection in Automatic Network Selection Mode is specified in section 4.4.3.2.1 of TS 23.122. PLMN reselection may be enhanced to consider the availability of network slices (S-NSSAI's) in each PLMN as described herein in the proposed enhancements to the PLMN selection procedure. Furthermore, the UE may be allowed to trigger PLMN reselection when the UE evaluates a URSP rule and finds that a route cannot be established for a piece of traffic because the desired S-NSSAI's are not available in the UE's current location in the PLMN.

Figure 7:
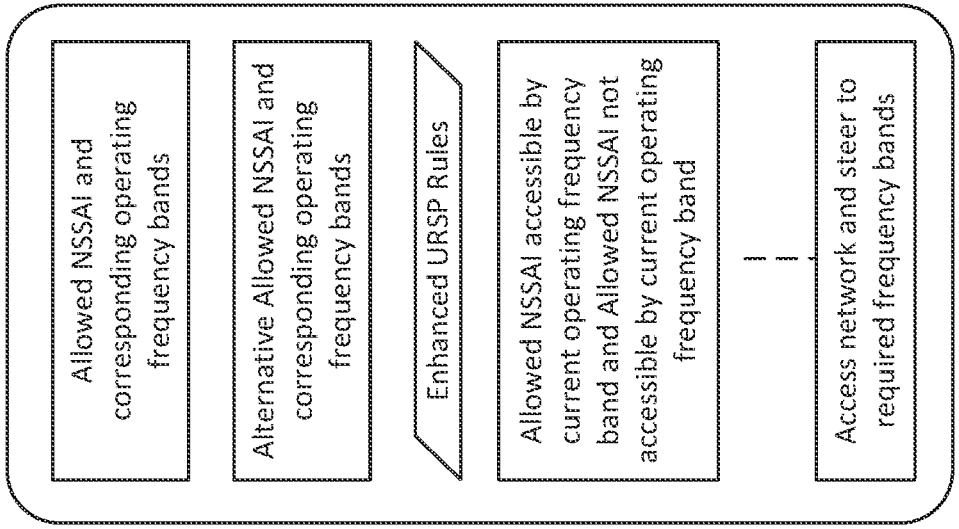
FIG. 7 illustrates an example Graphical User Interface (GUI) for a UE with NSSAI and OFB and enhanced URSP rules.

FIG. 7 shows a GUI for a UE that holds Allowed NSSAI and corresponding OFBs for each S-NSSAI, Alternative Allowed NSSAI and OFBs, enhanced URSP rules and frequency band steering capabilities in-coordination with the RAN and the core network.

Figure 16:
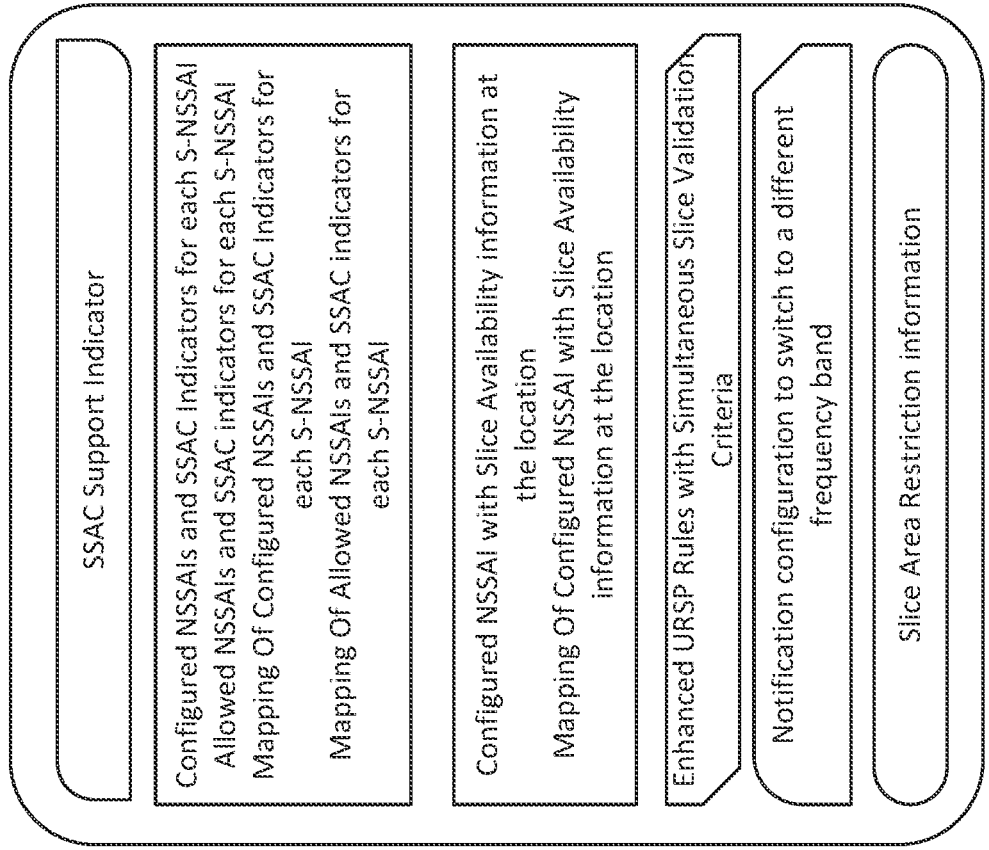
FIG. 16 illustrates an example Graphical User Interface (GUI) for a UE indicating support for simultaneous slice access restrictions, area of service restriction for slice access, and supporting capabilities.

FIG. 16 shows a GUI for UE that includes UE's configurations to support simultaneous slice access restrictions, support for slice access restrictions due to area of service including geographical region location information and, enhanced URSP rules to support simultaneous slice access validation criteria.

Example Environments

The 3rd Generation Partnership Project (3GPP) develops technical standards for cellular telecommunications network technologies, including radio access, the core transport network, and service capabilities—including work on codecs, security, and quality of service. Recent Radio Access Technology (RAT) standards include WCDMA (commonly referred as 3G), UE (commonly referred as 4G), and UE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 8A:
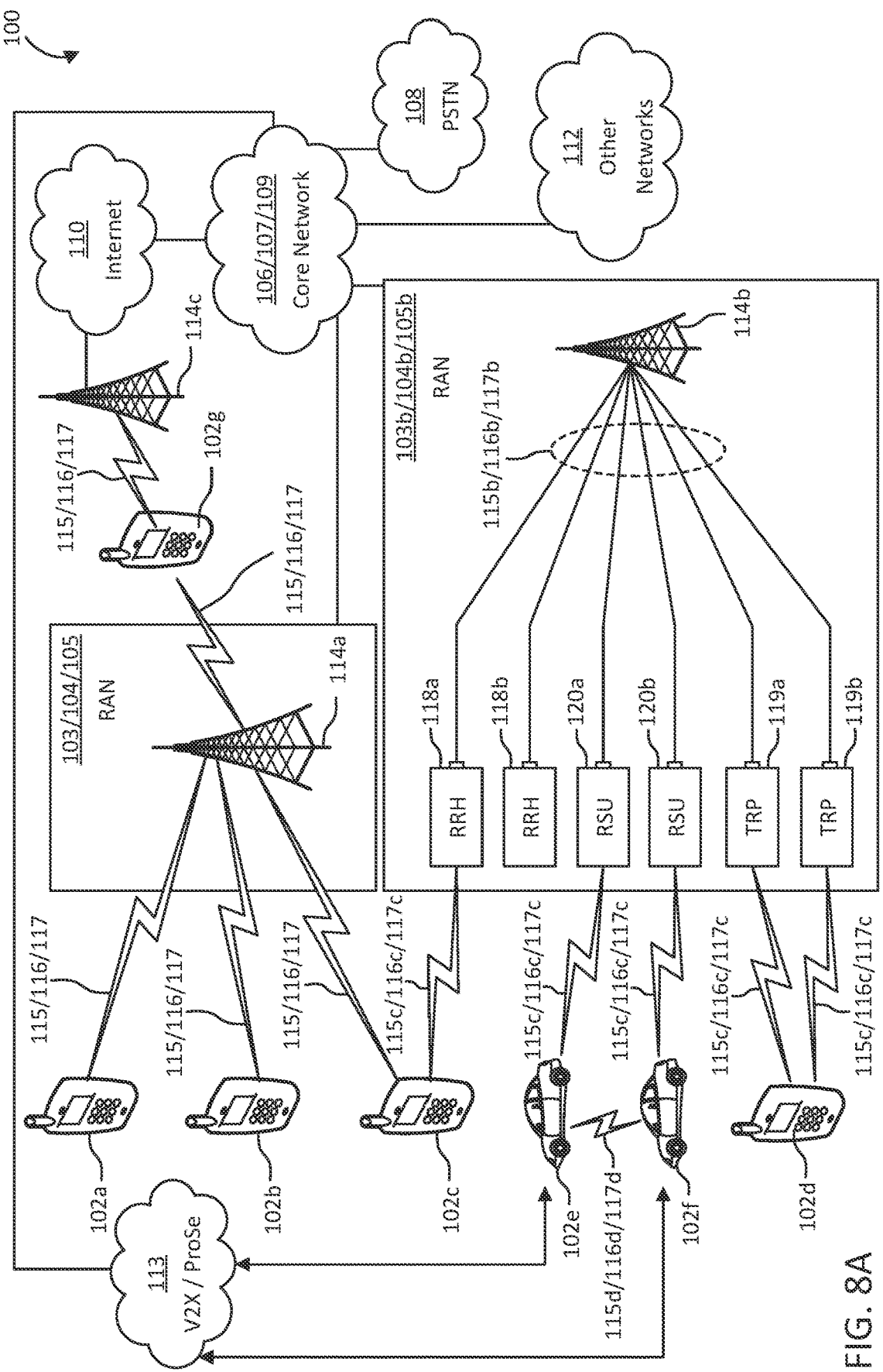
FIG. 8A illustrates an example communications system in which the methods and apparatuses described and claimed herein may be embodied.

FIG. 8A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a Radio Access Network (RAN) 103/101/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment, Although each WTRU 102a, 102b, 102c, 102d, 102e, 102f, 102g is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ Multiple-Input Multiple Output (MIMO) technology and, therefore, may utilize multiple transceivers for each sector of the cell.

The base station 114a may communicate with one or more of the WTRUs 102a, 102b, 102c over an air interface 115/116/117, which may be any suitable wireless communication link (e.g., radio frequency (RF), microwave, infrared (IR), ultraviolet (UV) visible light, cmWave, mmWave, etc.). The air interface 115/116/117 may be established using any suitable radio access technology (RAT).

The base station 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable Radio Access Technology (RAT).

The RRHs 118a, 118b, TRPs 119a, 119b and/or RSUs 120a, 120b, may communicate with one or more of the WTRUs 102c, 102d, 102e, 102f over an air interface 115c/

116c/117c, which may be any suitable wireless communication link (e.g., radio frequency (RF), microwave, infrared (FR), ultraviolet (UV), visible light, cmWave, mmWave, etc.). The air interface 115c/116c/117c may be established using any suitable RAT.

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UNITS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 8A may be a wireless router, Home Node B, Home eNode B, or access point, for example, and may utilize any suitable RAT for facilitating wireless connectivity in a localized area, such as a place of business, a home, a vehicle, a campus, etc. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, UE, UE-A, etc.) to establish a picocell or femtocell. As shown in FIG. 8A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 8A, it will be appreciated that the Radio Access Network (RAN) 103/104/105 and/or RAN 103b/104b/105b and/or the core network 106/107/109 may be in direct or indirect communication with other RANs that employ the same Radio Access Technology (RAT) as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the Wireless Transmit/Receive Units (WTRUs) 102a, 102b, 102c, 102d, 102e to access the Public Switched Telephone Network (PSTN) 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP), and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the Wireless Transmit/Receive Units (WTRUs) 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 8A may be configured to communicate with the base station 114a, which may employ a cellular-based radio technology, and with the base station 114c, which may employ an IEEE 802 radio technology.

Figure 8B:
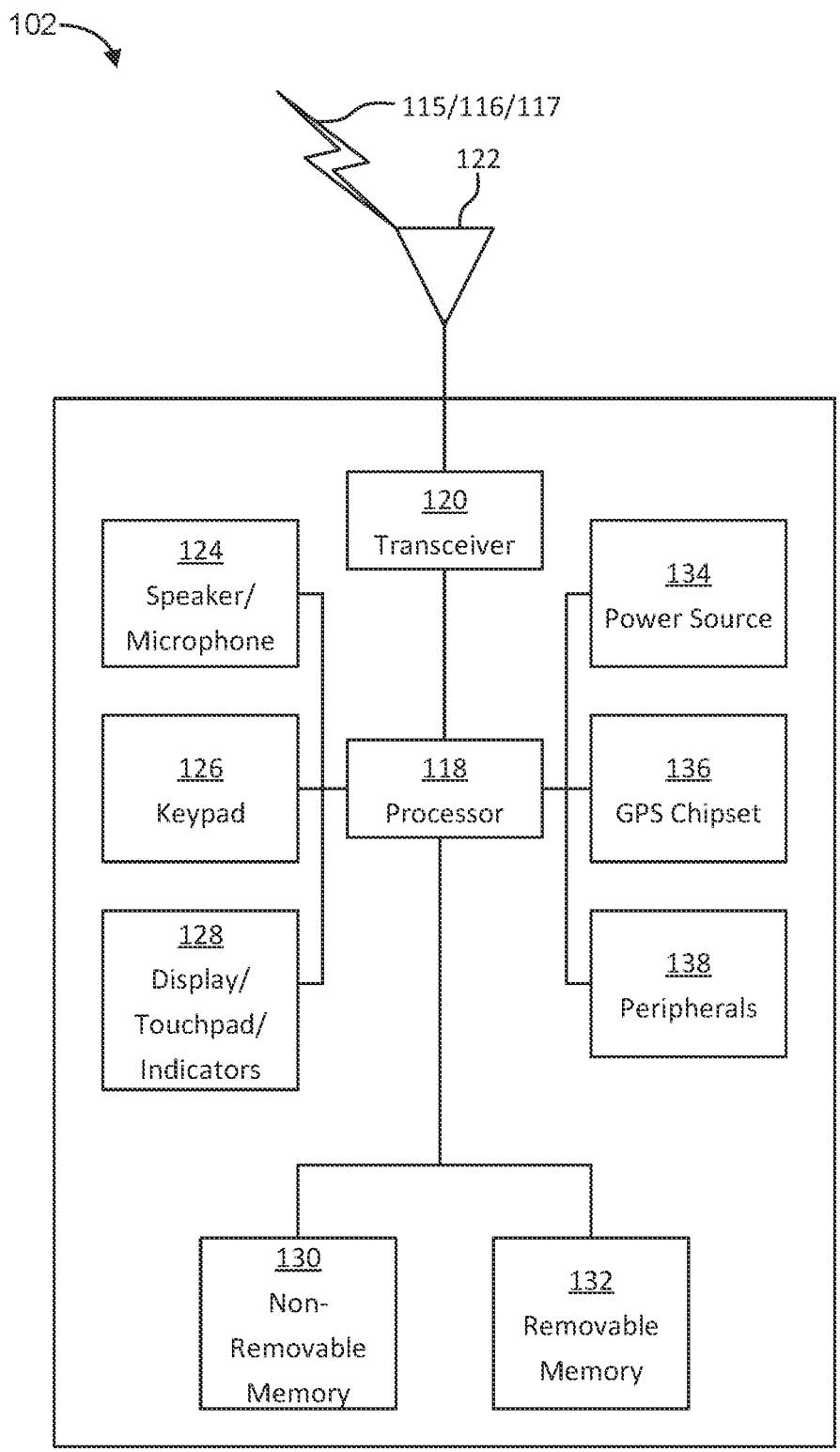
FIG. 8B is a block diagram of an example apparatus or device configured for wireless communications.

FIG. 8B is a block diagram of an example apparatus or device configured for wireless communications in accordance with the embodiments illustrated herein, such as for example, a WTRU 102. As shown in FIG. 8B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8B and described herein.

The processor 118 may be a general-purpose processor, a special-purpose processor, a conventional processor, a Digital Signal Processor (DSP), a plurality of microprocessors, one or more microprocessors in association with a DSP core, a controller, a microcontroller, Application-Specific Integrated Circuits (ASICs), Field Programmable Gate Array (FPGAs) circuits, any other type of Integrated Circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8B depicts the processor 118 and the transceiver 120 as separate components, it will be appreciated that the processor 118 and the transceiver 120 may be integrated together in an electronic package or chip.

The transmit/receive element 122 may be configured to transmit signals to or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 8B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. The Wireless Transmit/Receive Units (WTRU) 102 may have multi-mode capabilities. Thus, the transceiver 120 may include multiple transceivers for enabling the WTRU 102 to communicate via multiple Radio Access Technology (RATs), such as UTRA and IEEE 802.11, for example.

The processor 118 of the WTRU 102 may be coupled to and may receive user input data from, the speaker/microphone 124, the keypad 126, and/or the display/touchpad/indicators 128 (e.g., a Liquid Crystal Display (LCD) display unit or Organic Light-Emitting Diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include Random-Access Memory (RAM), Read-Only Memory (ROM), a hard disk, or any other type of memory storage device. The removable memory 132 may include a Subscriber Identity Module (SIM) card, a memory stick, a Secure Digital (SD) memory card, and the like. In an embodiment, the processor 118 may access information from, and store data in, the memory that is not physically located on the WTRU 102, such as on a server or a home computer (not shown).

The processor 118 may receive power from the power source 134 and may be configured to distribute and/or control the power to the other components in the Wireless Transmit/Receive Units (WTRU) 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., fingerprint) sensors, an e-compass, a satellite transceiver, a digital camera (for photographs or video), a Universal Serial Bus (USB) port or other interconnect interfaces, a vibration device, a television transceiver, a hands-free headset, a Bluetooth® module, a Frequency Modulated (FM) radio unit, a digital music player, a media player, a video game player module, an Internet browser, and the like.

The Wireless Transmit/Receive Units (WTRU) 102 may be embodied in other apparatuses or devices, such as a sensor, consumer electronics, a wearable device such as a small-watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 8C:
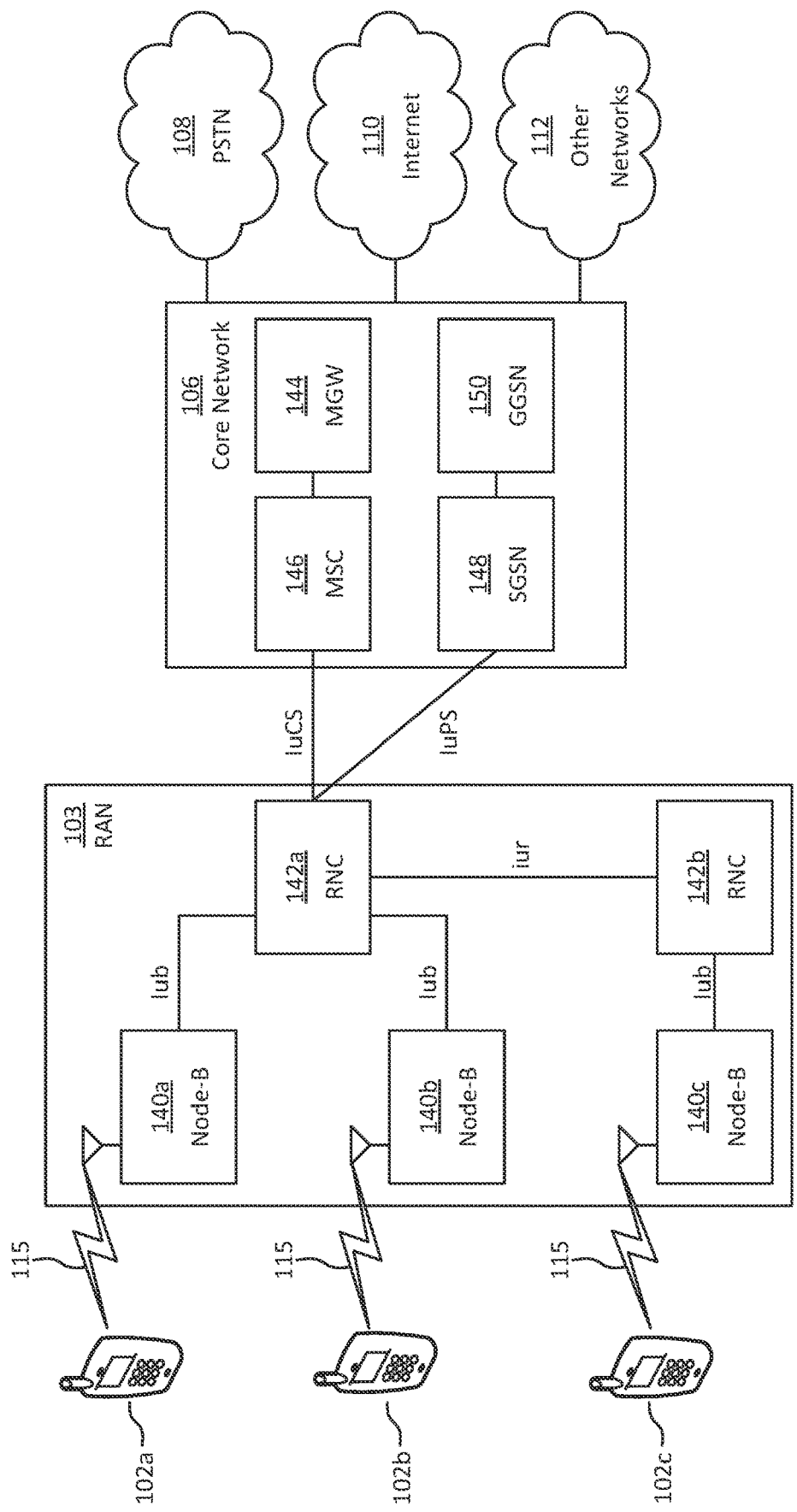
FIG. 8C is a system diagram of an example Radio Access Network (RAN) and core network.

FIG. 8C is a system diagram of the Radio Access Network (RAN) 103 and the core network 106 according to an embodiment. The RAN 103 may employ a UTRA radio technology to communicate with the WTRUs 102*a*, 102*b*, and 102*c* over the air interface 115. The RAN 103 may also be in communication with the core network 106. As shown in FIG. 8C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 8C, the Node-Bs 140*a*, 140*b* may be in communication with the RNC 142*a*. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 8C may include a media gateway (MGW) 144, a Mobile Switching Center (MSC) 146, a serving GPRS support node (SGSN) 148, and/or a gateway GPRS support node (GGSN) 150. While each of the foregoing elements is depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c, and IP-enabled devices.

The core network 106 may also be connected to the networks 112, which may include other wired or wireless networks that are owned and/or operated by other service providers.

Figure 8D:
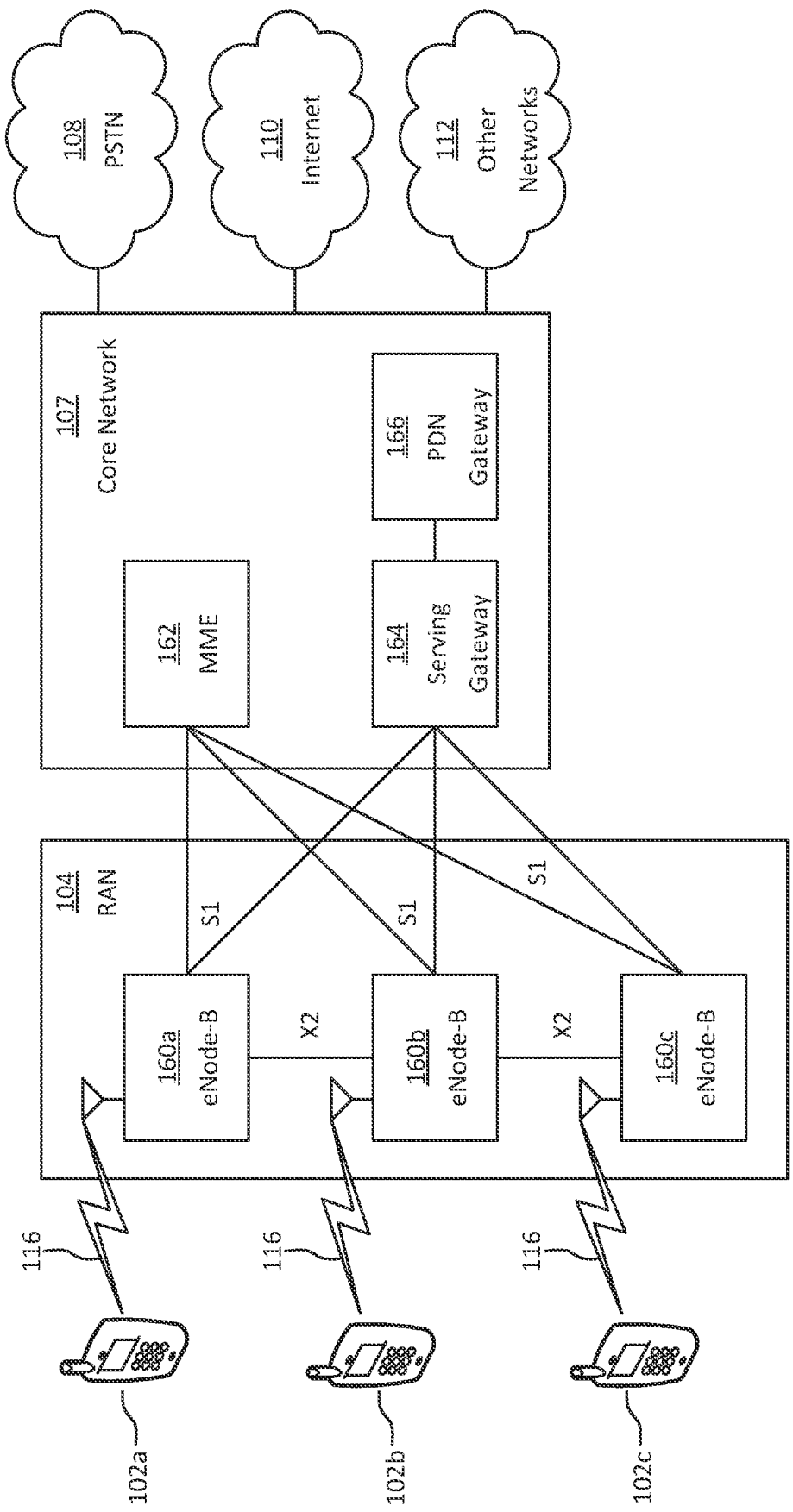
FIG. 8D is a system diagram of another example RAN and core network.

FIG. 8D is a system diagram of the RAN 104 and the core network 107 according to an embodiment. The RAN 104 may employ an E-UTRA radio technology to communicate with the Wireless Transmit/Receive Unit (WTRUs) 102a, 102b, and 102c over the air interface 116. The RAN 104 may also be in communication with the core network 107.

The Radio Access Network (RAN) 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a Mobility Management Entity (MME) 162, a serving gateway 164, and a packet data network (PDN) gateway 166. While each of the foregoing elements is depicted as part of the core network 107, it will be appreciated that any one of these elements may be owned and/or operated by an entity other than the core network operator.

The Mobility Management Entity (MME) 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the Wireless Transit/Receive Units (WTRUs) 102a, 102b, 102c, and the like. The MIME 162 may also provide a control plane function for switching between the Radio Access Network (RAN) 104 and other RANs (not shown) that employ other radio technologies, such as GSM or WCDMA.

The serving gateway 164 may be connected to each of the eNode-Bs 160a, 160b, and 160c in the Radio Access Network (RAN) 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, 102c with access to circuit-switched networks, such as the Public Switched Telephone Network (PSTN) 108, to facilitate communications between the WTRUs 102a, 102b, 102c, and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to networks 112, which may include other wired or wireless networks that are owned and/or operated by other service providers.

Figure 8E:
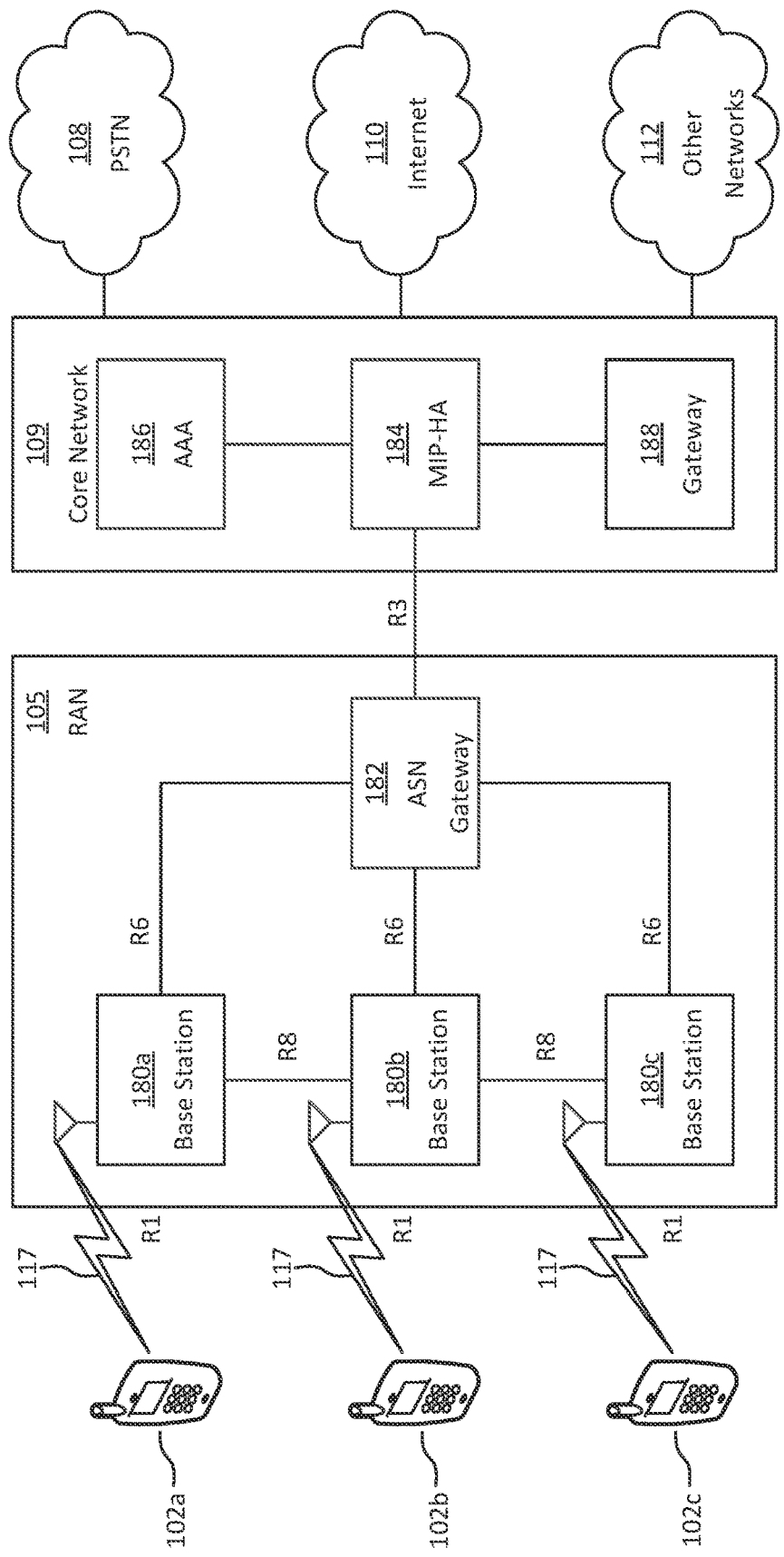
FIG. 8E is a system diagram of another example RAN and core network.

FIG. 8E is a system diagram of the Radio Access Network (RAN) 105 and the core network 109 according to an embodiment. The RAN 105 may be an Access Service Network (ASN) that employs IEEE 802.16 radio technology to communicate with the Wireless Transmit/Receive Units (WTRUs) 102a, 102b, and 102c over the air interface 117. The communication links between the different functional entities of the WTRUs 102a, 102b, 102c, the RAN 105, and the core network 109 may be defined as reference points.

As shown in FIG. 8E, the RAN 105 may include base stations 180a, 180b, 180c, and an ASN gateway 182, though it will be appreciated that the Radio Access Network (RAN) 105 may include any number of base stations and ASN gateways while remaining consistent with an embodiment. The base stations 180a, 180b, 180; may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The Access Service Network (ASN) gateway 182 may serve as a traffic aggregation point and may be responsible for paging, caching of subscriber profiles, routing to the core network 109, and the like.

The air interface 117 between the Wireless Transmit/ Receive Units (WTRUs) 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c, and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the Access Service Network (ASN) gateway 182 may be defined as an R6 reference point. The R6 reference point may include protocols for facilitating mobility management based on mobility events associated with each of the WTRUs 102a, 102b, 102c.

As shown in FIG. 8E, the Radio Access Network (RAN) 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements is depicted as part of the core network 109, it will be appreciated that any one of these elements may be owned and/or operated by an entity other than the core network operator.

The MIP-HA may be responsible for IP address management and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the Wireless Transit/Receive Network (WTRUs) 102a, 102b, 102c, and IP-enabled devices. The AAA server 186 may be responsible for user authentication and for supporting user services. The gateway 188 may facilitate interworking with other networks. For example, gateway 188 may provide the WTRUs 102a, 102b, 102c with access to circuit-switched networks, such as the Public Switched Telephone Network (PSTN) 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 8E, it will be appreciated that the RAN 105 may be connected to other Access Service Networks (ASNs), and the core network 109 may be connected to other core networks. The communication link between the Radio Access Networks (RAN) 105 the other ASNs may be defined as an R4 reference point, which may include protocols for coordinating the mobility of the Wireless Transmit/Receive Units (WTRUs) 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing $3^{rd}$ Generation Partnership Project (3GPP) specifications, but it is understood that in the future those entities and functionalities may be identified by other names and certain entities or functions may be combined in future specifications published by 3GPP, including future 3GPP New Radio (NR) specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 8F:
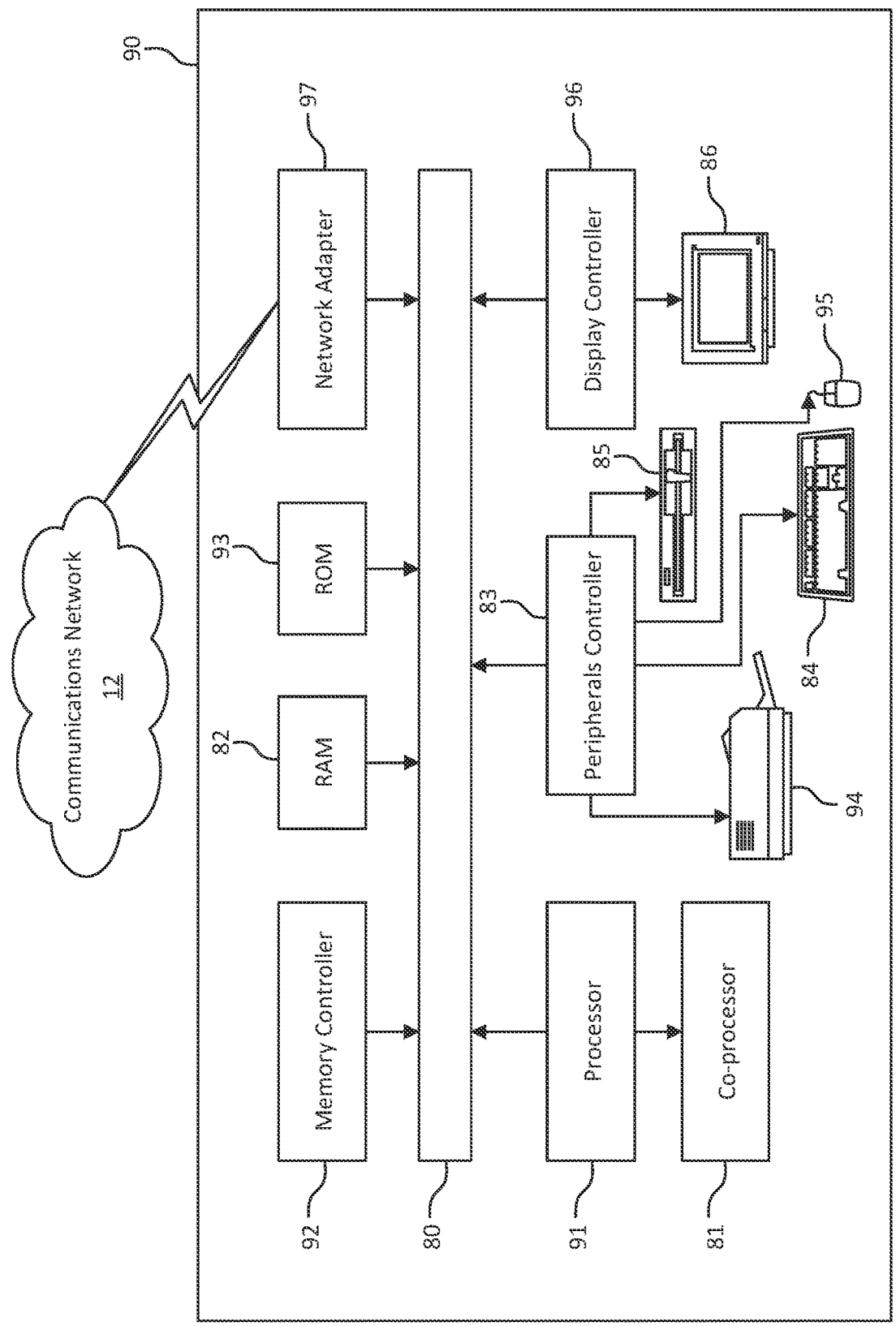
FIG. 8F is a block diagram of an example computing system.

FIG. 8F is a block diagram of an exemplary computing system 90 in which one or more apparatuses of the communications networks illustrated in FIGS. 1A, 1C, 1D, and 1E may be embodied, such as certain nodes or functional entities in the RAN 103/104/105, Core Network 106/107/ 109, PSTN 108, Internet 110, or Other Networks 112. Computing system 90 may comprise a computer or server and may be controlled primarily by computer-readable instructions, which may be in the form of software, wherever, or by whatever means such software is stored or accessed. Such computer-readable instructions may be executed within a processor 91, to cause computing system 90 to do work. The processor 91 may be a general-purpose processor, a special-purpose processor, a conventional processor, a Digital Signal Processor (DSP), a plurality of microprocessors, one or more microprocessors in association with a DSP core, a controller, a microcontroller, Application-Specific Integrated Circuits (ASICs), Field Programmable Gate Array (FPGAs) circuits, any other type of Integrated Circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90, Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 8G:
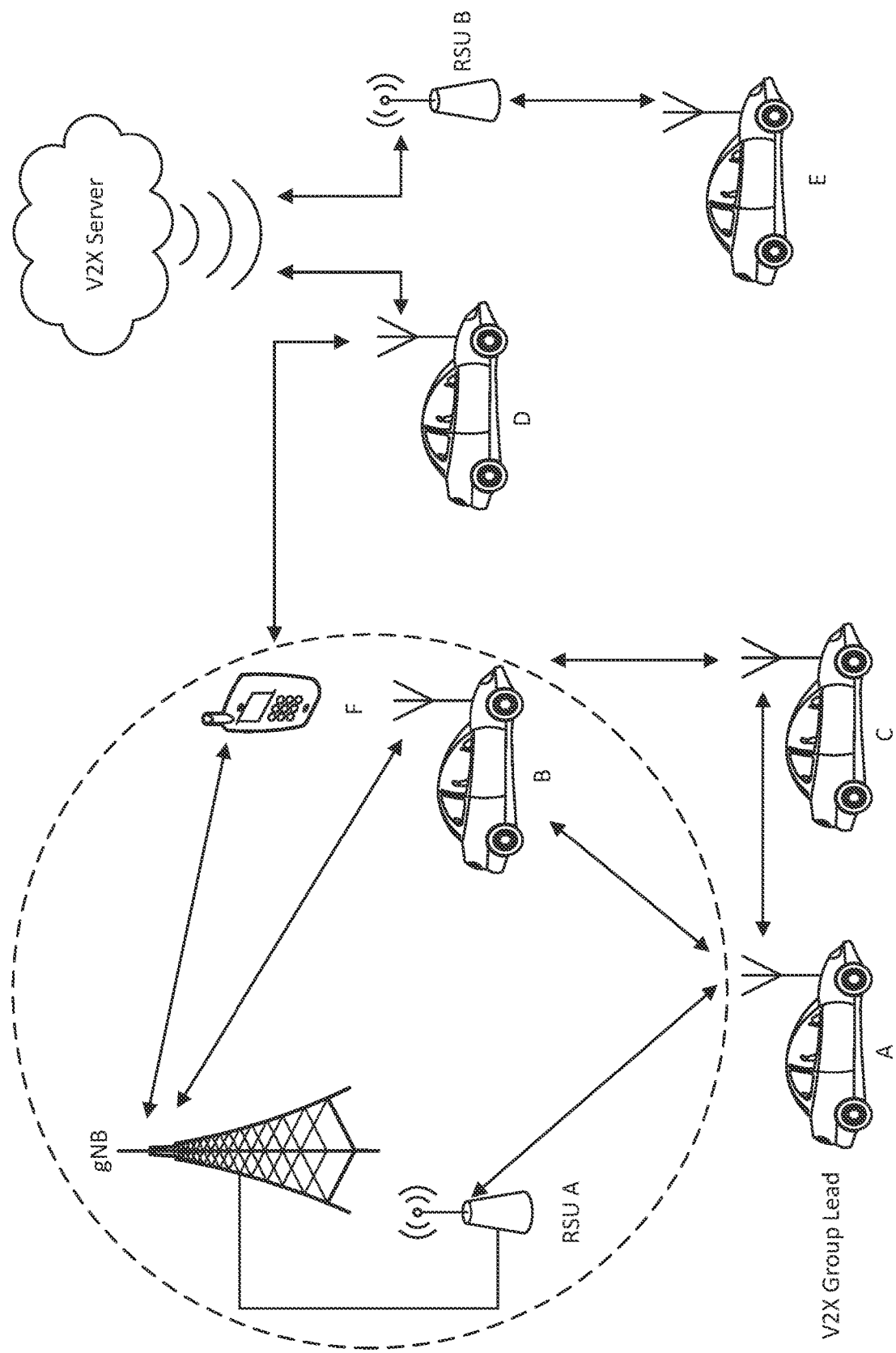
FIG. 8G is a block diagram of another example communications system.

FIG. 8G illustrates one embodiment of an example communications system 111 in which the methods and apparatuses described and claimed herein may be embodied. As shown, the example communications system 111 may include Wireless Transmit/Receive Units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRU A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

TABLE 1

APPENDIX
Standardised SST values

| Slice/Service type | SST value | Characteristics |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |
| V2X | 4 | Slice suitable for the handling of V2X services. |

TABLE 2

UE Route Selection Policy

| Information name | Description | Category | PCF permitted to modify in a URSP | Scope |
|---|---|---|---|---|
| URSP rules | 1 or more URSP rules as specified in table 6.6.2.1-2 | Mandatory | Yes | UE context |

TABLE 3

UE Route Selection Policy Rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |

TABLE 3-continued

UE Route Selection Policy Rule

| Information name | Description | Category | PCF permitted to modify in a UE context | Scope |
|---|---|---|---|---|
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526. More than one connection capabilities value can be provided.
(NOTE 5):
A URSP rule cannot contain the combination of the Traffic descriptor components IP descriptors and Non-IP descriptors.

TABLE 4

Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional (NOTE 5) | Yes | UE context |
| Network Slice Selection | Either a single value or a list of values of S-NSSAI(s). (Note 9) | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |

TABLE 4-continued

Route Selection Descriptor

| Information name | Description | Category | PCF permitted to modify in URSP | Scope |
| --- | --- | --- | --- | --- |
| Location Criteria | The UE location where the matching traffic is allowed. The RSD rule is not considered to be valid if the UE location does not match the location criteria. | Optional | Yes | UE context |

(NOTE 1):
Every Route Selection Descriptor in the list shall have a different precedence value.
(NOTE 2):
At least one of the route selection components shall be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor is not considered valid unless all the provided Validation Criteria are met.
NOTE 7:
In this Release of specification, inclusion of the Validation Criteria in Roaming scenarios is not considered.
(NOTE 8):
When the PDU Session Type is "Ethernet" or "Unstructured", this component shall be present.

TABLE 5

Definition of frequency ranges

| Frequency range designation | Corresponding frequency range |
| --- | --- |
| FR1 | 410 MHz-7125 MHz |
| FR2 | 24250 MHz-52600 MHz |

TABLE 6

Radio Spectrum Attribute Description

| Parameters | |
| --- | --- |
| Value | {String, String, String, . . .} |
| Measurement unit | NA |
| Example | n1 |
| | n77 |
| | n38 |
| Tags | Scalability attribute |
| Attribute Presence | |
| Mandatory | |
| Conditional | |
| Optional | X |

TABLE 7

Route Selection Descriptor

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). (Note 9) | Optional (NOTE 3) | Yes | UE context |
| DNN Selection | Either a single value or a list of values of DNN(s). | Optional | Yes | UE context |

TABLE 7-continued

Route Selection Descriptor

| Information name | Description | Category | PCF permitted to modify in URSP | Scope |
|---|---|---|---|---|
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| PLMN ID indication | Indicates the PLMN ID(s) of the network where the UE should camp in order to use this RSD of URSP rule. (Note 9) | Mandatory | Yes | UE context |
| Operating Frequency Band Selection | Indicates values of operating frequency band(s), which UE must use to access the S-NSSAI(s) indicated. (Note 9) | Mandatory | Yes | UE context. |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |
| Simultaneous Slice Validation Criteria | The RSD rule is considered to be valid only if simultaneous slice access criteria is met. The criteria may be provided several ways: "allowed simultaneous slice access list", "restricted simultaneous slice access list" or both. | Optional | Yes | UE context |

(NOTE 1):
Every Route Selection Descriptor in the list shall have a different precedence value.
(NOTE 2):
At least one of the route selection components shall be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor is not considered valid unless all the provided Validation Criteria are met.
NOTE 7:
In this Release of specification, inclusion of the Validation Criteria in Roaming scenarios is not considered.
(NOTE 8):
When the PDU Session Type is "Ethernet" or "Unstructured", this component shall be present.
(Note 9):
Slice selected in the URSP Rules is accessible only by using allotted OFBs and when UE is camped in the specified PLMN (represented by the PLMN ID).

TABLE 8

S-NSSAI information element

Length of S-NSSAI contents (octet 2)
This field indicates the length of the included S-NSSAI contents, and it can have the following values. Depending on the value of the length field the following S-NSSAI contents are included:
Bits

| 8 | 7 | 6 | 5 | 4 | 3 | 2 | 1 | |
|---|---|---|---|---|---|---|---|---|
| 0 | 0 | 0 | 0 | 0 | 0 | 0 | 0 | SST |
| 0 | 0 | 0 | 0 | 0 | 0 | 1 | 0 | SST and mapped HPLMN SST |
| 0 | 0 | 0 | 0 | 0 | 1 | 0 | 0 | SST and SD |

TABLE 8-continued

S-NSSAI information element

| 0 | 0 | 0 | 0 | 0 | 1 | 0 | 1 | SST, SD and mapped HPLMN SST |
| 0 | 0 | 0 | 0 | 1 | 0 | 0 | 0 | SST, SD, mapped HPLMN SST and mapped HPLMN SD |

All other values are reserved.
Slice/service type (SST) (octet 3)
This field contains the 8 bit SST value. The coding of the SST value part is defined in 3GPP TS 23.003.
Slice differentiator (SD) (octet 4 to octet 6)
This field contains the 24 bit SD value. The coding of the SD value part is defined in 3GPP TS 23.003.
If the SST encoded in octet 3 is not associated with a valid SD value, and the sender needs to include a mapped HPLMN SST (octet 7) and a mapped HPLMN SD (octets 8 to 10),
then the sender shall set the SD value (octets 4 to 6) to "no SD value associated with the SST".
mapped HPLMN Slice/service type (SST) (octet 7)
This field contains the 8 bit SST value of an S-NSSAI in the S-NSSAI(s) of the HPLMN to which the SST value is mapped. The coding of the SST value part is defined in 3GPP TS 23.003.
mapped HPLMN Slice differentiator (SD) (octet 8 to octet 10)
This field contains the 24 bit SD value of an S-NSSAI in the S-NSSAI(s) of the HPLMN to which the SD value is mapped. The coding of the SD value part is defined in 3GPP TS 23.003.

NOTE 1:
Octet 3 shall always be included.
NOTE 2:
If the octet 4 is included, then octet 5 and octet 6 shall be included.
NOTE 3:
If the octet 7 is included, then octets 8, 9, and 10 may be included.
NOTE 4:
If the octet 8 is included, then octet 9 and octet 10 shall be included.

TABLE 9

Areas of Service Attribute

| Parameters | |
| --- | --- |
| Value | {String, String, String, . . .} |
| Measurement unit | NA |
| Example | Canada |
| | France |
| | Japan |
| | UK |
| Tags | Character Attribute/Operation |
| | Scalability Attribute* |
| | KPI |
| Attribute Presence | |
| Mandatory | |
| Conditional | |
| Optional | X |

TABLE 10

Region Specification Table

| Parameters | |
| --- | --- |
| Value | Integer |
| Measurement unit | NA |
| Example | 1 full country |
| | 2: list of regions |
| Tags | Character Attribute/Operation |
| | Scalability Attribute* |
| | KPI |
| Attribute Presence | |
| Mandatory | |
| Conditional | X |
| Optional | |

*Depending on the use case, this attribute can also be scalability attribute.

TABLE 11

Enhanced S-NSSAI information element updated with OFB

Length of S-NSSAI contents (octet 2)
This field indicates the length of the included S-NSSAI contents, and it can have the following values. Depending on the value of the length field the following S-NSSAI contents are included:
Bits

| 8 | 7 | 6 | 5 | 4 | 3 | 2 | 1 | |
| --- | --- | --- | --- | --- | --- | --- | --- | --- |
| 0 | 0 | 0 | 0 | 0 | 0 | 0 | 0 | SST |
| 0 | 0 | 0 | 0 | 0 | 0 | 1 | 0 | SST and mapped HPLMN SST |
| 0 | 0 | 0 | 0 | 0 | 1 | 0 | 0 | SST and SD |
| 0 | 0 | 0 | 0 | 0 | 1 | 0 | 1 | SST, SD and mapped HPLMN SST |
| 0 | 0 | 0 | 0 | 1 | 0 | 0 | 0 | SST, SD, mapped HPLMN SST and mapped HPLMN SD |
| 0 | 0 | 0 | 1 | 0 | 0 | 0 | 1 | OFB and SST |
| 0 | 0 | 0 | 1 | 0 | 0 | 1 | 0 | OFB and mapped HPLMN SST |
| 0 | 0 | 0 | 1 | 0 | 0 | 1 | 1 | OFB and SST and SD |
| 0 | 0 | 0 | 1 | 0 | 1 | 0 | 0 | OFB and SST, SD and mapped HPLMN SST |
| 0 | 0 | 0 | 1 | 0 | 1 | 0 | 1 | OFB and SST, SD, mapped HPLMN SST and mapped HPLMN SD |
| 0 | 0 | 0 | 1 | 1 | 1 | 0 | 0 | OFB and Mapped HPLM SST |

TABLE 11-continued

Enhanced S-NSSAI information element updated with OFB

| | | | | | | | | |
|---|---|---|---|---|---|---|---|---|
| 0 | 0 | 0 | 1 | 1 | 0 | 0 | 1 | OFB and Mapped HPLM SD |
| 0 | 0 | 0 | 1 | 1 | 0 | 1 | 0 | OFB and Mapped SST and mapped HPLMN SD |

All other values are reserved.
Slice/service type (SST) (octet 3)
This field contains the 8 bit SST value. The coding of the SST value part is defined in 3GPP TS 23.003.
Slice differentiator (SD) (octet 4 to octet 6)
This field contains the 24 bit SD value. The coding of the SD value part is defined in 3GPP TS 23.003.
If the SST encoded in octet 3 is not associated with a valid SD value, and the sender needs to include a mapped HPLMN SST (octet 7) and a mapped HPLMN SD (octets 8 to 10), then the sender shall set the SD value (octets 4 to 6) to "no SD value associated with the SST".
mapped HPLMN Slice/service type (SST) (octet 7)
This field contains the 8 bit SST value of an S-NSSAI in the S-NSSAI(s) of the HPLMN to which the SST value is mapped.
The coding of the SST value part is defined in 3GPP TS 23.003 [4].
mapped HPLMN Slice differentiator (SD) (octet 8 to octet 10)
This field contains the 24 bit SD value of an S-NSSAI in the S-NSSAI(s) of the HPLMN to which the SD value is mapped.
The coding of the SD value part is defined in 3GPP TS 23.003.
Operating Frequency Band (octet 11 to octet 12)
This field contains the 16-bit value for operating frequency band information that the S-NSSAI
shall be available on. It may include 8-bit each for Uplink operating band and Downlink
operating band information. Absence of this value indicates that the S-NSSAI is available in all
frequency bands.
Network Slice Group (octet 13)
This field contains an 8-bit value for providing a Network Slice Group (NSG) number. Absence
of this value indicates that the S-NSSAI is not associated with any NSG.

NOTE 1:
Octet 3 shall always be included.
NOTE 2:
If the octet 4 is included, then octet 5 and octet 6 shall be included.
NOTE 3:
If the octet 7 is included, then octets 8, 9, and 10 may be included.
NOTE 4:
If the octet 8 is included, then octet 9 and octet 10 shall be included.

TABLE 12

Standard SST Values

| Slice/Service type | SST value | Characteristics |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |
| V2X | 4 | Slice suitable for the handling of V2X services. |
| NULL | 0 | This value is used in a "Mapping of Allowed NSSAI" or "Mapping of Configured NSSAI" to indicate that no slice suitably maps to the S-NSSAI. |

TABLE 13

Updated S-NSSAI information element

Length of S-NSSAI contents (octet 2)
This field indicates the length of the included S-NSSAI contents, and it can have the following values.
Depending on the value of the length field the following S-NSSAI contents are included:
Bits

| 8 | 7 | 6 | 5 | 4 | 3 | 2 | 1 | |
|---|---|---|---|---|---|---|---|---|
| 0 | 0 | 0 | 0 | 0 | 0 | 0 | 0 | SST |
| 0 | 0 | 0 | 0 | 0 | 0 | 1 | 0 | SST and mapped HPLMN SST |
| 0 | 0 | 0 | 0 | 0 | 1 | 0 | 0 | SST and SD |
| 0 | 0 | 0 | 0 | 0 | 1 | 0 | 1 | SST, SD and mapped HPLMN SST |
| 0 | 0 | 0 | 0 | 1 | 0 | 0 | 0 | SST, SD, mapped HPLMN SST and mapped HPLMN SD |
| 0 | 0 | 0 | 0 | 1 | 0 | 0 | 1 | Mapped HMPLN SST |
| 0 | 0 | 0 | 0 | 1 | 0 | 1 | 0 | Mapped HPLMN SD |
| 0 | 0 | 0 | 0 | 1 | 0 | 1 | 1 | Mapped HMPLN SST and Mapped HMPLN SD |
| 1 | 0 | 0 | 0 | 0 | 0 | 0 | 1 | Geographic Info and SST |
| 1 | 0 | 0 | 1 | 0 | 0 | 1 | 0 | Geographic Info and SST and mapped HPLMN SST |
| 1 | 0 | 0 | 0 | 0 | 1 | 0 | 0 | Geographic Info and SST and SD |
| 1 | 0 | 0 | 0 | 0 | 1 | 0 | 1 | Geographic Info and SST, SD and mapped HPLMN SST |
| 1 | 0 | 0 | 0 | 1 | 1 | 0 | 1 | Geographic Info and SST, SD, mapped HPLMN SST and mapped HPLMN SD |

TABLE 13-continued

Updated S-NSSAI information element

| 1 | 0 | 0 | 0 | 1 | 0 | 0 | 1 | Geographic Info and mapped HPLMN SST |
| 1 | 0 | 0 | 0 | 1 | 0 | 1 | 0 | Geographic Info and mapped HPLMN SD |
| 1 | 0 | 0 | 0 | 1 | 0 | 1 | 1 | Geographic Info and mapped SST and mapped HPLMN SD |

All other values are reserved.
Slice/service type (SST)
This field contains the 8 bit SST value. The coding of the SST value part is defined in 3GPP TS 23.003.
Slice differentiator (SD)
This field contains the 24 bit SD value. The coding of the SD value part is defined in 3GPP TS 23.003.
If the SST encoded in octet 3 is not associated with a valid SD value, and the sender needs to include a mapped HPLMN SST (octet 7) and a mapped HPLMN SD (octets 8 to 10), then the sender shall set the SD value (octets 4 to 6) to "no SD value associated with the SST".
mapped HPLMN Slice/service type (SST)
This field contains the 8 bit SST value of an S-NSSAI in the S-NSSAI(s) of the HPLMN to which the SST value is mapped. The coding of the SST value part is defined in 3GPP TS 23.003 [4].
mapped HPLMN Slice differentiator (SD)
This field contains the 24 bit SD value of an S-NSSAI in the S-NSSAI(s) of the HPLMN to which the SD value is mapped. The coding of the SD value part is defined in 3GPP TS 23.003.
Geographic Information
This field indicates the geographic regions in the PLMN where the S-NSSAI is available. When it is not present, it is assumed that the S-NSSAI is available in the whole PLMN.

TABLE 14

Abbreviations

| | |
|---|---|
| 3GPP | 3rd Generation Partnership Project |
| 5GC | 5G Core |
| 5GS | 5G System |
| AF | Application Function |
| AMF | Access and Mobility Management Function |
| AP | Access Point |
| API | Application Programming Interface |
| AS | Access Stratum |
| BTS | Base Transceiver Station |
| CA | Carrier Aggregation |
| CN | Core Network |
| CP | Control Plane |
| DL | Downlink |
| DN | Data Network |
| DNN | Data Network Name |
| DVD | Digital Versatile Disks |
| eMBB | Enhanced Mobile Broadband |
| eV2X | Enhanced Vehicle-to-Everything |
| FDD | Frequency Division Duplex |
| FR | Frequency Range |
| GST | Generic Slice Template |
| GUI | Graphical User Interface |
| GUTI | Globally Unique Temporary Identifier |
| HPLMN | Home Public Land Mobile Network |
| ID | Identifier |
| IE | Information Element |
| LTE | Long Term Evolution |
| MBMS | Multimedia Broadcast/Multicast Service |
| MCN | Mobile Core Network |
| MIMO | Multiple-Input Multiple-Output |
| MIoT | Massive Internet-of-Things |
| MME | Mobility Management Entity |
| MNO | Mobile Network Operator |
| NAS | Non Access Stratum |
| NCMF | Network Capability Management Function |
| NEF | Network Exposure Function |
| NF | Network Function |
| NGAP | Next Generation Application Protocol |
| NG-RAN | Next Generation Radio Access Network |
| NID | Network Identifier |
| NR | New Radio |
| NRF | NF Repository Function |
| NSC | Network Slice Customer |
| NSG | Network Slice Group |
| NSI | Network Slice Instance |
| NSP | Network Slice Provider |
| NSSAI | Network Slice Selection Assistance Information |
| NSSF | Network Slice Selection Function |
| OAM | Operations, Administration and Maintenance |
| OFB | Operating Frequency Band |
| PCF | Policy Control Function |
| PDA | Personal Digital Assistant |
| PDU | Packet Data Unit |
| PLMN | Public Land Mobile Network |
| PSTN | Public Switched Telephone Network |
| QoS | Quality of Service |
| RA | Registration Area |
| RAN | Radio Access Network |
| RAT | Radio Access Technology |
| RFSP | Radio Frequency Selection Priority |
| RFSP | RAT/Frequency Selection Priority |
| RRC | Radio Resource Control |
| RRH | Remote Radio Head |
| RRM | Radio Resource Management |
| RRM | Radio Resource Management |
| RSD | Route Selection Descriptor |
| RSU | Roadside Units |
| SBA | Service Based Architecture |
| SCS | Service Capability Server |
| SD | Slice Differentiator |
| SM | Session Management |
| SMF | Session Management Function |
| SMSF | Short Message Service (SMS) Function |
| S-NSSAI | Single Network Slice Selection Assistance Information |
| SSAC | Simultaneous Slice Access Capability |
| SSAP | Simultaneous Slice Access Policies |
| SSI | SSAC Support Indicator |
| SST | Slice/Service Type |
| SUPI | Subscription Permanent Identifier |
| TA | Tracking Area |
| TAID | Tracking Area Identifier |
| TAI | Tracking Area Identity |
| TRP | Transmission and Reception Point |
| UDM/UDR | Unified Data Management/Unified Data Repository |
| UE | User Equipment |
| UE-AMBR | UE Aggregate Maximum Bit Rate |
| UL | Uplink |
| UPF | User Plane Function |
| URLLC | Ultra-Reliable Low-Latency Communication |
| URSP | UE Route Selection Policy |
| V2I | Vehicle-to-Infrastructure Communication |
| V2N | Vehicle-to-Network Communication |
| V2P | Vehicle-to-Pedestrian Communication |
| V2V | Vehicle-to-Vehicle Communication |
| V2X | Vehicle-to-Everything |
| V-AMF | Visited Access and Mobility Management Function |

TABLE 14-continued

Abbreviations

| | |
|---|---|
| VPLMN | Visited Public Land Mobile Network |
| WTRU | Wireless Transmit/Receive Units |

We claim:

1. A Wireless Transmit/Receive Unit (WTRU), comprising
a processor, a memory, and communication circuitry communicating with a network, the memory comprising computer-executable instructions which, when executed by the processor, cause the WTRU to perform operations comprising:
sending, to the network, a request, the request indicating a first requested Network Slice Selection Assistance Information (NSSAI), the request further indicating that the WTRU is capable of receiving Simultaneous Slice Access Capability (SSAC) information;
receiving, from the network, a message comprising information about a registration group, and an indication that the requested NSSAI is associated with the registration group, the message further comprising SSAC information for one or more Single NSSAIs (S-NSSAIs), and wherein the SSAC information indicates that a first S-NSSAI may not be used with network slices that are not part of the registration group; and
determining to control access to the network in accordance with the message.

2. The WTRU of claim 1, wherein the SSAC information further indicates that a first S-NSSAI may not be used with any other network slice.

3. The WTRU of claim 1, wherein the SSAC information indicates that a first S-NSSAI may be used only with network slices that have a same Slice/Service Type (SST) value.

4. The WTRU of claim 1, wherein the SSAC information indicates that a first S-NSSAI may not be used with network slices that have the same SST value.

5. The WTRU of claim 1, wherein the SSAC information indicates that a first S-NSSAI may be used only with network slices that have a same Slice Differentiator (SD) value.

6. The WTRU of claim 1, wherein the SSAC information indicates that a first S-NSSAI may not be used with network slices that have the same Slice Differentiator (SD) value.

7. The WTRU of claim 1, wherein SSAC information indicates that a first S-NSSAI may only be used with network slices in a same registration group.

8. The WTRU of claim 1, wherein the SSAC information constrains which of the one or more S-NSSAIs can be simultaneously provided to the WTRU in the requested NSSAI.

9. A method implemented by a Wireless Transmit/Receive Unit (WTRU), the method comprising:
sending, to the network, a request, the request indicating a first requested Network Slice Selection Assistance Information (NSSAI), the request further indicating that the WTRU is capable of receiving Simultaneous Slice Access Capability (SSAC) information;
receiving, from the network, message comprising information about a registration group, and an indication that the requested NSSAI is associated with the registration group, the message further comprising SSAC information for one or more Single NSSAIs (S-NSSAIs), and wherein the SSAC information indicates that a first S-NSSAI may not be used with network slices that are not part of the registration group; and
determining to control access to the network in accordance with the message.

10. The method of claim 9, wherein the SSAC information indicates that a first S-NSSAI may not be used with any other network slice.

11. The method of claim 9, wherein the SSAC information indicates that a first S-NSSAI may be used only with network slices that have a same Slice/Service Type (SST) value.

12. The method of claim 9, wherein the SSAC information indicates that a first S-NSSAI may not be used with network slices that have the same SST value.

13. The method of claim 9, wherein the SSAC information indicates that a first S-NSSAI may be used only with network slices that have a same Slice Differentiator (SD) value.

14. The method of claim 9, wherein the SSAC information indicates that a first S-NSSAI may not be used with network slices that have the Slice Differentiator (SD) value.

15. The method of claim 9, wherein SSAC information indicates that a first SNSSAI may only be used with network slices in a same registration group.

16. The method of claim 9, wherein the SSAC information constrains which of the one or more S-NSSAIs can be simultaneously provided to the WTRU in the requested NSSAI.

* * * * *